US012405039B2

(12) United States Patent
Alazazmeh

(10) Patent No.: US 12,405,039 B2
(45) Date of Patent: *Sep. 2, 2025

(54) SOLAR POWER ENERGY SYSTEM WITH RANKINE ENGINE

(71) Applicant: KING FAHD UNIVERSITY OF PETROLEUM AND MINERALS, Dhahran (SA)

(72) Inventor: Ayman Jamal Alazazmeh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/190,856

(22) Filed: Apr. 28, 2025

(65) Prior Publication Data
US 2025/0251178 A1    Aug. 7, 2025

Related U.S. Application Data

(63) Continuation of application No. 18/083,685, filed on Dec. 19, 2022, now Pat. No. 12,331,968.

(51) Int. Cl.
*F25B 27/00* (2006.01)
*B01D 1/26* (2006.01)
(Continued)

(52) U.S. Cl.
CPC .............. *F25B 27/002* (2013.01); *B01D 1/26* (2013.01); *B01D 5/006* (2013.01); *B01D 5/0075* (2013.01);
(Continued)

(58) Field of Classification Search
CPC .......... F25B 27/002; F25B 25/00; B01D 1/26; B01D 5/006; B01D 5/0075; B01D 61/025;
(Continued)

(56) References Cited

U.S. PATENT DOCUMENTS 9,869,272 B1    1/2018  Stuart et al.
11,407,659 B1   8/2022  Abdulrahim
(Continued)

FOREIGN PATENT DOCUMENTS

WO    2020/037843 A1    2/2020

OTHER PUBLICATIONS

Alazazmeh ; Solar Assisted Multi-Effect Refrigeration System ; King Fahd University of Petroleum and Minerals ; May 2016 ; 255 Pages.
(Continued)

*Primary Examiner* — Hoang M Nguyen
(74) *Attorney, Agent, or Firm* — Oblon, McClelland, Maier & Neustadt, L.L.P.

(57) ABSTRACT

The systems of the present disclosure include a solar-powered steam Rankine cycle (SRC) subsystem to convert solar energy into thermal energy and store the thermal energy; an ejector refrigeration cycle (ERC) subsystem to provide a first refrigeration effect with a first range of temperature based on the thermal energy; an absorption refrigeration cycle (ARC) subsystem to provide a second refrigeration effect with a second range of temperature based on the thermal energy; a brine refrigeration cycle (BRC) subsystem to generate and store when there is no cooling demand and provide a third refrigeration effect with a third range of temperature based on the electrical power generated by the ERC subsystem and the ice being melted; and an adsorption refrigeration cycle (ADRC) subsystem to provide a fourth refrigeration effect with a fourth range of temperature based on the thermal energy.

6 Claims, 29 Drawing Sheets

(51) Int. Cl.

| | |
|---|---|
| *B01D 5/00* | (2006.01) |
| *B01D 61/02* | (2006.01) |
| *B01D 61/08* | (2006.01) |
| *C02F 1/04* | (2023.01) |
| *C02F 1/44* | (2023.01) |
| *C02F 103/08* | (2006.01) |
| *C25B 1/04* | (2021.01) |
| *C25B 9/23* | (2021.01) |
| *C25B 15/08* | (2006.01) |
| *F22B 1/00* | (2006.01) |
| *F24S 20/20* | (2018.01) |
| *F25B 25/00* | (2006.01) |
| *F28D 20/02* | (2006.01) |

(52) U.S. Cl.
CPC .......... *B01D 61/025* (2013.01); *B01D 61/08* (2013.01); *C02F 1/043* (2013.01); *C02F 1/441* (2013.01); *C25B 1/04* (2013.01); *C25B 9/23* (2021.01); *C25B 15/08* (2013.01); *F25B 25/00* (2013.01); *B01D 2313/243* (2013.01); *C02F 2103/08* (2013.01); *C02F 2303/10* (2013.01); *F22B 1/006* (2013.01); *F24S 20/20* (2018.05); *F28D 20/02* (2013.01)

(58) Field of Classification Search
CPC ... B01D 61/08; B01D 2313/243; C02F 1/043; C02F 1/441; C02F 2103/08; C02F 2303/10; C25B 1/04; C25B 9/23; C25B 15/08; F22B 1/006; F24S 20/20; F28D 20/02

See application file for complete search history.

(56) References Cited

U.S. PATENT DOCUMENTS

| | | |
|---|---|---|
| 11,618,692 B2 | 4/2023 | Al-Sulaiman |
| 2014/0290247 A1 | 10/2014 | Mishima et al. |
| 2016/0047361 A1 | 2/2016 | Al-Su |
| 2016/0313032 A1 | 10/2016 | Khaliq |
| 2019/0161366 A1 | 5/2019 | Al-Azazmeh et al. |
| 2024/0200835 A1* | 6/2024 | Alazazmeh ............... C25B 1/04 |

OTHER PUBLICATIONS

Modi, et al. ; Integration of Evacuated Solar Collectors with an Adsorptive Ice Maker for Hot Climate Region ; Energy and Built Environment ; Jan. 6, 2021 ; 38 Pages.

Ibrahim, et al. ; Experimental testing of the performance of a solar absorption cooling system assisted with ice-storage for an office space ; Energy Conversion and Management 148 ; Jul. 1, 2017 ; 10 Pages.

Alirahmi, et al. ; Multi-criteria design optimization and thermodynamic analysis of a novel multigeneration energy system for hydrogen, cooling, heating, power, and freshwater ; International Journal of Hydrogen Energy ; Mar. 30, 2020 ; 17 Pages.

Delpisheh, et al. ; Design and financial parametric assessment and optimization of a novel solar-driven freshwater and hydrogen cogeneration system with thermal energy storage ; Sustainable Energy Technologies and Assessments 45 ; Feb. 24, 2021 ; 18 Pages.

Cao, et al. ; Comprehensive thermodynamic and economic analyses and optimization of a novel poly-generation setup utilizing solar and geothermal sources ; Applied Thermal Engineering, vol. 207 ; May 5, 2022 ; Abstract Only ; 3 Pages.

Farsi, et al. ; An efficient combination of transcritical CO2 refrigeration and multi-effect desalination:Energy and economic analysis ; Energy Conversion and Management, vol. 127 ; Nov. 1, 2016 ; Abstract Only ; 3 Pages.

* cited by examiner

SOLAR POWER ENERGY SYSTEM WITH RANKINE ENGINE

CROSS-REFERENCE TO RELATED APPLICATIONS

The present application is a Continuation of U.S. application Ser. No. 18/083,685, now allowed, having a filing date of Dec. 19, 2022.

TECHNICAL FIELD

The present disclosure relates to refrigeration systems and more particularly relates to solar energy powered refrigeration combined with an ice storage system.

DISCUSSION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Refrigeration systems are the major consumer of electricity. Use of refrigeration and air conditioners in residential and commercial sectors has increased significantly in recent years. Globally residential and commercial sectors account for about 40% of total energy use. Both power generator and vapor compression refrigeration systems operate at lower efficiencies during peak time (high temperature and humidity), thereby resulting in increased peak load on an electric grid. The vapor compression refrigeration systems are predominantly used for air cooling purposes which is energy-intensive in a hot and humid country.

Solar cooling is known as an efficient technology that provides environmental benefits including reducing main grid demand and shifting the load during peak usage while reducing greenhouse gas emissions. Solar driven refrigeration and air conditioning systems are a favorable technology due to the need for high refrigeration demand during times (daylight) when the availability of solar energy is maximum. Some applications require a high levels of cooling, and a single refrigeration unit is not known in the art to address such cooling levels.

Accordingly, it is one object of the present disclosure to provide systems and methods for solar energy powered refrigeration combined with an ice storage system which is operated in three cycles, that is, a solar energy cycle, a refrigeration cycle, and a cooling demand application to achieve a required temperature.

SUMMARY

According to one aspect of the present disclosure, a system is described which includes a solar-powered steam Rankine cycle (SRC) subsystem, an ejector refrigeration cycle (ERC) subsystem, an absorption refrigeration cycle (ARC) subsystem, a brine refrigeration cycle (BRC) subsystem, and an adsorption refrigeration cycle (ADRC) subsystem. The solar-powered SRC subsystem is configured to receive solar energy, convert the solar energy into thermal energy, and store the thermal energy. The ERC subsystem is configured to generate an electrical power based on the thermal energy and provide a first refrigeration effect with a first range of temperature based on the thermal energy. The ARC subsystem is configured to provide a second refrigeration effect with a second range of temperature based on the thermal energy. The BRC subsystem is configured to generate ice when there is no cooling demand and provide a third refrigeration effect with a third range of temperature based on the electrical power generated by the ERC subsystem and the ice being melted. The ADRC subsystem is configured to provide a fourth refrigeration effect with a fourth range of temperature based on the thermal energy.

In an aspect of the present disclosure, the SRC subsystem includes a central receiver (CR), a heat recovery vapor generator (HRVG), a hot molten salt storage tank, a cold molten salt storage tank, and a heat transfer fluid (HTF) pump. The CR is configured to receive the solar energy to heat cold molten salt flowing through the central receiver. The HRVG is configured to generate superheated steam for the ERC subsystem based on the heated molten salt and pass the heated molten salt to the ARC subsystem. A hot molten salt storage tank is configured to store the heated molten salt and pass the heated molten salt from the CR to the HRVG. The cold molten salt storage tank is configured to store the cold molten salt and pass the cold molten salt from the ADRC subsystem to the CR. The HTF pump is configured to pump the cold molten salt from the cold molten salt storage to the CR.

In an aspect of the present disclosure, the ERC subsystem includes a first evaporator (E1), a steam turbine (T), a steam ejector, a first condenser (C1), a first throttling valve (TV1), and a first pump (P1). The first evaporator (E1) is configured to provide the first refrigerant effect with the first range of temperature by evaporating water flowing through the first evaporator (E1) into water vapor. The steam turbine (T) is configured to generate the electrical power based on the superheated steam from the HRVG of the SRC subsystem. The steam ejector is configured to generate a mixture by mixing an exhaust from the steam turbine (T) and the water vapor from the first evaporator (E1). The first condenser (C1) is configured to cool the mixture from the steam ejector into the water. TA first throttling valve (TV1) is configured to pass a part of the water from the first condenser (C1) to the first evaporator (E1) and reduce a pressure of the part of the water to a pressure of the first evaporator (E1). The first pump (P1) is configured to pump the other part of the water from the first condenser (C1) to the HRVG of the SRC subsystem.

In an aspect of the present disclosure, the ARC subsystem includes a generator (G), a second condenser (C2), a second evaporator (E2), a second throttle valve (TV2), an absorber (A), a solution heat exchanger (SHX), a second pump (P2), a third throttling valve (TV3). The generator (G) is configured to pass the heated molten salt from the HRVG of the SRC subsystem to adsorption chambers of the ADRC subsystem; generate superheated water vapor refrigerant based on the heated molten salt flowing through the generator (G); and generate a strong solution based on a weak solution flowing into the generator (G). The second condenser (C2) is configured to generate saturated liquid refrigerant by cooling the superheated water vapor refrigerant from the generator (G). The second evaporator (E2) is configured to provide the second refrigeration effect with the second range of temperature by generating saturated water vapor based on the saturated liquid refrigerant from the second condenser (C2). The second throttle valve (TV2) is configured to pass the saturated liquid refrigerant from the second condenser (C2) to the second evaporator (E2) and reduce a pressure of the saturated liquid refrigerant to a pressure of the second evaporator (E2). The absorber (A) is configured to generate the weak solution by mixing the strong solution with the saturated water vapor from the second evaporator (E2). The solution heat exchanger (SHX) is configured to pre-heat the weak solution from the absorber (A); pass the pre-heated weak solution to the generator (G); and pre-cool the strong solution from the generator (G). The third throttling valve (TV3) configured to pass the pre-cooled strong solution from the solution heat exchanger (SHX) to the absorber (A) and reduce a pressure of the pre-cooled strong solution to a pressure of the absorber (A).

In an aspect of the present disclosure, the BRC subsystem includes a third evaporator (E3), a compressor (COM P), a third condenser (C3), a fourth throttling valve (TV4), and an ice storage system. The third evaporator (E3) is configured to provide the third refrigeration effect with the third range of temperature by evaporating liquid refrigerant flowing through the third evaporator (E3) into superheated refrigerant vapor. The compressor (COMP) is powered by the electrical power generated by the steam turbine of the ERC subsystem and is configured to generate high-pressure superheated refrigerant vapor by compressing the superheated refrigerant vapor from the third evaporator (E3). The third condenser (C3) is configured to cool the high-pressure superheated refrigerant vapor into the liquid refrigerant flowing to the third evaporator (E3). The fourth throttling valve (TV4) is configured to pass the liquid refrigerant from the third condenser (C3) to the third evaporator (E3) and reduce a pressure of the liquid refrigerant to a pressure of the third evaporator (E3). The ice storage system is configured to store the ice when there is no cooling demand and melt the ice when there is cooling demand.

In an aspect of the present disclosure, the ADRC subsystem includes two adsorption chambers (AC-1 and AC-2), a fourth evaporator (E4), and a fourth condenser (C4). The two adsorption chambers (AC-1 and AC-2) are configured to perform as adsorber and desorber alternatively and respectively. The fourth evaporator (E4) is configured to provide the fourth refrigerant effect with the fourth range of temperature by evaporating water flowing through the four evaporator (E4) into water vapor flowing to a first adsorption chamber of the two adsorption chambers performing as the absorber. The fourth condenser (C4) is configured to cool the water vapor from a second adsorption chamber of the two adsorption chambers performing as the desorber. The heated molten salt is cooled through the two adsorption chambers and returns to the cold molten salt storage tank of the SRC subsystem.

According to another aspect of the present disclosure, a system includes a solar-powered steam Rankine cycle (SRC) subsystem, an organic Rankine cycle (ORC) subsystem, an absorption refrigeration cycle (ARC) subsystem, a multi-effect desalination (MED) subsystem, a reverse osmosis (RO) desalination subsystem, and a hydrogen production subsystem. The SRC subsystem is configured to receive solar energy, convert the solar energy into thermal energy, and store the thermal energy. The ORC subsystem is configured to generate an electrical power based on the thermal energy. The ARC subsystem is configured to generate a refrigeration effect based on the thermal energy. The MED subsystem is configured to desalinate seawater to produce first desalinated water based on steam generated from the ORC subsystem. The RO desalination subsystem is configured to desalinate the seawater to produce second desalinated water based on the electrical power generated by the ORC subsystem. The hydrogen production subsystem is configured to produce hydrogen from the second desalinated water produced by the RO desalination subsystem.

In an aspect of the present disclosure, the SRC subsystem includes a central receiver (CR), a heat recovery vapor generator (HRVG), a hot molten salt storage tank, a cold molten salt storage tank, and a heat transfer fluid (HTF) pump (P1). The central receiver (CR) is configured to receive the solar energy to heat cold molten salt flowing through the CR. The heat recovery vapor generator (HRVG) is configured to generate superheated steam for the ORC subsystem based on the heated molten salt and pass the heated molten salt to the ARC subsystem. The hot molten salt storage tank is configured to store the heated molten salt and pass the heated molten salt from the CR to the HRVG. The cold molten salt storage tank is configured to store the cold molten salt and pass the cold molten salt from the ARC subsystem to the CR. The heat transfer fluid (HTF) pump (P1) is configured to pump the cold molten salt from the ARC subsystem to the cold molten salt storage tank.

In an aspect of the present disclosure, the ORC subsystem includes a high-pressure turbine (HPT), a low-pressure turbine (LPT), a steam ejector (EJE), a first condenser (C1), a heat exchanger (HX), a third pump (P3), and a fourth pump (P4). The high-pressure turbine (HPT) is configured to generate a first part of the electrical power based on the superheated steam from the HRVG of the SRC subsystem. The low-pressure turbine (LPT) is configured to generate a second part of the electrical power based on the superheated steam from the HRVG of the SRC subsystem. The steam ejector (EJE) is configured to generate a mixture by mixing an exhaust from the high-pressure turbine (HPT) and vapor from the MED subsystem; and pass the mixture to the MED subsystem. The first condenser (C1) is configured to condense steam from a turbine (T) of the ORC subsystem into water. The heat exchanger (HX) is configured to generate condensate based on exhaust steam from the low-pressure turbine (LPT) and generate steam based on the water from the first condenser (C1). The third pump (P3) is configured to pump the condensate from the heat exchanger (HX) to the HRVG of the SRC subsystem. The fourth pump (P4) is configured to pump the cooled water from the first condenser (C1) to the heat exchanger (HX). The turbine (T) is configured to generate a third part of the electrical power based on the steam from the heat exchanger (HX).

In an aspect of the present disclosure, the ARC subsystem includes a generator (G), a second condenser (C2), a first evaporator (E1), a first throttle valve (TV1), an absorber (A), a solution heat exchanger (SHX), a fifth pump (P5), and a second throttling valve (TV2). The generator (G) is configured to pass the heated molten salt from the HRVG to the cold molten salt storage tank of the SRC subsystem; generate superheated water vapor refrigerant based on the heated molten salt flowing through the generator (G); and generate a strong solution based on a weak solution flowing into the generator (G). The second condenser (C2) is configured to generate saturated liquid refrigerant by cooling the superheated water vapor refrigerant from the generator (G). The first evaporator (E1) is configured to provide the refrigeration effect by generating saturated water vapor based on the saturated liquid refrigerant from the second condenser (C2). The first throttle valve (TV1) is configured to pass the saturate liquid refrigerant from the second condenser (C2) to the first evaporator (E1) and reduce a pressure of the saturated liquid refrigerant to a pressure of the first evaporator (E1). The absorber (A) is configured to generate the weak solution by mixing the strong solution with the saturated water vapor from the first evaporator (E1). The solution heat exchanger (SHX) is configured to pre-heat the weak solution from the absorber (A); pass the pre-heated weak solution to the generator (G); and pre-cool the strong solution from the generator (G). The fifth pump (P5) is configured to pump the weak solution from the absorber (A) to the SHX. The second throttling valve (TV2) is configured to pass the pre-cooled strong solution from the SHX to the absorber (A) and reduce a pressure of the pre-cooled strong solution to a pressure of the absorber (A).

In an aspect of the present disclosure, the MED subsystem includes a third condenser (C3) and a second pump (P2). The third condenser (C3) is configured to heat and forward the seawater to a first evaporation effect of a plurality of evaporation effects. In an aspect of the present disclosure, the plurality of evaporation effects is configured to produce the first desalinated water from the heated seawater, where the first evaporation effect is driven by the mixture from the steam ejector of the ORC subsystem. The second pump (P2) is configured to pump condensate from the first evaporation effect to the HRVG of the SRC subsystem.

In an aspect of the present disclosure, the RO desalination subsystem includes a high-pressure pump (P6) configured to pump seawater to a semi-permeable RO membrane that demineralizes the seawater to produce the second desalinated water.

In an aspect of the present disclosure, the hydrogen production subsystem includes a proton exchange membrane (PEM) electrolyzer, a hydrogen compressor, a hydrogen storage tank, and an oxygen storage tank. The proton exchange membrane (PEM) electrolyzer is configured to produce hydrogen and oxygen through a water separation process of the second desalinated water from the RO membrane of the RO desalination subsystem. The hydrogen compressor is configured to compress and cool the hydrogen, the hydrogen storage tank is configured to store the compressed hydrogen, and the oxygen storage tank is configured to store the produced oxygen. The high-pressure pump (P6) is powered by the second part of the electrical power generated by the low-pressure turbine (LPT) of the ORC subsystem and both the PEM electrolyzer and the hydrogen compressor are powered by the third part of the electrical power generated by the turbine (T) of the ORC subsystem.

According to yet another aspect of the present disclosure, a system includes a solar-powered steam Rankine cycle (SRC) subsystem, an absorption refrigeration cycle (ARC) subsystem, a multi-effect desalination (MED) subsystem, a trans critical refrigeration cycle (TRC) subsystem, and a freezing desalination (FRD) subsystem. The SRC subsystem is configured to receive solar energy, convert the solar energy into thermal energy, and store the thermal energy. The ARC subsystem is configured to provide a first refrigeration effect with a first range of temperature based on the thermal energy. The MED subsystem is configured to desalinate seawater to produce first desalinated water based on the thermal energy and generate an electrical power based on the thermal energy. The TRC subsystem is configured to store ice when there is no cooling demand and provide a second refrigeration effect with a second range of temperature based on the electrical energy generated by the MED subsystem and the ice being melted. The FRD subsystem is configured to desalinate the seawater to produce second desalinated water based the ice in the TRC subsystem being melted.

In an aspect of the present disclosure, the SRC subsystem includes a central receiver (CR), a heat recovery vapor generator (HRVG), a hot molten salt storage tank, a cold molten salt storage tank, and a heat transfer fluid (HTF) pump (P1). The CR is configured to receive the solar energy to heat cold molten salt flowing through the central receiver. The HRVG is configured to generate superheated steam for the MED subsystem based on the heated molten salt and pass the heated molten salt to the ARC subsystem. The hot molten salt storage tank is configured to store the heated molten salt and pass the heated molten salt from the CR to the HRVG. The cold molten salt storage tank is configured to store the cold molten salt and pass the cold molten salt from the ARC subsystem to the CR. The heat transfer fluid (HTF) pump (P1) is configured to pump the cold molten salt from the ARC subsystem to the cold molten salt storage tank.

In an aspect of the present disclosure, the ARC subsystem includes a generator (G), a first condenser (C1), a first evaporator (E1), a first throttle valve (TV1), an absorber (A), a solution heat exchanger (SHX), a third pump (P3), and a third throttling valve (TV3). The generator (G) is configured to pass the heated molten salt from the HRVG to the cold molten salt storage tank of the SRC subsystem; generate superheated water vapor refrigerant based on the heated molten salt flowing through the generator (G); and generate a strong solution based on a weak solution flowing into the generator (G). The first condenser (C1) is configured to generate saturated liquid refrigerant by cooling the superheated water vapor refrigerant from the generator (G). The first evaporator (E1) is configured to provide the first refrigeration effect with the first range of temperature by generating saturated water vapor based on the saturated liquid refrigerant from the first condenser (C1). The first throttle valve (TV1) is configured to pass the saturate liquid refrigerant from the first condenser (C1) to the first evaporator (E1) and reduce a pressure of the saturated liquid refrigerant to a pressure of the first evaporator (E1). The absorber (A) is configured to generate the weak solution by mixing the strong solution with the saturated water vapor from the first evaporator (E1). The solution heat exchanger (SHX) is configured to pre-heat the weak solution from the absorber (A), pass the pre-heated weak solution to the generator (G), and pre-cool the strong solution from the generator (G). The third pump (P3) is configured to pump the weak solution from the absorber (A) to the SHX. The third throttling valve (TV3) is configured to pass the pre-cooled strong solution from the SHX to the absorber (A) and reduce a pressure of the pre-cooled strong solution to a pressure of the absorber (A).

In an aspect of the present disclosure, the MED subsystem includes a steam turbine (T), a steam ejector (EJE), a second condenser (C2), and a second pump (P2). The steam turbine (T) is configured to generate the electrical power based on the superheated steam from the HRVG of the SRC subsystem. The steam ejector (EJE) is configured to generate a mixture by mixing an exhaust from the steam turbine (T) and vapor from the MED subsystem and pass the mixture to the MED subsystem. The second condenser (C2) is configured to heat and forward seawater to a first evaporation effect of a plurality of evaporation effects. The plurality of evaporation effects is configured to produce fresh water from the heated seawater, where the first evaporation effect is driven by the mixture from the steam ejector (EJE). The second pump (P2) is configured to pump condensate from the first evaporation effect to the HRVG of the SRC subsystem.

In an aspect of the present disclosure, the TRC subsystem includes a second evaporator (E2), an internal heat exchanger (IHX), a compressor (COMP), a third condenser (C3), a second throttling valve (TV2), and an ice storage system. The second evaporator (E2) is configured to provide the second refrigeration effect with the second range of temperature by generating refrigerant vapor. The internal heat exchanger (IHX) is configured to generate superheated refrigerant vapor by evaporating liquid droplets of the refrigerant vapor from the second evaporator (E2). The compressor (COM P) is powered by the electrical power generated from the steam turbine of the MED subsystem and is configured to generate high-pressure superheated refrigerant vapor by compressing the superheated refrigerant vapor from the internal heat exchanger (IHX). The third condenser (C3) is configured to cool the high-pressure superheated refrigerant vapor to saturated liquid refrigerant by melting ice in the FRD subsystem. The second throttling valve (TV2) is configured to pass the saturated liquid refrigerant to the second evaporator (E2) and reduce a pressure of the saturated liquid refrigerant to a pressure of the second evaporator (E2). The ice storage system is configured to build the ice when there is no cooling demand and melt the ice when there is cooling demand.

In an aspect of the present disclosure, the FRD subsystem includes a washer configured to separate ice and brine that are transported from the ice storage tank of the TRC subsystem; and a fourth condenser (C4) configured to pre-cool seawater through a product fresh water steam from an ice melter and discharged brine steam from the washer.

In an aspect of the present disclosure, the MED subsystem is configured to operate in one of parallel feed configuration, forward feed configuration, backward feed configuration, and parallel/cross flow feed configuration.

These and other aspects of non-limiting embodiments of the present disclosure will become apparent to those skilled in the art upon review of the following description of specific non-limiting embodiments of the disclosure in conjunction with the accompanying drawings.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Figure 1A:
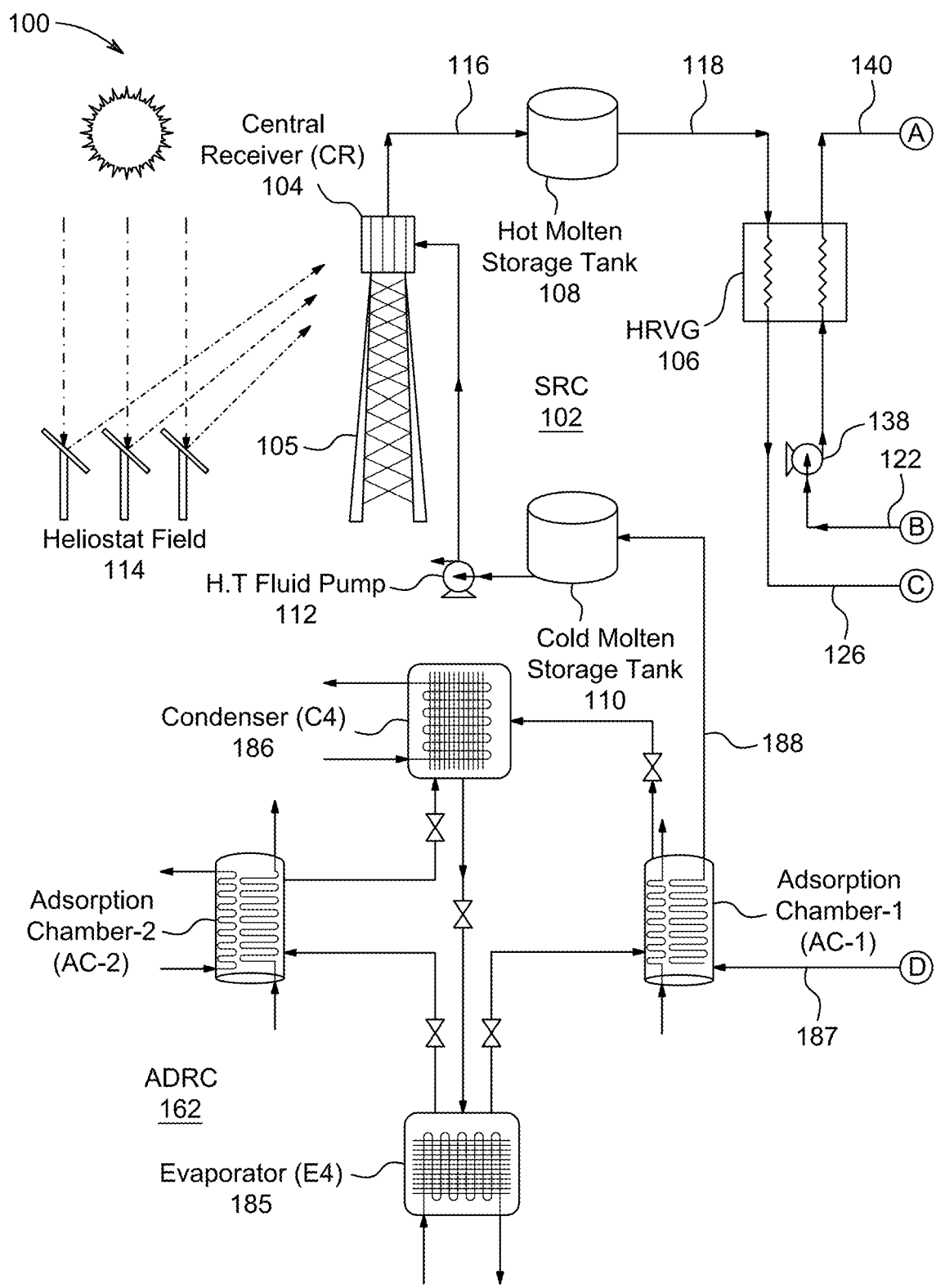
FIG. 1A-C illustrates an exemplary schematic diagram of a system, according to an aspect of the present disclosure.

In the following description, it is understood that other embodiments may be utilized, and structural and operational changes may be made without departure from the scope of the present embodiments disclosed herein.

Reference will now be made in detail to specific embodiments or features, examples of which are illustrated in the accompanying drawings. Wherever possible, corresponding, or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a multi-effect thermodynamic cycle driven by solar power, which may produce a refrigeration output at different levels of temperature. The multi-effect thermodynamic cycle may provide cooling for air conditioning (10° C. to 20° C.), refrigeration for food preservation (2° C. to 9° C.), for vegetable and meat storage (1° C. to 5° C.), freezing for pharmaceutical plants and vaccine (−60° C. to −80° C.).

Figure 1B:
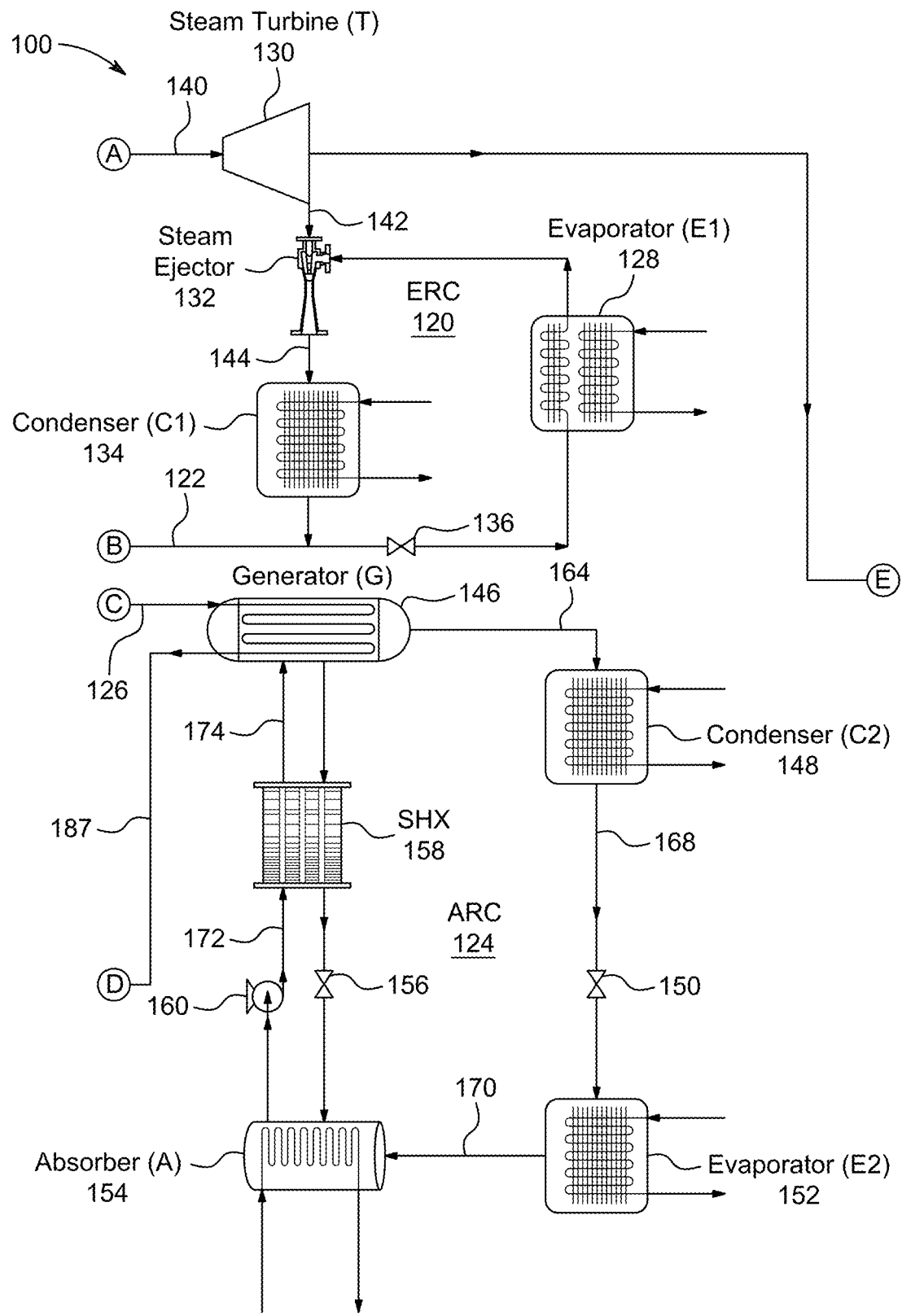
Figure 1C:
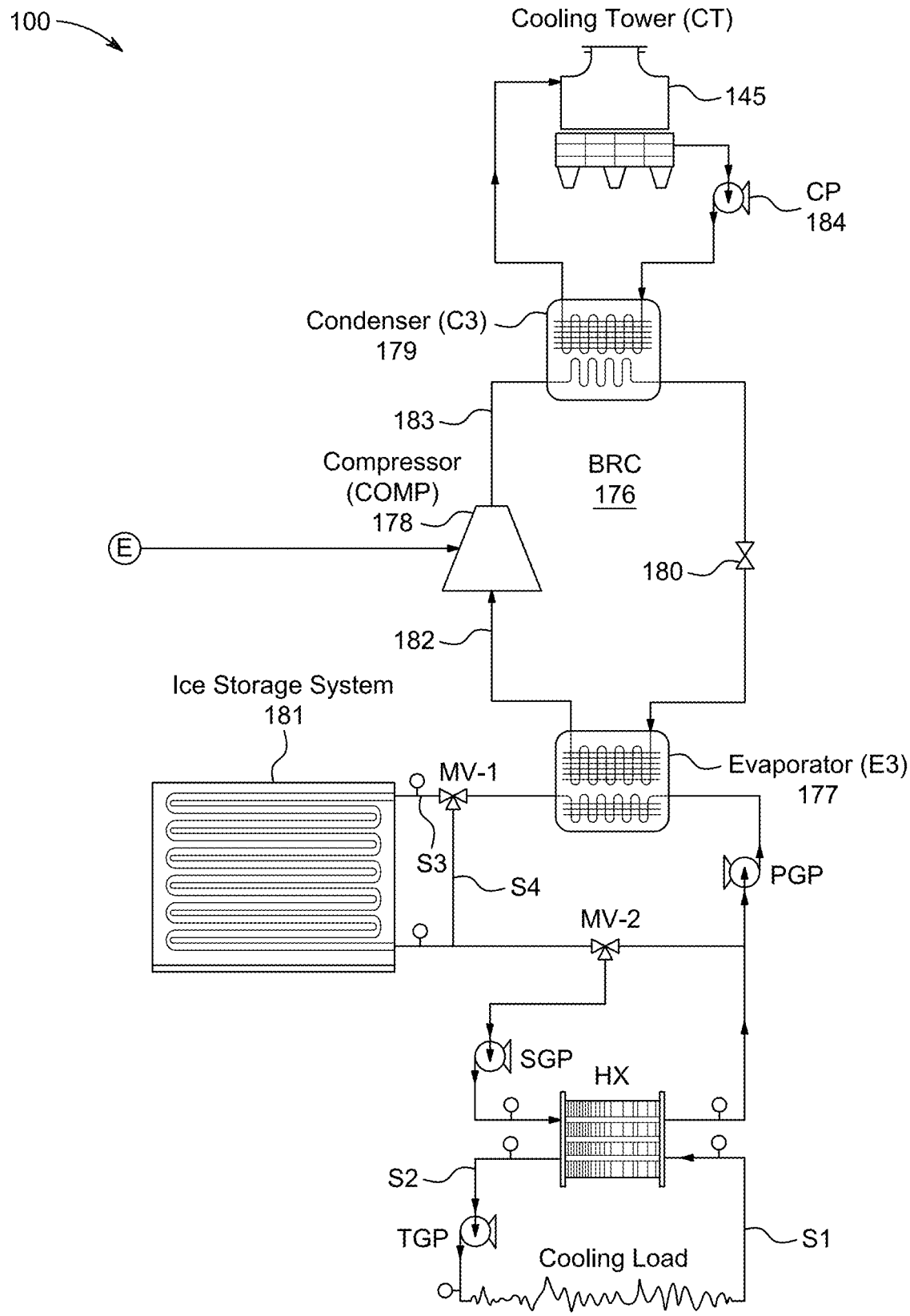

FIG. 1A-C illustrates an exemplary schematic diagram of a system 100, according to an embodiment of the present disclosure. The system 100 includes a solar-powered steam Rankine cycle (SRC) subsystem 102 (hereinafter referred to as "the SRC subsystem 102") configured to receive solar energy, convert the solar energy into thermal energy, and store the thermal energy. The SRC 102 includes a central receiver (CR) 104 fixed on a solar tower 105, a heat recovery vapor generator (HRVG) 106, a hot molten salt storage tank 108, a cold molten salt storage tank 110, and a heat transfer fluid (HTF) pump 112. Solar radiation incident on a heliostat field 114 is reflected to the CR 104. In an aspect of the present disclosure, the CR 104 is configured to: (a) allow flow of cold molten salt from the cold molten storage tank 110 therethrough and (b) receive the reflected solar radiation to heat the cold molten salt flowing through the CR 104.

The hot molten salt storage tank 108 is connected between the CR 104 and the HRVG 106. As shown in FIG. 1A-C, the hot molten salt storage tank 108 is connected to the CR 104 via a flow path 116 and to the HRVG 106 via a flow path 118. The heated molten salt is pumped from the CR 104 to the hot molten salt storage tank 108 via the flow path 116. The hot molten salt storage tank 108 is configured to store the heated molten salt and pass the heated molten salt to the HRVG 106 via the flow path 118. At the HRVG 106, configuration of the HRVG 106 allows transfer of heat between the heated molten salt and water flowing therethrough. In an aspect of the present disclosure, the HRVG 106 is configured to generate superheated steam based on the heated molten salt. The HRVG 106 is connected to an ejector refrigeration cycle (ERC) subsystem 120 (hereinafter referred to as "the ERC subsystem 120") via a flow path 122 and to an absorption refrigeration cycle (ARC) subsystem 124 (hereinafter referred to as "the ARC subsystem 124") via a flow path 126. The ERC subsystem 120 receives the generated superheated steam from the HRVG 106 via the flow path 122 and the heated molten salt is passed by the HRVG 104 to the ARC subsystem 124 via the flow path 126.

In an aspect of the present disclosure, The ERC subsystem 120 includes a first evaporator (E1) 128, a steam turbine (T) 130, a steam ejector 132, a first condenser (C1) 134, a first throttling valve (TV1) 136, and a first pump (P1) 138. The ERC subsystem 120 is configured to generate an electrical power based on the thermal energy received from the SRC subsystem 102 and provide a first refrigeration effect with a first range of temperature based on the thermal energy. The superheated steam generated by the HRVG 106 is supplied to the steam turbine (T) 130 via a flow path 140. The steam turbine (T) 130 is configured to generate the electrical power based on an expansion of the superheated steam received from the HRVG 106. The first evaporator (E1) 128 is configured to provide the first refrigerant effect with the first range of temperature by evaporating water flowing through the first evaporator (E1) 128 into water vapor.

An exit path 142 of the steam turbine (T) 130 is connected to the steam ejector 132. An exhaust from the steam turbine (T) 130 passes through the steam ejector 132 via the exit path 142 and creates a high vacuum pressure that draws the water vapor generated by the first evaporator (E1) 128, thereby aiding the first refrigerant effect of the ERC subsystem 120. The steam ejector 132 is configured to generate a mixture by mixing the exhaust from the steam turbine (T) 130 and the water vapor from the first evaporator (E1) 128. The mixture flows to the first condenser (C1) 134 via a flow path 144. The first condenser (C1) 134 is configured to cool the mixture into the water. In an aspect of the present disclosure, a condenser fluid may be cooled by cold water supplied from a cooling tower 145. An outlet of the first condenser (C1) 134 branches to join the flow path 122 on one side and the first throttling valve (TV1) 136 on the other side as shown in FIG. 1A-C.

The first throttling valve (TV1) 136 is configured to pass a first volume of the water from the first condenser (C1) 134 to the first evaporator (E1) 128 and reduce a pressure of the part of the water to a pressure of the first evaporator (E1) 128. The first pump (P1) 138 is configured to pump a second volume of the water from the first condenser (C1) 134 to the HRVG 106 of the SRC subsystem 102. The water entering into the HRVG 106 is heated by the molten salt flowing through the HRVG 106 to convert into the superheated steam which further flows into the steam turbine (T).

In an aspect of the present disclosure, The ARC subsystem 124 is configured to provide a second refrigeration effect with a second range of temperature based on the thermal energy. The ARC subsystem 124 includes a generator (G) 146, a second condenser (C2) 148, a second throttle valve (TV2) 150, a second evaporator (E2) 152, an absorber (A) 154, a third throttling valve (TV3) 156, a solution heat exchanger (SHX) 158, and a second pump (P2) 160. The generator (G) 146 receives the heated molten salt from the HRVG 106 via the flow path 126. The generator (G) 146 is configured to pass the heated molten salt from the HRVG 106 to adsorption chambers of an adsorption refrigeration cycle (ADRC) subsystem 162 (hereinafter referred to as the "ADRC 162 subsystem"). The generator (G) 146 is further configured to generate superheated water vapor refrigerant based on the heated molten salt flowing therethrough and generate a strong solution based on a weak solution flowing therein. The second condenser (C2) 148 is connected to the generator (G) 146 via a flow path 164 and is configured to generate saturated liquid refrigerant by cooling the superheated water vapor refrigerant received from the generator (G) 146.

Heat rejected by the superheated water vapor refrigerant in the second condenser (C2) 148 is cooled by water supplied from the cooling tower 145. The second evaporator (E2) 152 is connected to the second condenser (C2) 148 via a flow path 168, where the second throttle valve (TV2) 150 is connected on the flow path 168. The second throttle valve (TV2) 150 is configured to pass the saturated liquid refrigerant from the second condenser (C2) 148 to the second evaporator (E2) 152 and reduce a pressure of the saturated liquid refrigerant to a pressure of the second evaporator (E2) 152. The second evaporator (E2) 152 is configured to provide the second refrigeration effect with the second range of temperature by generating saturated water vapor based on the saturated liquid refrigerant from the second condenser (C2) 148.

The saturated water vapor absorbs heat from the second evaporator (E2) and flows to the absorber (A) 154 that is connected to the second evaporator (E2) 152 via a flow path 170. The absorber (A) 154 is configured to generate the weak solution by mixing the strong solution with the saturated water vapor. The weak solution is pumped from the absorber (A) 154 to the solution heat exchanger (SHX) 158 by the second pump (P2) 160 via a flow path 172. The solution heat exchanger (SHX) 158 is configured to pre-heat the weak solution from the absorber (A) 154, pass the pre-heated weak solution to the generator (G) 146 via a flow path 174, and pre-cool the strong solution from the generator (G) 146. In one aspect, the strong solution received by the solution heat exchanger (SHX) 158 from the generator (G) 146 may be LiBr—$H_2O$ solution. The third throttling valve (TV3) 156 is configured to reduce a pressure of the pre-cooled strong solution from the solution heat exchanger (SHX) 158 to a pressure of the absorber (A) 154 and pass the pre-cooled strong solution to the absorber (A) 154. In an aspect of the present disclosure, temperature of the absorber (A) 154 may be maintained at 35° C. and at a pressure equal to a pressure of the second evaporator (E2) 152.

The system 100 also includes a brine refrigeration cycle (BRC) subsystem 176 (hereinafter referred to as "the BRC subsystem 176"). The BRC subsystem 176 is configured to build and store ice when there is no cooling demand and provide a third refrigeration effect with a third range of temperature based on the electrical power generated by the ERC subsystem 120 and the ice being melted. In an aspect of the present disclosure, the BRC subsystem 176 includes a third evaporator (E3) 177, a compressor (COMP) 178, a third condenser (C3) 179, a fourth throttling valve (TV4) 180, and an ice storage system 181. The third evaporator (E3) 177 is configured to provide the third refrigeration effect with the third range of temperature by evaporating liquid refrigerant flowing through the third evaporator (E3) 177 into superheated refrigerant vapor. In an aspect of the present disclosure, $N_2O$ may be used in the BRC subsystem 176 to provide a very low-temperature range and the third refrigeration effect that can be used for deep freezing applications in a range of −50° C. to −80° C. The compressor (COMP) 178 is powered by the electrical power generated from the steam turbine (T) 130 of the ERC subsystem 120 and is connected to the third evaporator (E3) 177 via a flow path 182. The compressor (COMP) 178 is configured to generate high-pressure superheated refrigerant vapor by compressing the superheated refrigerant vapor from the third evaporator (E3) 177.

The third condenser (C3) 179 is connected to the compressor (COMP) 178 via a flow path 183. The third condenser (C3) 179 is configured to receive the high-pressure superheated refrigerant vapor (such as the superheated N 20 refrigerant vapor) and cool the high-pressure superheated refrigerant vapor into the liquid refrigerant flowing to the third evaporator (E3) 177. In an aspect of the present disclosure, the third condenser (C3) 179 may be cooled by the water supplied from the cooling tower 145. The water for cooling may be circulated between the cooling tower 145 and the third condenser (C3) 179 via a condenser pump (CP) 184. The fourth throttling valve (TV4) 180 is configured to reduce a pressure of the liquid refrigerant to a pressure of the third evaporator (E3) 177 and pass the liquid refrigerant from the third condenser (C3) 179 to the third evaporator (E3) 177. The third refrigeration effect in the third evaporator (E3) 177 is achieved by evaporating $N_2O$ refrigerant.

The ice storage system 181 is configured to build the ice when there is no cooling demand and melt the ice when there is cooling demand. In an aspect of the present disclosure, the stored thermal energy of the ice storage system 181 may be used to meet changing cooling load demands from a state "S1" to a state "S2" (see FIG. 1A-C). During peak-time and in case of grid outages, the stored thermal energy in the ice storage system 181 from a state "S3" to a state "S4" will continue to cool a building adding an increased level of redundancy. The ice will be melted when there is cooling demand and a secondary glycol pump (SGP) is started. A melt-out cycle may begin as the hot water comes from the building (corresponding to the state "S1") and passes through a heat exchanger (HX) to get converted to cold chilled water (corresponding to the state "S2") that circulates through a tertiary glycol pump (TGP) to meet a required cooling load. It may be observed that there is no direct contact between the melting ice and the hot return water which is cooled indirectly in the heat exchanger (HX) by melting ice.

Table 1 below illustrates operation modes of the BRC subsystem 176 with the ice storage system 181. The modes are Cooling-Ice with BRC, Cooling-BRC only, Cooling-Ice Only, Ice-Build, and Ice-Build with Cooling.

TABLE 1

Sequence of Operation of Brine Refrigeration and Ice Storage System

| Operation Mode | BRC | PPG | SGP | MV-1 | MV-2 |
|---|---|---|---|---|---|
| Cooling-Ice with BRC | On | On | On | Variable | Y1-Y2 |
| Cooling-BRC Only | On | On | On | X1-X3 | Y1-Y2 |
| Cooling-Ice Only | Off | On | On | Variable | Y1-Y2 |
| Ice Build | On | On | Off | X1-X2 | Y1-Y3 |
| Ice Build with Cooling | On | On | On | X1-X2 | Variable |

In an aspect, a sequence of operation and modulation of motorized valves MV-1 and MV-2 (see FIG. 1A-C) depends on a temperature at the state "S1". The BRC subsystem 176 with ice storage may operate based on the modes provided in the Table-1. A combined system (that is, the BRC subsystem 176 with ice storage) may provide cooling through BRC subsystem 176 only. Therefore, in this mode, the BRC, PGP, and SGP shall be ON, and a circulation fluid is passed through three ports in MV-1 as the chilled water will bypass through the state "S4" and two ports port in MV-2 where the chilled water will pass to the SGP and then to the HX.

In an aspect of the present disclosure, the system 100 may provide cooling through the BRC subsystem 176 and the stored ice. In this mode, the BRC, PGP, and SGP shall be ON, and the circulation of the fluid is modulated in MV-1 to balance the load from the BRC subsystem 176 and Ice storage and allow the fluid to pass through two ports in MV-2.

In another aspect of the present disclosure, cooling may be provided through the ice storage system 181. In this mode, the BRC subsystem 176 is switched OFF, and the PGP and the SGP shall be ON while the circulation of the fluid is allowed through the three ports in MV-1 and the two ports in MV-2.

In yet another aspect of the present disclosure, the combined BRC subsystem 176 with ice storage may generate and store only during the night and part-load operation. In this mode, the BRC subsystem 176 and the PGP shall be running and the pump SGP is switched OFF. The circulation of the fluid is allowed through the two ports in MV-1 and three ports in MV-2 as the chilled water is passed to PGP and then returned to third evaporator (E3) 177. In yet another embodiment, the combined BRC subsystem 176 with ice storage may generate and store and provide cooling at the same time. In this mode, the BRC, the PGP, and the SGP shall be running, and the circulation of the fluid is allowed through the two ports in MV-1 and modulated in MV-2 according to required cooling demand.

According to an aspect of the present disclosure, working fluids selected for the system 100 are environmentally safe and show excellent thermodynamic properties. The working fluids are chemically stable, and do not show a toxic, explosive, or corrosive effect. Additionally, the working fluids exhibit zero ozone depletion potential (ODP), very low global warming potential (GWP), and are available at a low initial and operational cost.

TABLE 2

Multi-Effect Refrigeration Cycle Working Fluids.

| | Cycle | Working Fluid | Temperature Range (° C.) |
|---|---|---|---|
| | Power Cycle | | |
| 1. | Steam Rankine cycle With Solar tower (SRC). | Molten Salt (a mixture of sodium nitrate & potassium nitrate). | 290~565 |
| 2. | Steam Rankine cycle with HRVG. | Water ($H_2O$). | |
| | Multi-Effect Refrigeration Cycle | | |
| 1. | Ejector Refrigeration Cycle (ERC) | Water ($H_2O$). | 1-5 |
| 2. | Brine Refrigeration cycle (BRC) | Nitrous Oxide ($N_2O$). | −50 to −80 |
| 3. | Absorption Refrigeration Cycle (ARC) | Lithium bromide is the absorbent, and water is the refrigerant (LiBr—$H_2O$). | 10 to 20 |
| 4. | Adsorption Refrigeration Cycle (ADRC) | Zeolite 13X/$CaCl_2$ | 2 to 9 |

In an aspect of the present disclosure, In an aspect of the present disclosure, the ADRC subsystem 162 includes two adsorption chambers AC-1 and AC-2, a fourth evaporator (E4) 185, and a fourth condenser (C4) 186. The ADRC subsystem 162 is configured to provide a fourth refrigeration effect with a fourth range of temperature based on the thermal energy. As described earlier, the generator (G) 146 is configured to pass the heated molten salt from the HRVG 106 of the SRC subsystem 102 to the adsorption chambers of the ADRC subsystem 162. Specifically, the heated molten salt flows from the generator (G) 146 to the adsorption chamber AC-1 via flow path 187 to regenerate sorbent. Subsequently, the molten salt flows to the cold molten storage tank 110 via a flow path 188. The cold molten storage tank 110 is configured to store the cold molten salt and pass the cold molten salt to the CR 104. The HTF pump 112 is configured to pump the cold molten salt from the cold molten salt storage tank 110 to the CR 104. As described above, the cold molten salt is heated by the solar radiation incident on the CR 104. Solar thermal energy is stored in the two tanks to maintain continuous operation when solar energy is not available.

In an aspect, two adsorption chambers AC-1 and AC-2 are configured to perform as adsorber and desorber alternatively. For example, sorption elements in adsorption chambers AC-1 and AC-2 may function in a first stage as adsorber and desorber and will alternate cyclically in a second stage of operation. The fourth evaporator (E4) 185 is configured to provide the fourth refrigerant effect with the fourth range of temperature by evaporating water flowing therethrough into water vapor flowing to a first adsorption chamber AC-1 of the two adsorption chambers performing as the absorber. The fourth condenser (C4) 186 is configured to cool the water vapor from a second adsorption chamber AC-2 of the two adsorption chambers performing as the desorber. In an aspect, the heated molten salt is cooled through the two adsorption chambers and returns to the cold molten salt storage tank 110 of the SRC subsystem 102.

In an aspect of the present disclosure, the first adsorption chamber AC-1 may be cooled by water from the cooling tower 145. In an example, Zeolite may be used as the sorbent to absorb the water vapor generated by the fourth evaporator (E4) 185. The second adsorption chamber AC-2 may be configured to heat the hot water flowing from the generator (G) 146 and resulting water vapor may flow to the fourth condenser (C4) 186. Condensed water associated with high pressure flows to the fourth evaporator (E4) 185 after attaining a pressure equal to that of a pressure of the fourth evaporator (E4) 185. In an aspect of the present disclosure, a system of nozzles may spray the water onto tubes of chilled water at the fourth evaporator (E4) 185.

Simultaneously, water vapor flowing from the fourth evaporator (E4) 185 to the first adsorption chamber AC-1 passes through an open valve GV1. In order to ensure the flow of water vapor towards the first adsorption chamber AC-1, the pressure inside the first adsorption chamber AC-1 needs to be lower than that of the fourth evaporator (E4) 185. Therefore, in some embodiments, the first adsorption chamber AC-1 may be pre-cooled by cold water supplied from the cooling water 145. Such cooling may be required to remove the heat added to the first adsorption chamber AC-1 by the adsorption process. When the adsorbent in the first adsorption chamber AC-1 is saturated with the water vapor, function of the first adsorption chamber AC-1 is switched.

In a switched process, the first adsorption chamber AC-1 and the second adsorption chamber AC-2 function as desorber and adsorber, respectively. In the switched process, valves GV1 and GV4 are closed, and valves GV2 and GV3 are open. However, pressure in each of the first adsorption chamber AC-1 and the second adsorption chamber AC-2 may need to be modified prior to the switch over. For the purpose, the second adsorption chamber AC-2 is cooled by a coolant and the first adsorption chamber AC-1 is heated through the hot molten salt from the SRC subsystem 102, and all valves are actuated to closed positions. The heated molten salt is cooled through the two adsorption chambers AC-1 and AC-2 and returns to the cold molten salt storage tank 110 of the SRC subsystem 102.

To this end, the system 100 represents an integration of multi-refrigeration cycles driven by one source of energy (such as the solar energy) to exploit solar energy effectively and to produce a cooling effect in different magnitude and temperature ranges for air conditioning application, refrigeration, and deep freezing, in an efficient and environment-friendly manner. It is apparent from the above description that a high-temperature solar energy source like a solar tower is utilized to produce power using high-temperature availability while supplying the required thermal energy to applications that require low or medium temperature sources, like absorption and adsorption cycle. Owing to the storage of the thermal energy, requirement of any auxiliary energy source is eliminated. As such, the cooling effect may be achieved during absence of the solar energy. The system 100 may be capable of meeting cooling demand for following application and temperature ranges:

(a) food preservation (2-9° C.) by the ADRC subsystem 162;
(b) air conditioning application (10-20° C.) by the ARC subsystem 124;
(c) deep freezing for vaccine preservation (−50° C. to −80° C.) by the BRC subsystem 176; and
(d) vegetable and meat storage (1-5° C.) by the ERC subsystem 120.

The system 100 may be implemented at any existing facility where a maximum cooling load is much greater than an average load with limited electric power availability. With the presence of the ice storage system 181, the system 100 may be effective for process loads that are not well-matched with an available energy source. As such, extra cooling capacity may be addressed by the ice storage system 181 based on a cooling demand. Additionally, the ice storage system 181 is effective for systems with time-dependent energy costs. The ice will be produced during low electricity tariff period (that is during night-time) and will be stored for usage throughout a day. The system 100 eliminates use of a generator required for backup energy as the ice storage system 181 is capable of storing the required thermal energy instead of using an electrical power generator.

A combination of the ice storage system 181 and the use of solar energy for air cooling purposes renders the system 100 unique in the field of air-conditioning and refrigeration. The ice storage system 181 may aid in reducing energy consumption by the system 100 by taking advantage of lower energy prices and low ambient conditions to produce refrigeration effect with a high-energy performance by using electricity at night instead of producing cooling at peak daytime hours. A cooling production at night leads to large energy savings and may lower peak electrical demand by 50%. Additionally, the ice storage system 181 leads to low temperature of chilled water which may need smaller pumps, thereby further reducing the power consumption by the system 100.

The ice storage system 181 also needs a lower flow rate due to a large temperature gradient, such as a range of 10° C. instead of traditional 5.5° C. Such reduction in water flow rate leads to reduce component size of the system 100, pumping power, and initial cost significantly.

In an aspect of the present disclosure, an option of integrating waste energy heat source may be provided albeit with minor modifications to the system 100 to achieve continuous operation in case of long periods of low solar radiation, such as during cloudy winter days.

Figure 2A:
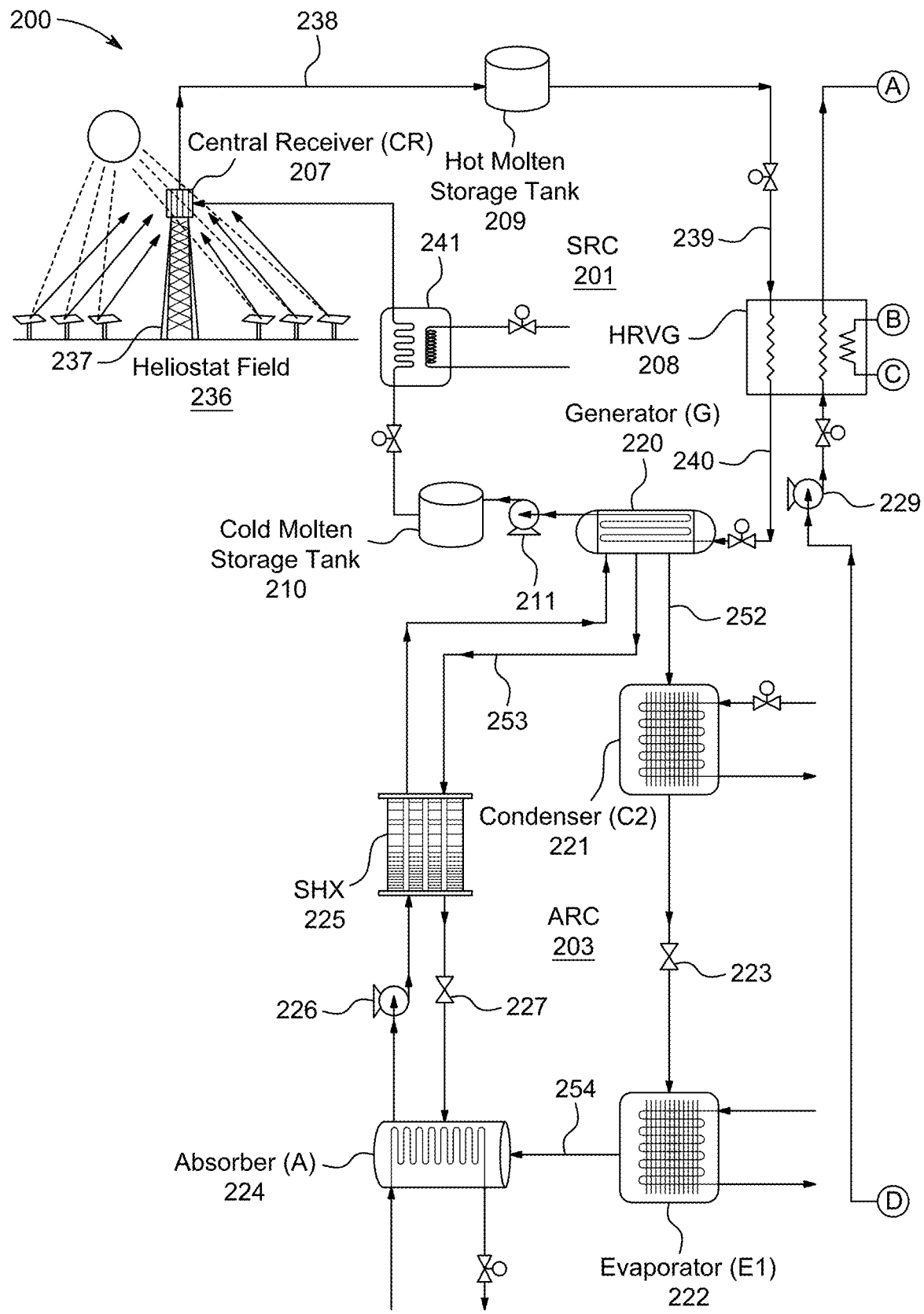
FIG. 2A-C illustrates a forward feed configuration of the system, according to an aspect of the present disclosure.
Figure 2B:
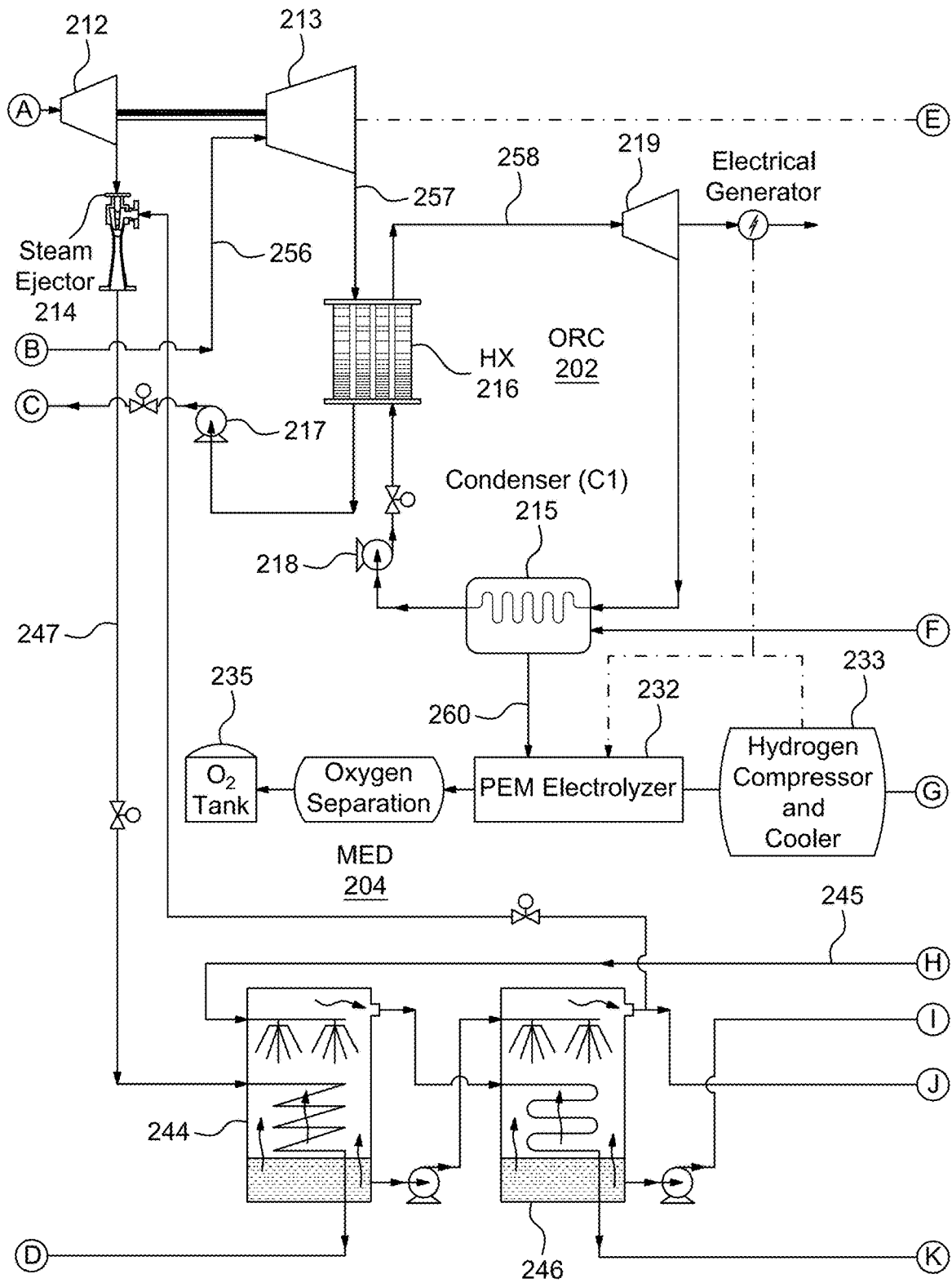
Figure 2C:
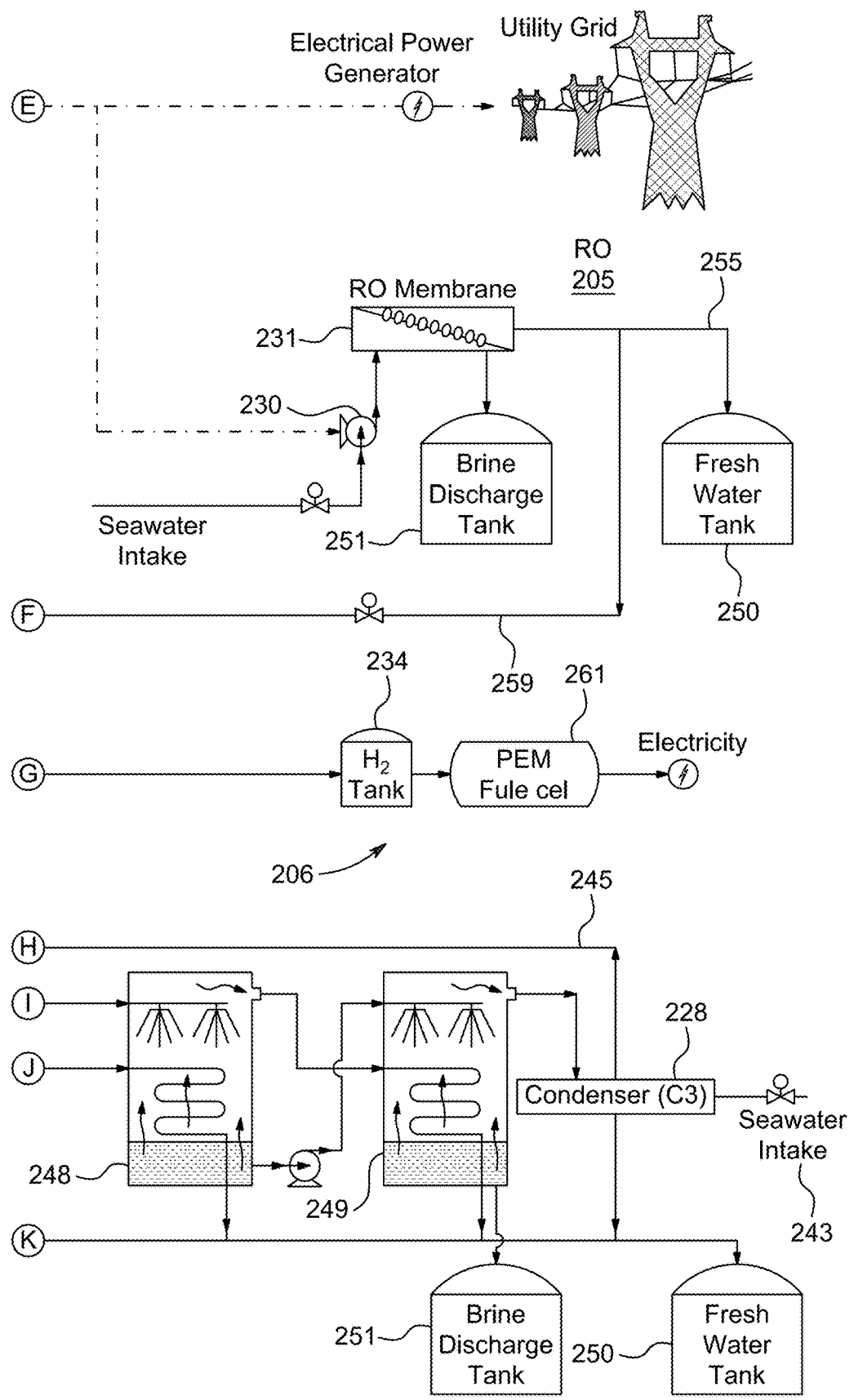

In an aspect of the present disclosure, the SRC subsystem 102 may be integrated with an electric power generator (see FIG. 2A-C) that is connected to a utility grid (see FIG. 2A-C). In cases where the electrical energy generated by the steam turbine (T) 130 is more than a load required by the BRC subsystem 176, the extra electrical energy may be exported to the utility grid. In an aspect of the present disclosure, a control panel (not shown) may be implemented in the system 100 to determine availability of the excess electrical energy which may be routed to the utility grid.

In an aspect of the present disclosure, a control valve may be provided at the HRVG 106 with a bypass line connected to the generator (G) 146. Such arrangement may allow modulation of the flow of molten salt depending on the cooling demand at the ARC subsystem 124 and the A DRC subsystem 162 compared to the cooling demand at the ERC subsystem 120 and the BRC subsystem 176. Thus, when the cooling demand is low at the ERC subsystem 120 and the BRC subsystem 176, a part of the molten salt may be bypassed directly to the ARC subsystem 124 and the ADRC subsystem 162 to increase an output cooling effect.

The system 100 may reduce electrical distribution therein, such as transformers, motor control center, power panel, switchgear, switchboard, power cables, wire sizes, and soft starter panels.

FIG. 2A-C illustrates an exemplary schematic diagram of a system 200, according to an embodiment of the present disclosure. The system 200 includes a solar-powered steam Rankine cycle (SRC) subsystem 201 (hereinafter referred to as "the SRC subsystem 201") configured to receive solar energy, convert the solar energy into thermal energy, and store the thermal energy. The system 200 also includes an organic Rankine cycle (ORC) subsystem 202 (hereinafter referred to as "the ORC subsystem 202") configured to generate an electrical power based on the thermal energy, an absorption refrigeration cycle (ARC) subsystem 203 (hereinafter referred to as "the ARC subsystem 203") configured to generate a refrigeration effect based on the thermal energy, a multi-effect desalination (MED) subsystem 204 (hereinafter referred to as "the MED subsystem 204") configured to desalinate seawater to produce first desalinated water based on steam generated from the ORC subsystem 202, a reverse osmosis (RO) desalination subsystem 205 (hereinafter referred to as "the RO subsystem 205") configured to desalinate the seawater to produce second desalinated water based on the electrical power generated by the ORC subsystem 202, and a hydrogen production subsystem 206 configured to produce hydrogen from the second desalinated water produced by the RO desalination subsystem 205.

In an aspect, the SRC subsystem 201 includes a central receiver (CR) 207, a heat recovery vapor generator (HRVG) 208, a hot molten salt storage tank 209, a cold molten salt storage tank 210, and a heat transfer fluid (HTF) pump (P1) 211. The CR 207 is configured to receive the solar energy to heat cold molten salt flowing therethrough. The heat recovery vapor generator (HRVG) 208 is configured to generate superheated steam for the ORC subsystem 202 based on the heated molten salt and pass the heated molten salt to the ARC subsystem 203. The hot molten salt storage tank 209 is configured to store the heated molten salt and pass the heated molten salt from the CR 207 to the HRVG 208. The cold molten salt storage tank 210 is configured to store the cold molten salt and pass the cold molten salt from the ARC subsystem 203 to the CR 207. The heat transfer fluid (HTF) pump (P1) 211 is configured to pump the cold molten salt from the ARC subsystem 203 to the cold molten salt storage tank 210.

In an aspect of the present disclosure, the ORC subsystem 202 includes a high-pressure turbine (HPT) 212, a low-pressure turbine (LPT) 213, a steam ejector (EJE) 214, a first condenser (C1) 215, a heat exchanger (HX) 216, a third pump (P3) 217, and a fourth pump (P4) 218. The high-pressure turbine (HPT) 212 is configured to generate a first part of the electrical power based on the superheated steam from the HRVG 208 of the SRC subsystem 201. The low-pressure turbine (LPT) 213 is configured to generate a second part of the electrical power based on the superheated steam from the HRVG 208. The steam ejector (EJE) 214 is configured to generate a mixture by mixing an exhaust from the high-pressure turbine (HPT) 212 and vapor from the MED subsystem 204; and pass the mixture to the MED subsystem 204. The first condenser (C1) 215 is configured to condense steam from a turbine (T) 219 of the ORC subsystem 202 into water. The heat exchanger (HX) 216 is configured to generate condensate based on exhaust steam from the low-pressure turbine (LPT) 213 and generate steam based on the water from the first condenser (C1) 215. The third pump (P3) 217 is configured to pump the condensate from the heat exchanger (HX) 216 to the HRVG 208 of the SRC subsystem 201. The fourth pump (P4) 218 is configured to pump the cooled water from the first condenser (C1) 215 to the heat exchanger (HX) 216. The turbine (T) 219 is configured to generate a third part of the electrical power based on the steam from the heat exchanger (HX) 216.

In an aspect of the present disclosure, the ARC subsystem 203 includes a generator (G) 220, a second condenser (C2) 221, a first evaporator (E1) 222, a first throttle valve (TV1) 223, an absorber (A) 224, a solution heat exchanger (SHX) 225, a fifth pump (P5) 226, and a second throttling valve (TV2) 227. The generator (G) 220 is configured to pass the heated molten salt from the HRVG 208 to the cold molten salt storage tank 210 of the SRC subsystem 201; generate superheated water vapor refrigerant based on the heated molten salt flowing through the generator (G) 220; and generate a strong solution based on a weak solution flowing into the generator (G) 220. The second condenser (C2) 221 is configured to generate saturated liquid refrigerant by cooling the superheated water vapor refrigerant from the generator (G) 220. The first evaporator (E1) 222 is configured to provide the refrigeration effect by generating saturated water vapor based on the saturated liquid refrigerant from the second condenser (C2) 221. The first throttle valve (TV1) 223 is configured to pass the saturate liquid refrigerant from the second condenser (C2) 221 to the first evaporator (E1) 222 and reduce a pressure of the saturated liquid refrigerant to a pressure of the first evaporator (E1) 222. The absorber (A) 224 is configured to generate the weak solution by mixing the strong solution with the saturated water vapor from the first evaporator (E1) 222. The solution heat exchanger (SHX) 225 is configured to pre-heat the weak solution from the absorber (A) 224; pass the pre-heated weak solution to the generator (G) 220; and pre-cool the strong solution from the generator (G) 220. The fifth pump (P5) 226 is configured to pump the weak solution from the absorber (A) 224 to the solution heat exchanger (SHX) 225. The second throttling valve (TV2) 227 is configured to pass the pre-cooled strong solution from the solution heat exchanger (SHX) 225 to the absorber (A) 224 and reduce a pressure of the pre-cooled strong solution to a pressure of the absorber (A) 224.

In an aspect of the present disclosure, the MED subsystem 204 includes a third condenser (C3) 228 and a second pump (P2) 229. The third condenser (C3) 228 is configured to heat and forward the seawater to a first evaporation effect of a plurality of evaporation effects. In an aspect of the present disclosure, the plurality of evaporation effects is configured to produce the first desalinated water from the heated seawater, where the first evaporation effect is driven by the mixture from the steam ejector of the ORC subsystem 202. The second pump (P2) 229 is configured to pump condensate from the first evaporation effect to the HRVG 208.

In an aspect of the present disclosure, the RO subsystem 205 includes a high-pressure pump (P6) 230 configured to pump seawater to a semi-permeable RO membrane 231 that demineralizes the seawater to produce the second desalinated water.

In an aspect of the present disclosure, the hydrogen production subsystem 206 includes a proton exchange membrane (PEM) electrolyzer 232, a hydrogen compressor 233, a hydrogen storage tank 234, and an oxygen storage tank 235. The proton exchange membrane (PEM) electrolyzer 232 is configured to produce hydrogen and oxygen through a water separation process of the second desalinated water from the semi-permeable RO membrane 231 of the RO subsystem 205. The hydrogen compressor 233 is configured to compress and cool the hydrogen, the hydrogen storage tank 234 is configured to store the compressed hydrogen, and the oxygen storage tank 235 is configured to store the produced oxygen. The high-pressure pump (P6) 230 is powered by the second part of the electrical power generated by the low-pressure turbine (LPT) 213 of the ORC subsystem 202 and both the PEM electrolyzer 232 and the hydrogen compressor 233 are powered by the third part of the electrical power generated by the turbine (T) 219 of the ORC subsystem 202.

In operation of the system 200, solar radiation incident on a heliostat field 236 is reflected to the CR 207 that is fixed on a solar tower 237. Thermal energy from the reflected solar radiation is used to heat the cold molten salt contained in the CR 207. In an aspect of the present disclosure, the cold molten salt may be heated to a temperature of about 565° C. In an aspect of the present disclosure, the CR 207 may be coated with a selective coating to minimize reflectivity, thereby improving absorption performance. The heated molten salt flows from the CR 207 to the hot molten salt storage tank 209 via a flow path 238. The heated molten salt may be stored by the hot molten salt storage tank 209 and may be subsequently passed to the HRVG 208 via a flow path 239. Heat transfer between the heated molten salt and the water occurs at the HRVG 208, where superheated steam is generated for the ORC subsystem 202. The generated superheated steam is used to drive the high-pressure turbine (HPT) 212. The molten salt, after the heat transfer at the HRVG 208, flows to the generator (G) 220 via a flow path 240. The molten salt is then pumped to the cold molten salt storage tank 210 by the HTF pump (P1) 211. Further, the molten salt at a temperature of about 350° C. is used for process heating 241, where the temperature of the molten salt is reduced is about 290° C. before the molten salt is allowed to flow to the CR 207 via a flow path 242. Solar energy is stored in two tanks to aid continuous operation of the system 200 during unavailability of the solar energy.

The high-pressure turbine (HPT) 212 and the low-pressure turbine (LPT) 213 are configured to convert the available thermal energy to the first part of the electrical power and the second part of the electrical power, respectively. The superheated steam generated at the HRVG 208 is expanded in the high-pressure turbine (HPT) 212. An exhaust from the high-pressure turbine (HPT) 212 passes to the steam ejector (EJE) 214 and creates a high vacuum pressure that causes drawing of vapor from the MED subsystem 204. The steam ejector (EJE) 214 generates the mixture by mixing the vapor from the MED subsystem 204 and the exhaust from the high-pressure turbine (HPT) 212 and passes the mixture to the first evaporation effect (Effect-1) 244 of the MED subsystem 204. FIG. 2A-C also illustrates a forward feed configuration of the MED subsystem 204, among other configurations.

At the MED subsystem 204, feed seawater 243 enters the third condenser (C3) 228 to be pre-heated. The feed seawater 243 then flows to the first evaporation effect (Effect-1) 244 via a flow path 245 and is sprayed in the first evaporation effect (Effect-1) 244 as shown in FIG. 2A-C. The mixture from the steam ejector (EJE) 214 drives the evaporation of the feed seawater 243 in the first evaporation effect (Effect-1) 244. Upon providing required energy for the evaporation, the mixture is condensed, and the condensate is pumped to the HRVG 208 by the second pump (P2) 229. The steam ejector (EJE) 214 is actuated by the exhaust from the high-pressure turbine (HPT) 212 and entrains a portion of formed vapor from the second evaporation effect (Effect-2) 246. The steam ejector (EJE) 214 is configured to compress the entrained vapor by the exhaust from the high-pressure turbine (HPT) 212 to reach a desired temperature and pressure along a flow path 247.

Further, vapor formed in the first evaporation effect (Effect-1) 244 from the evaporation of the feed seawater 243 is supplied to the second evaporation effect (Effect-2) 246 to drive the evaporation therein. Remainder of the feed seawater 243 which is not evaporated collects a bottom of the first evaporation effect (Effect-1) 244 and is pumped to the second evaporation effect (Effect-2) 246 as shown in FIG. 2A-C. Similarly, vapor formed in the second evaporation effect (Effect-2) 246 is used to drive the evaporation in the third evaporation effect (Effect-3) 248, the vapor formed in the third evaporation effect (Effect-3) 248 is used to drive the evaporation in the fourth evaporation effect (Effect-4) 249, and remainder of the feed seawater 243 in respective evaporation effects is pumped into a subsequent evaporation effect. The vapor formed in the fourth evaporation effect (Effect-4) 249 is supplied to the third condenser (C3) 228, where the vapor heats the feed seawater 243. Upon heating, the vapor is condensed in the third condenser (C3) 228 and is collected in a fresh water tank 250. Remainder of the feed seawater 243 from the fourth evaporation effect (Effect-4) 249 is collected in a brine discharge tank 251.

In the forward feed configuration, both brine stream and heating vapor stream flow in a same direction from the first evaporation effect (Effect-1) 244 to the fourth evaporation effect (Effect-4) 249. Hence, the first evaporation effect (Effect-1) 244 operates at a lowest salinity and at a highest temperature. The pressure in the evaporation effects decreases in the flow direction. Each evaporation effect contains heat exchange tubes, vapor space, undiluted feed seawater spray nozzles, mist eliminator, and a last evaporation effect has the brine discharge tank 251. In each of the second evaporation effect (Effect-2) 246 and the third evaporation effect (Effect-3) 248, condensed vapors that run through the heat exchange tubes flow into the fresh water tank 250.

In the ARC subsystem 203, the hot molten salt flowing to the generator (G) 220 via the flow path 240 provides thermal energy to separate the weak solution of LiBr—H$_2$O into the superheated water 252 and the strong solution 253. The superheated water 252 is cooled in the second condenser (C2) 221. In an aspect, cooling water may be supplied to the second condenser (C2) 221 from a cooling tower (not shown). A saturated liquid (obtained after cooling of the superheated water 252) exiting the second condenser (C2) 221 flows through the first throttle valve (TV1) 223, where pressure of the saturated liquid is reduced to a pressure equal to that of the first evaporator (E1) 222. The saturated liquid is evaporated in the first evaporator (E1) 222, thereby providing the first refrigeration effect. Further, saturated water vapor 254 from the first evaporator (E1) 222 flows to the absorber (A) 224.

The strong solution 253 from the generator (G) 220 is pre-cooled in the solution heat exchanger (SHX) 225 and flows to the second throttling valve (TV2) 227, where pressure of the strong solution 253 is reduced to a pressure of the absorber (A) 224. In an aspect of the present disclosure, the absorber (A) 224 may be maintained at 35° C. and at a pressure of the first evaporator (E1) 222. The saturated water vapor 254 from the first evaporator (E1) 222 is mixed with the strong solution 253 at the absorber (A) 224 to form a weak solution (LiBr—H$_2$O) that is pumped to the solution heat exchanger (SHX) 225 by the fifth pump (P5) 226. The weak solution is pre-heated before flowing into the generator (G) 220.

Further, power generated by the low-pressure turbine (LPT) 213 is supplied as power input to the high-pressure pump (P6) 230 of the RO subsystem 205. In an aspect, the RO subsystem 205 operates by using the high-pressure pump (P6) 230 to increase pressure on a high-salinity side of the RO membrane 231. Water is pumped by the high-pressure pump (P6) 230 through the RO membrane 231, where the water stream carrying concentrated contaminants (having about 99% of dissolved solids) is collected in the brine discharge tank 251. Here, for the purpose of brevity, it is assumed that the brine discharge tank 251 of the MED subsystem 204 is same for the RO subsystem 205, and hence referenced with the same reference numeral. Desalinated water (water stream passing through the RO membrane 231) is demineralized and is referred to as permeate water 255.

In an aspect of the present disclosure, superheated steam 256 is supplied from the HRVG 208 to the low-pressure turbine (LPT) 213, where the superheated steam 256 is expanded. Exhaust steam 257 exiting the low-pressure turbine (LPT) 213 flows to the heat exchanger (HX) 216, where the exhaust steam 257 is condensed. The condensate is pumped by the third pump (P3) 217 from the heat exchanger (HX) 216 to the HRVG 208, where the condensate is subjected to heating by the heated molten salt flowing through the HRVG 208.

In the ORC subsystem 202, condensed water from the first condenser (C1) 215 is pumped fourth pump (P4) 218 to the heat exchanger (HX) 216, where the condensed water is heated by the exhaust steam 257 to form steam 258 that is supplied to the turbine (T) 219. The steam 258 is expanded in the turbine (T) 219 and recondensed in the first condenser (C1) 215. Energy generated by the turbine (T) 219 is used to drive electrochemical reaction of the electrolysis process in the PEM electrolyzer 232, where a water separation process is carried out to produce hydrogen and oxygen. In an aspect of the present disclosure, freshwater 259 from the RO subsystem 205 may be used for production of the hydrogen. For example, the freshwater 259 (branching from the permeate water 255) flows to the first condenser (C1) 215, where the freshwater 259 is heated to a temperature of the PEM electrolyzer 232 by the exhaust from the turbine (T) 219. The heated freshwater 259 enters the PEM electrolyzer 232 through a flow path 260.

The produced hydrogen is compressed in a four-stage compressor with an intercooler, such as the hydrogen compressor 233, to make it suitable for storage. Energy generated by the turbine (T) 219 is also used to drive the hydrogen compressor 233. In the electrolysis process, hydrogen ions leave a cathode of the PEM electrolyzer 232, thereby dissipating heat. Hence, the produced hydrogen is cooled by the intercooler to an ambient temperature. The hydrogen is then stored in the hydrogen storage tank 234. In an aspect of the present disclosure, the hydrogen may be stored at 507 kPa and 85° C. in the hydrogen storage tank 234. The stored hydrogen is used to produce electric power required to address the additional cooling and freshwater demand. The stored hydrogen is used in PEM fuel cells 261 to produce the additional power. The hydrogen production rate may be modulated according to the available solar energy resulting in a highly efficient, cost-effective, relatively high productivity with a least impact on the environment. The oxygen produced at an anode of the PEM electrolyzer 232 may be stored in the oxygen storage tank 235 for medical use or oxy-fuel combustion requirements.

Further, the MED subsystem 204 may be configured to operate in multiple configurations, such as the forward feed configuration as described with respect to FIG. 2A-C, a parallel feed configuration, a parallel/cross flow feed configuration, and a backward feed configuration.

Figure 3A:
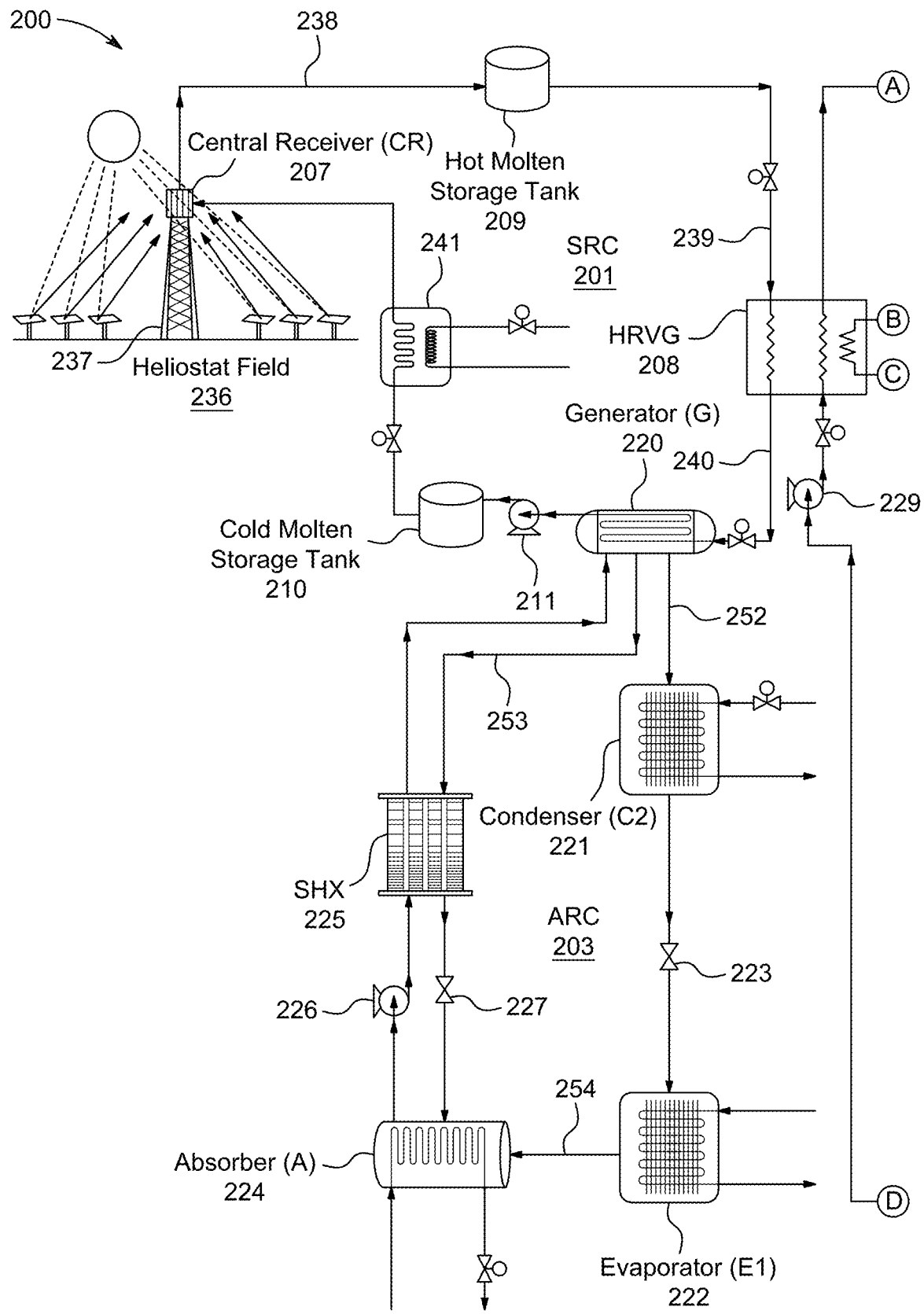
FIG. 3A-C illustrates a parallel feed configuration of the system, according to an aspect of the present disclosure.
Figure 3B:
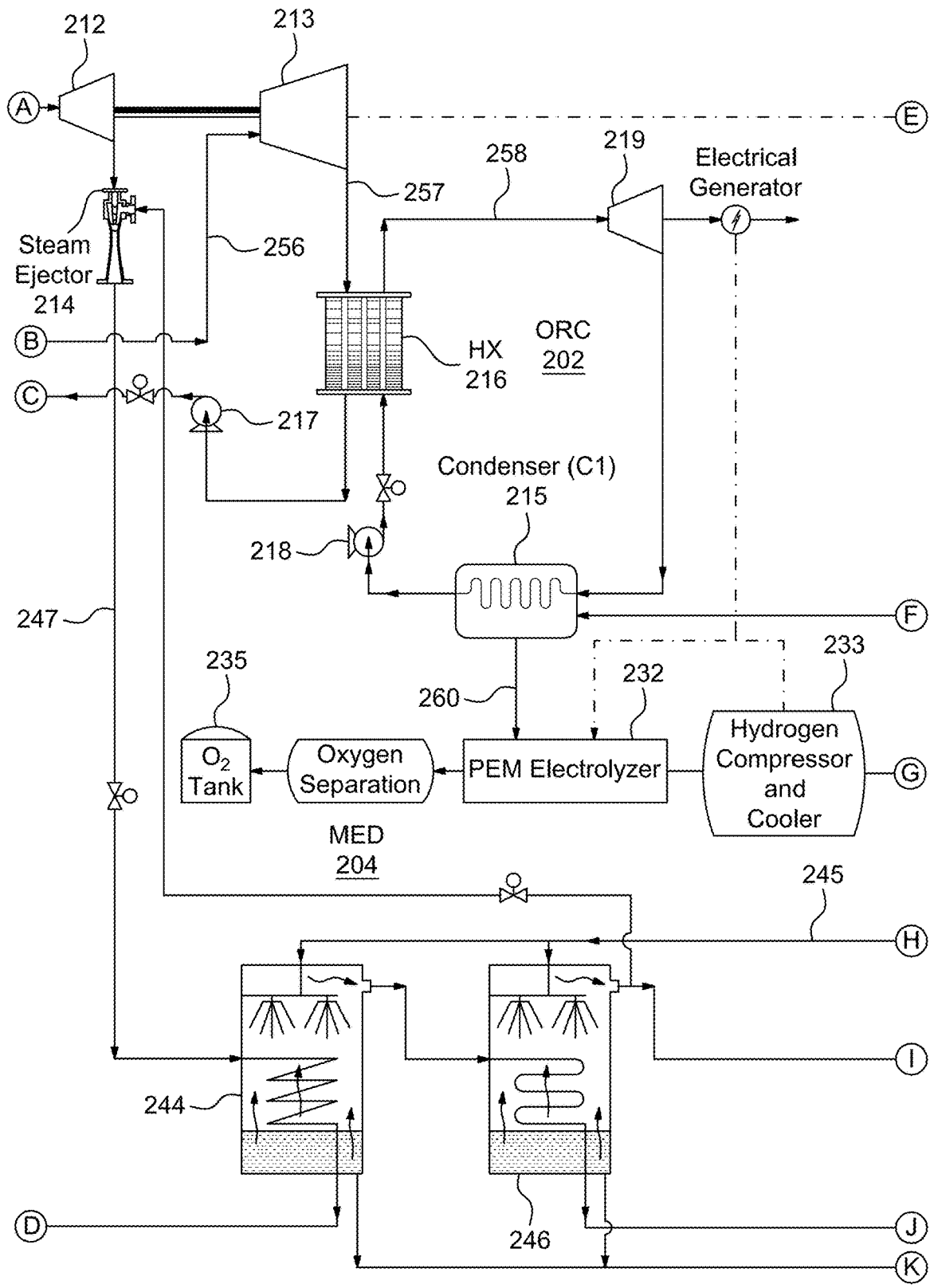
Figure 3C:
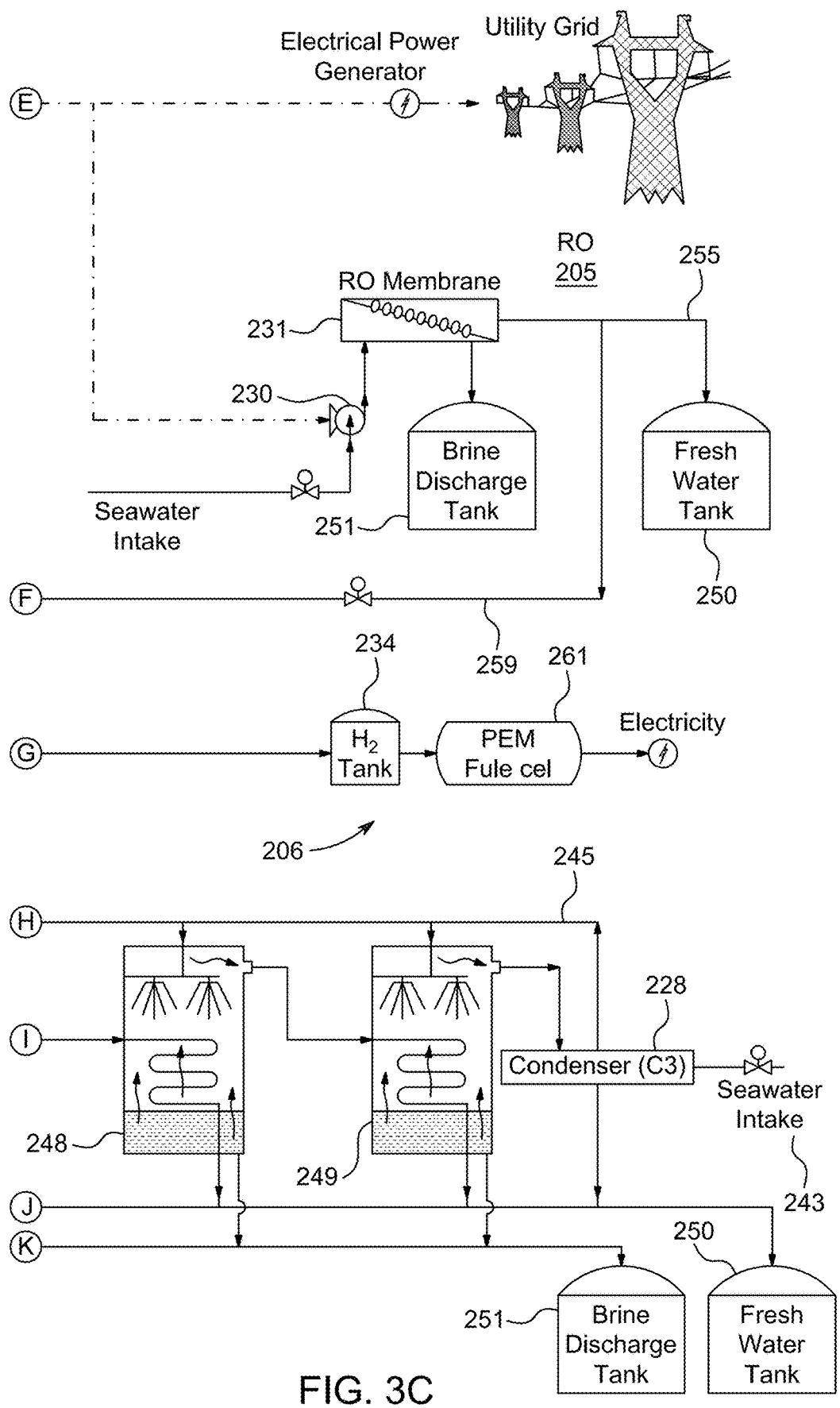

FIG. 3A-C illustrates the parallel feed configuration of the MED subsystem 204 of the system 200, according to an embodiment of the present disclosure. Except for an arrangement in the MED subsystem 204, description of the operation of other subsystems remains the same in FIG. 3A-C, and hence same reference numerals have been used. In the parallel feed configuration, the feed seawater 243 is preheated in the third condenser (C3) 228 and is equally distributed in a perpendicular direction to the first evaporation effect (Effect-1) 244, the second evaporation effect (Effect-2) 246, the third evaporation effect (Effect-3) 248, and the fourth evaporation effect (Effect-4) 249. The vapor formed in the first evaporation effect (Effect-1) 244 is passed to the second evaporation effect (Effect-2) 246 to evaporate the feed seawater 243, the vapor formed in the second evaporation effect (Effect-2) 246 is passed to the third evaporation effect (Effect-3) 248 to evaporate the feed seawater 243, and the vapor formed in the third evaporation effect (Effect-3) 248 is passed to the fourth evaporation effect (Effect-4) 249 to evaporate the feed seawater 243. Non-evaporated amount of the feed seawater 243 from each evaporation effect flows to the brine discharge tank 251 and condensed vapor from each evaporation effect (except the first evaporation effect (Effect-1) 244) flows to the fresh water tank 250.

Figure 4A:
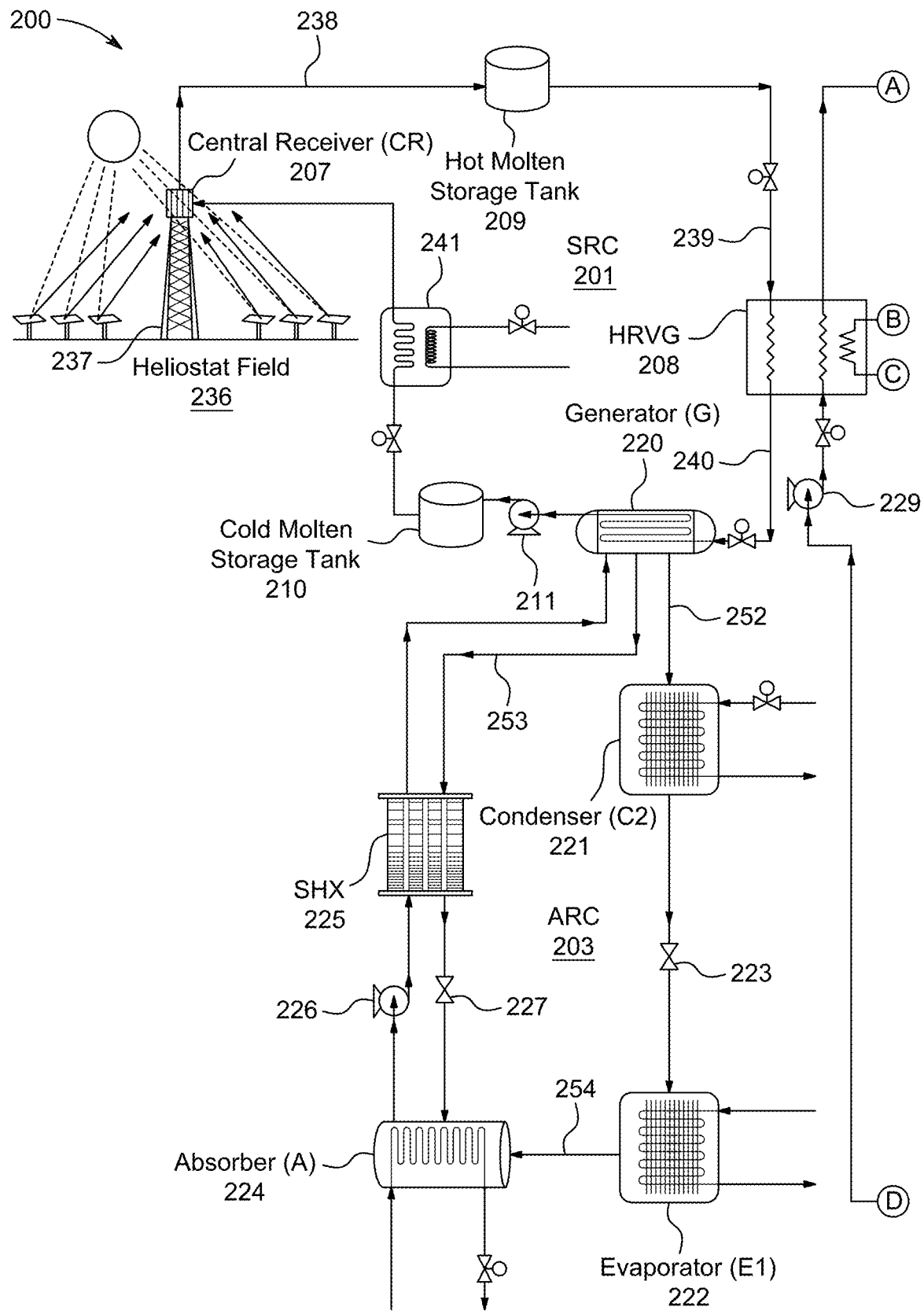
FIG. 4A-C illustrates a parallel/cross flow feed configuration of the system, according to an aspect of the present disclosure.
Figure 4B:
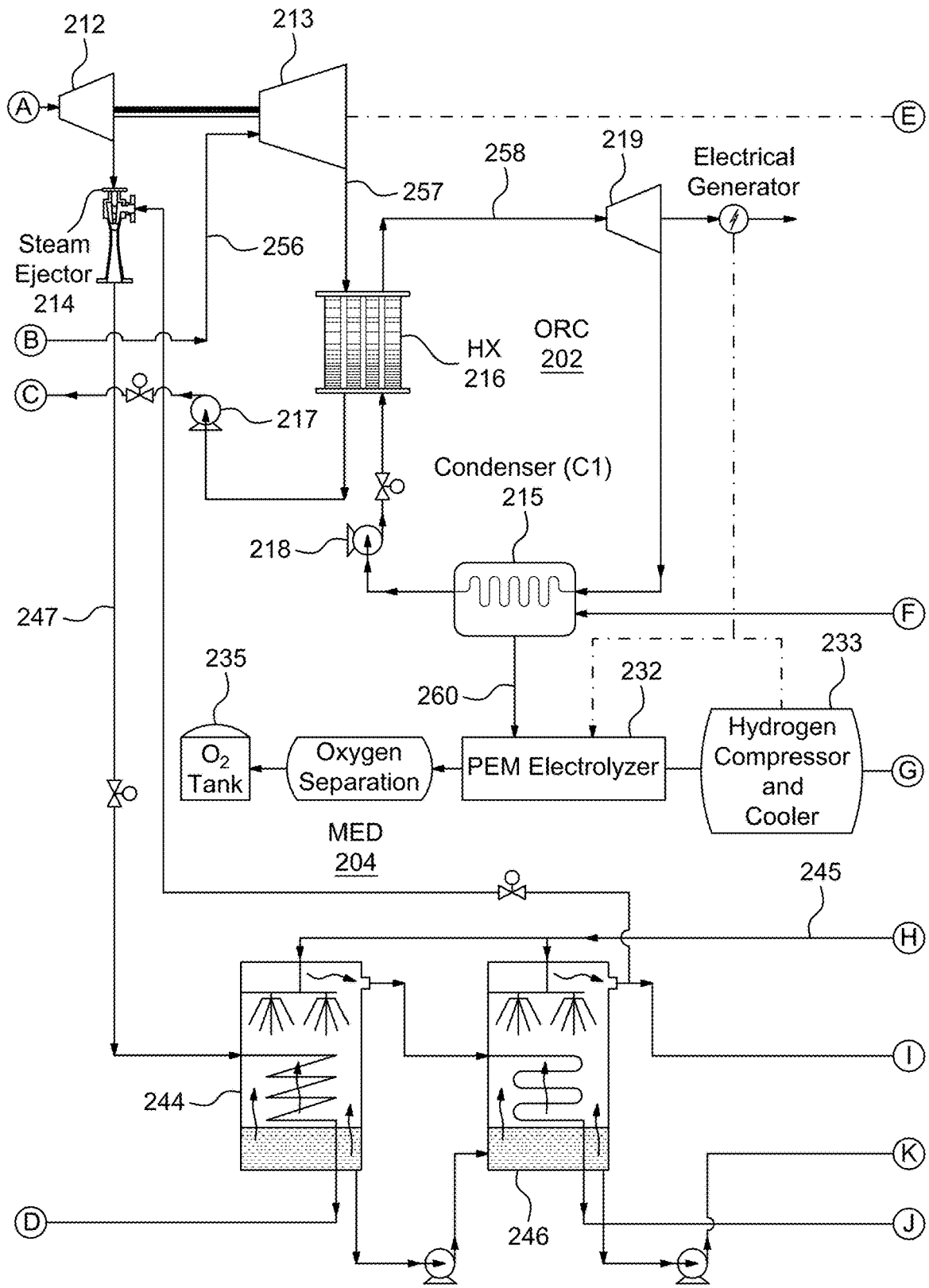
Figure 4C:
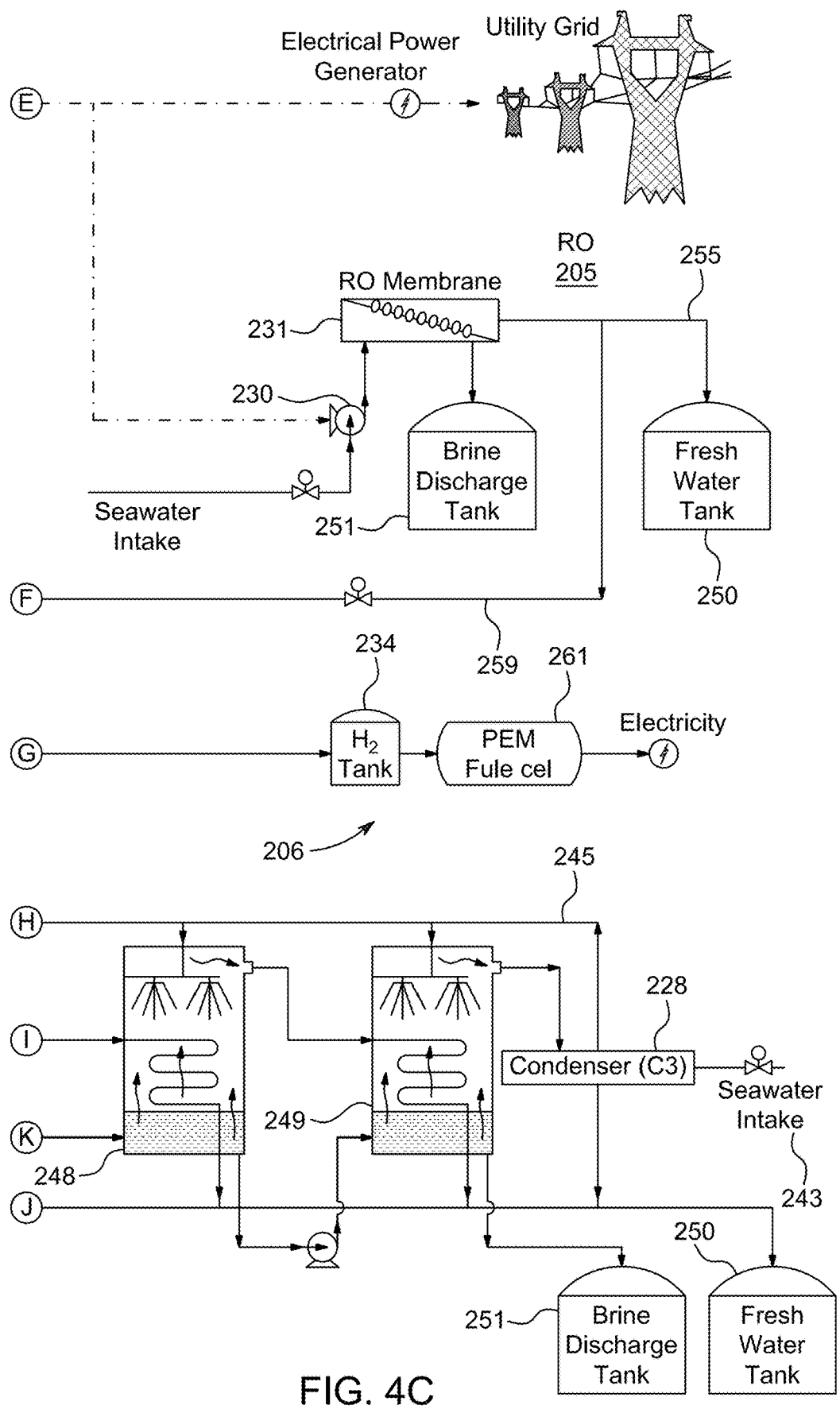

FIG. 4A-C illustrates the parallel/cross flow feed configuration of the MED subsystem 204 of the system 200, according to an embodiment of the present disclosure. Except for an arrangement in the M ED subsystem 204, description of the operation of other subsystems remains the same in FIG. 4A-C, and hence same reference numerals have been used. In the parallel/cross flow feed configuration, the feed seawater 243 is preheated in the third condenser (C3) 228 and is equally distributed in a perpendicular direction to the first evaporation effect (Effect-1) 244, the second evaporation effect (Effect-2) 246, the third evaporation effect (Effect-3) 248, and the fourth evaporation effect (Effect-4) 249. The vapor formed in the first evaporation effect (Effect-1) 244 is passed to the second evaporation effect (Effect-2) 246 to evaporate the feed seawater 243, the vapor formed in the second evaporation effect (Effect-2) 246 is passed to the third evaporation effect (Effect-3) 248 to evaporate the feed seawater 243, and the vapor formed in the third evaporation effect (Effect-3) 248 is passed to the fourth evaporation effect (Effect-4) 249 to evaporate the feed seawater 243. Brine collected at a bottom of each evaporation effect is pumped into a subsequent evaporation effect. At each evaporation effect, incoming brine mixes with the non-evaporated amount of the feed seawater 243 and finally the brine is collected in the brine discharge tank 251 from the fourth evaporation effect (Effect-4) 249. Condensed vapor from each evaporation effect (except the first evaporation effect (Effect-1) 244) flows to the fresh water tank 250.

Figure 5A:
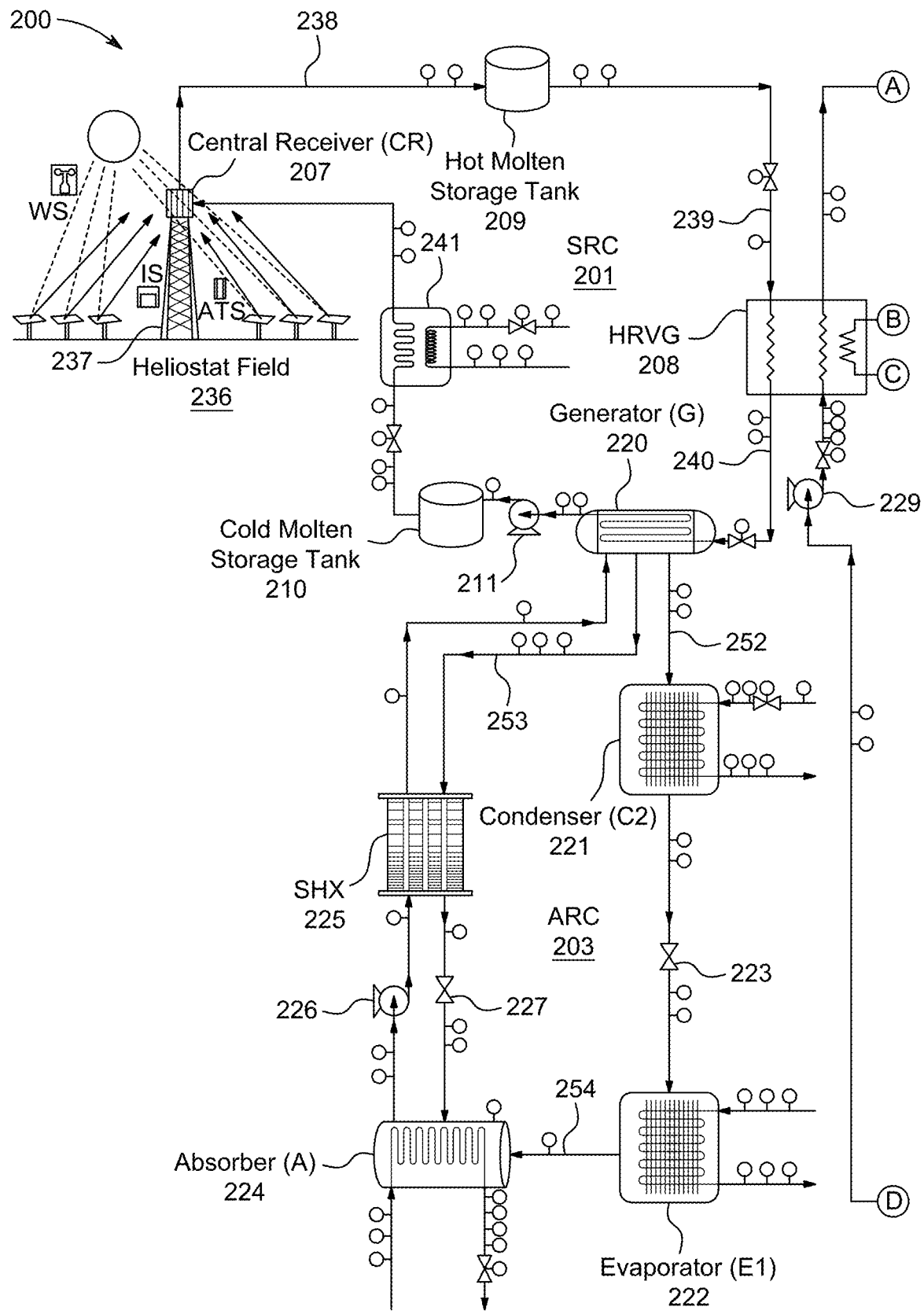
FIG. 5A-C illustrates an exemplary instrumentation diagram of the system, according to an aspect of the present disclosure.
Figure 5B:
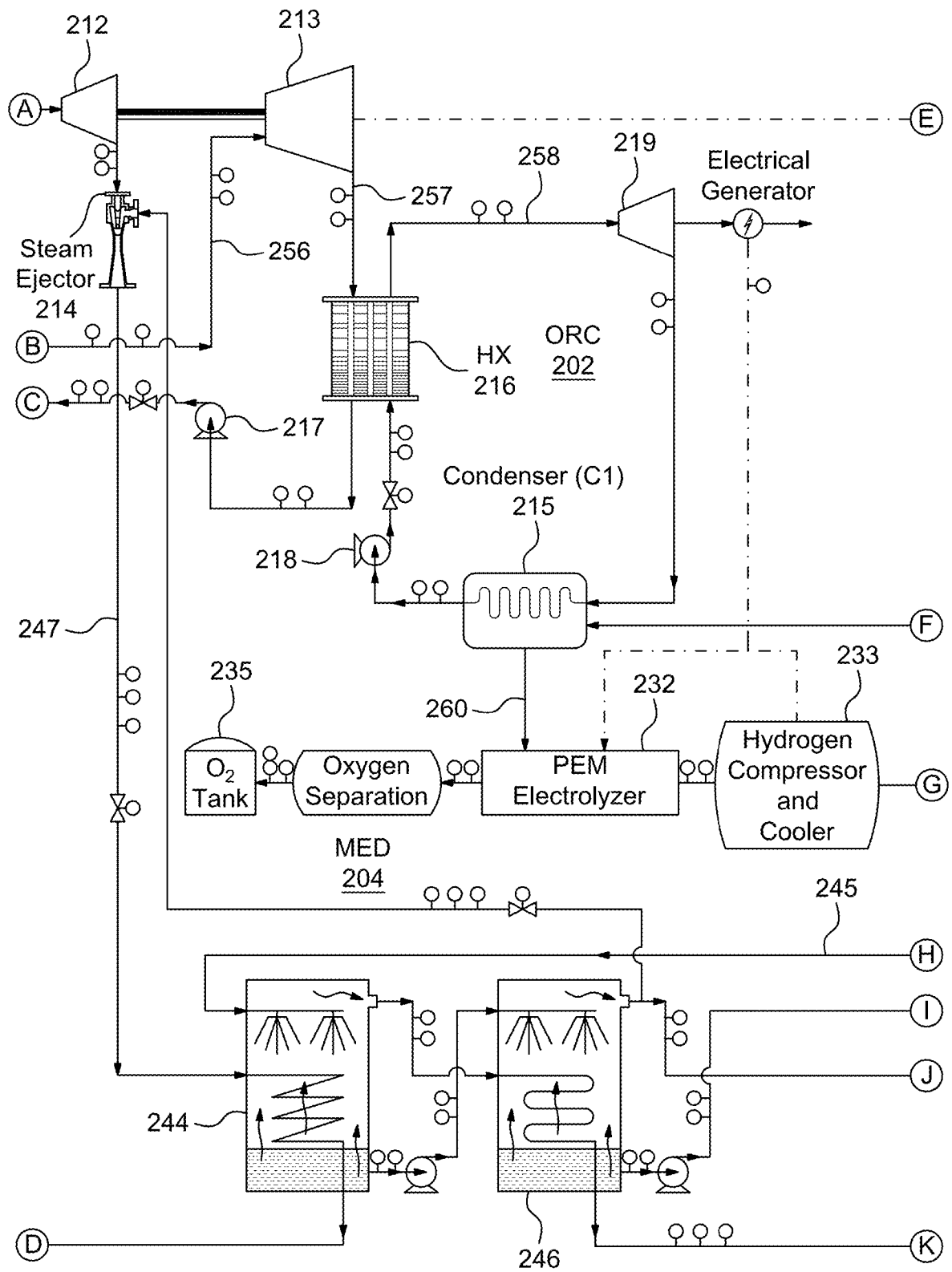
Figure 5C:
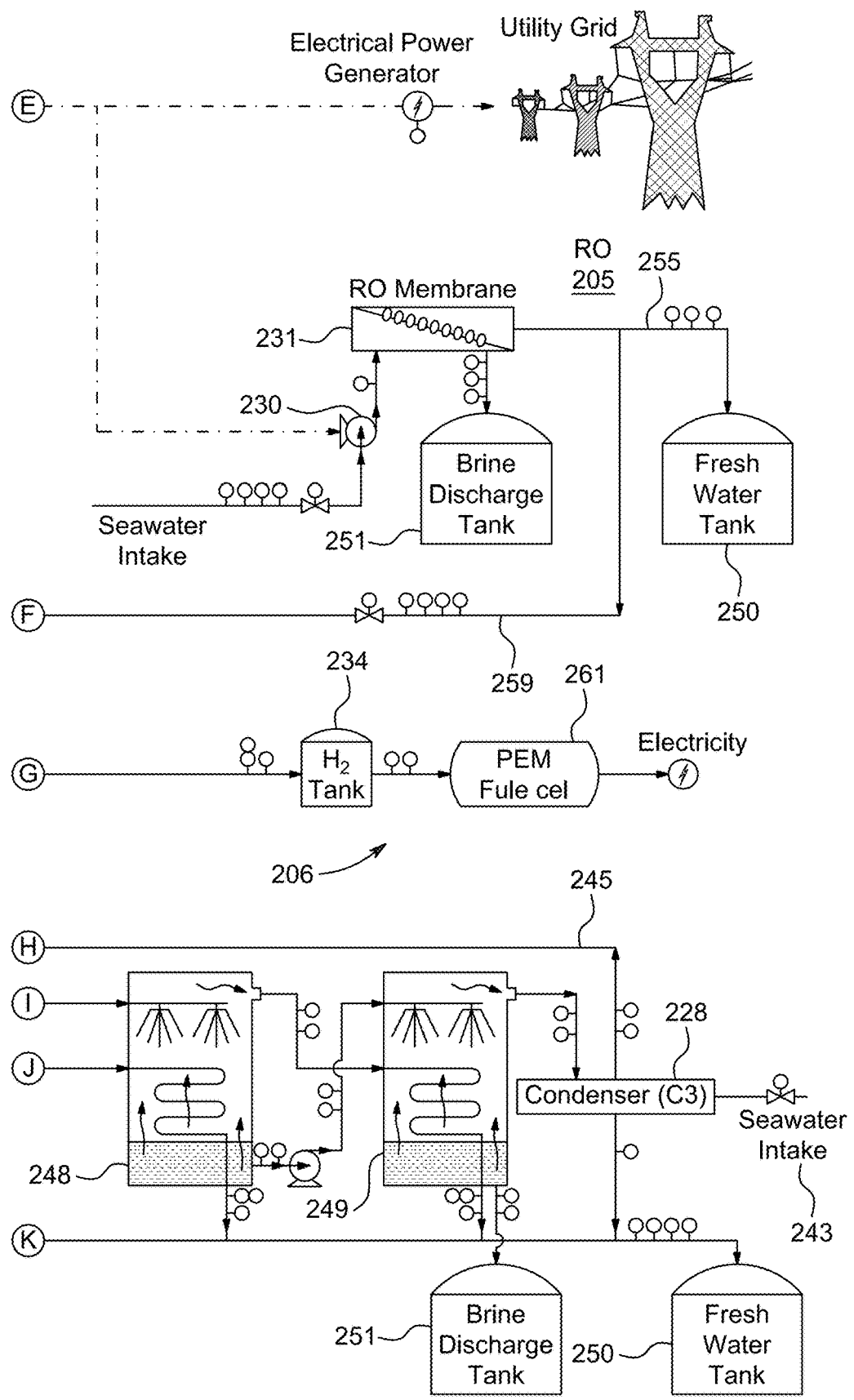

FIG. 5A-C illustrates an exemplary instrumentation diagram of the system 200, according to an embodiment of the present disclosure. Temperature sensors, pressure sensors, and flow sensors are installed in piping of each of the SRC subsystem 201, the ORC subsystem 202, the ARC subsystem 203, the MED subsystem 204, the RO subsystem 205, and the hydrogen production subsystem 206 as shown in FIG. 4A-C. The instrumentations measure the temperature, pressure, flow and transmit the measured values to control and monitoring systems 602 (see FIG. 6A-C). The control and monitoring systems 602 analyzes and compares the measured value with a predefined setpoint. If the measured value is higher than the predefined setpoint, the control and monitoring systems 602 modulates flow of the working fluid through a control valve until the measured value reaches the predefined setpoint and meets the refrigeration effect, heating effect, freshwater product, and electricity based on the demand.

In an aspect of the present disclosure, a toroidal conductivity sensor may be used in the ARC subsystem 203 to measure the concentration of lithium bromide (LiBr), a mixture of water and lithium bromide (LiBr—$H_2O$). Water quality sensors are used at intake of the feed seawater 243 and freshwater product for the MED subsystem 204 and the RO subsystem 205 to monitor multiple parameters, such as pH, dissolved oxygen (DO), conductivity, salinity, total dissolved solids (TDS), seawater specific gravity, temperature, turbidity, water depth, and oxidation-reduction potential (ORP). A pH integrated sensor in the water quality sensor is used to measure the amount of alkalinity and acidity in the water. A salinity integrated sensor in the water quality sensor measures the total dissolved salt content in feed seawater 243 or the freshwater products. A TDS integrated sensor in the water quality sensor detects the total dissolved solids in the water and indicates the water quality.

Figure 6:
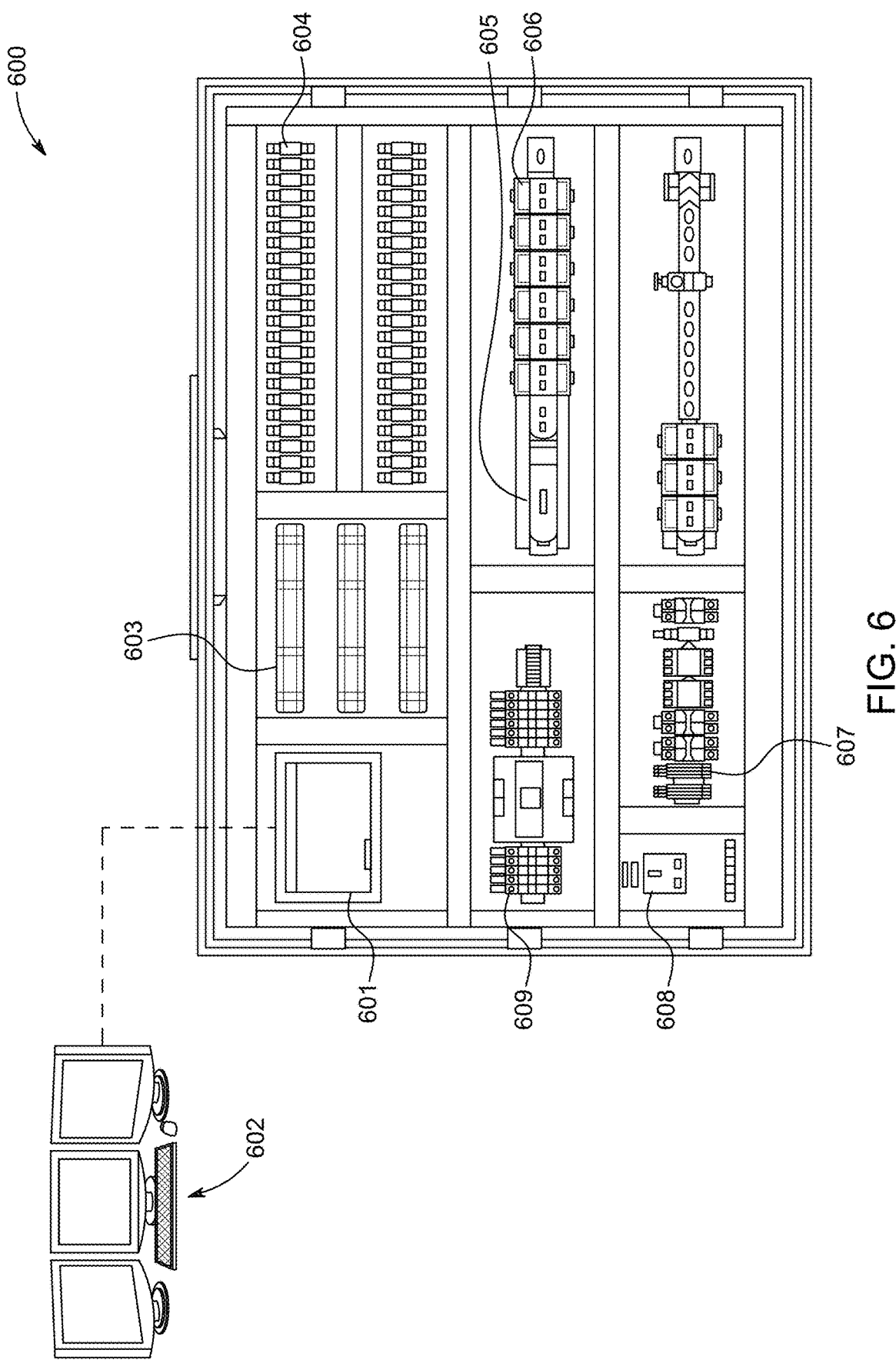
FIG. 6 illustrates an advanced control system for the system of FIG. 1A-C through FIG. 5A-C, according to an aspect of the present disclosure.

FIG. 6A-C illustrates a schematic diagram of an advanced control system 600, according to an aspect of the present disclosure. The advanced control system 600 includes, but not limited to, a touch panel human machine interface 601, control and monitoring systems 602 in communication with the touch panel human machine interface 601, terminal blocks 603, relays 604, automation controller 605, timers 606, input/output (IO) modules 607, power outlet 608, and thermostat and circuit breakers 609. Additionally, the advanced control system 600 may include advanced controllers, selector switches, pushbutton switches, indication lamps, relays, control transformers, mini circuit breaker, flow meters, pressure differential transmitters, temperature sensor, humidity sensor, wind speed sensor, irradiance sensor, water quality sensor, conductivity sensor, control valves, motorized valve, and interlocking relays. In an aspect of the present disclosure, control cables may be used to connect the sensors of FIG. 4A-C to the control and monitoring system 602.

In an aspect of the present disclosure, power consumption by the systems of the present disclosure may be measured with suitable power meter instruments. Measuring the power is one of the most important parameters to check the system's performance, and the power consumption is determined through measurement of the consumed electrical current and is then conveyed to the control and monitoring systems 602. In an aspect of the present disclosure, advanced control system 600 may include an energy meter used to record each refrigeration effect of each refrigeration system and a power meter used to measure the power consumption of the ARC subsystem 203. The control and monitoring systems 602 provides data communication for the solar tower system, ensuring reliable system monitoring and straightforward integration into other systems. The control and monitoring systems 602 may include a smart meter, which optimizes self-consumption, records the load curve, and controls the various energy flows with highly accurate measurements and rapid communication via a Modbus interface. Dynamic feed-in control limits may be imposed faster and more accurately than a conventional meter.

In an aspect of the present disclosure, a metrological station may be used and May include multiple sensors for measuring irradiation, ambient temperature, module temperature, wind speed, and amount of thermal energy captured. The metrological station may be integrated into the control and monitoring systems 602 with an internet connection to view in any place.

TABLE 3

Working fluids

| Cycle | Working Fluid | Temperature Range (° C.) |
|---|---|---|
| Power Cycles: | | |
| 1. Steam Rankine cycle With Solar tower (SRC) | Molten Salt (a mixture of sodium nitrate & potassium nitrate) | 290-565 |
| 2. Steam Rankine cycle with HRVG | Water ($H_2O$) | 250-400 |
| 3. Organic Rankine Cycle (ORC) | Water ($H_2O$) | 50-150 |
| Refrigeration Cycle: | | |
| 1. Absorption Refrigeration Cycle (ARC) | Lithium bromide is absorbent, and water is a refrigerant (LiBr—$H_2O$) | 10-20 |
| Desalination Cycles: | | |
| 1. Multi-Effect Desalination (MED) | Sea Water. | 25-30 |
| Reverse Osmosis (RO) | Sea Water | 25-30 |
| Hydrogen Production Cycle | | |
| 1. Hydrogen ($H_2$) | | 40-85 |
| 2. Oxygen ($O_2$) | | 40 |
| 3. Water ($H_2O$) | | 30 |

To this end, the system 200 represents an integration of refrigeration, heating, desalination, hydrogen production, and power generation systems driven by one source of energy (solar energy) to exploit solar energy effectively and to produce a cooling effect and desalinated water in different magnitude for residential application air conditioning, refrigeration, and meet water requirement with the highest efficiency and least environmental impact. The system 200 system also provides a refrigeration effect, a heating effect, the production of freshwater, hydrogen, oxygen, and electricity through integration of different subsystems powered by a renewable energy source, high performance, high refrigeration effect, high water quality, low environmental impact, and relatively low operational costs. Coupling of solar energy technologies with different refrigeration cycles and desalination and hydrogen production provides thermal and electrical energy for complete utilization of the solar energy needed to produce cooling, high-quality freshwater, and electricity.

The system 200 provides a significant solution to produce hydrogen with no adverse environmental impact by integrating hydrogen production system with solar energy and desalination cycles, which is needed to provide the required electrical power and water for the electrochemical reaction of the electrolysis process in the PEM electrolyzer 232. The system 200 also modulates the use of thermal energy and electrical power according to cooling and freshwater demand. If additional electric power is needed, the stored hydrogen is used in PEM fuel cells 261 to produce the required electricity.

Figure 7A:
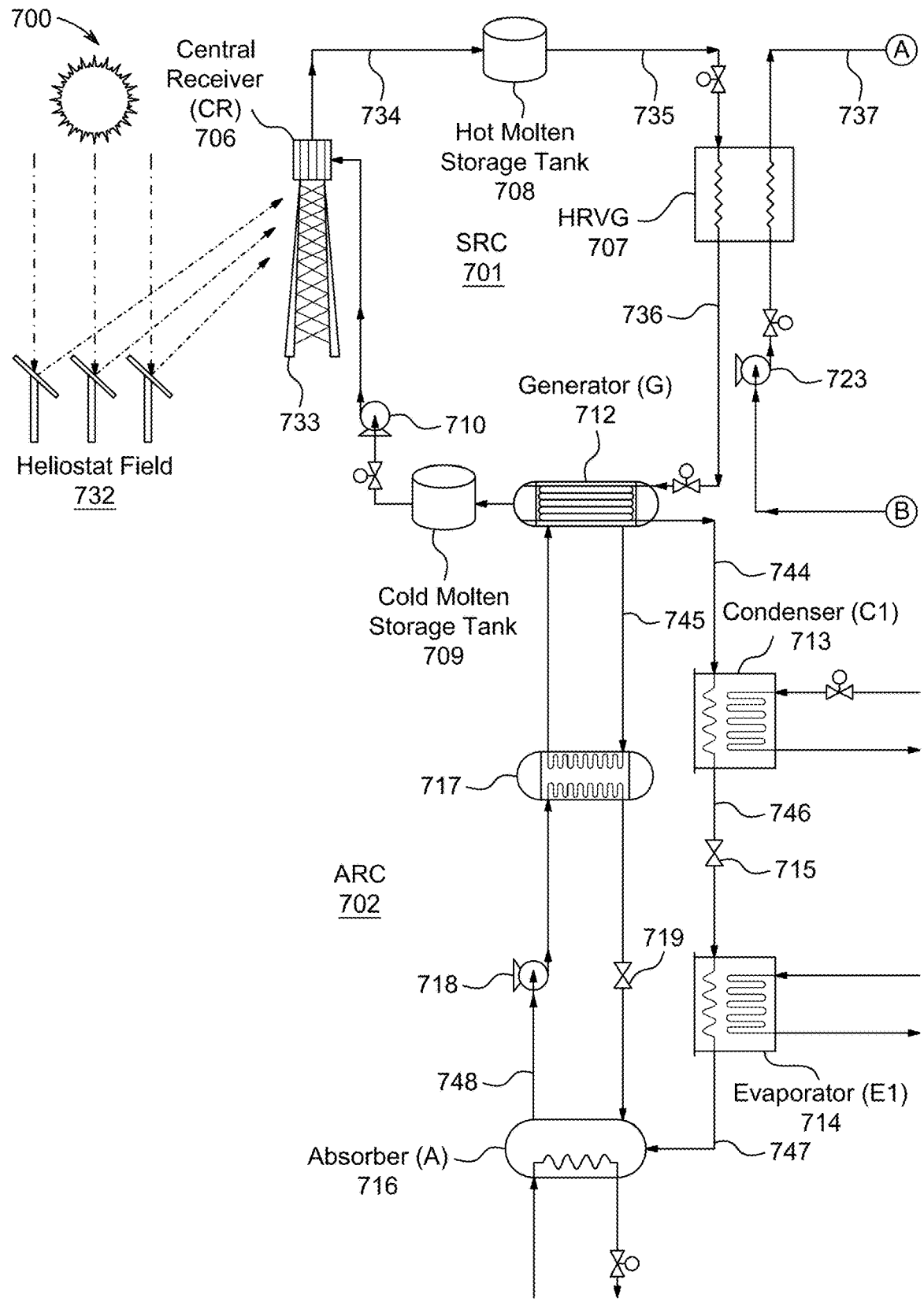
FIG. 7A-C illustrates a forward feed configuration of another system, according to an aspect of the present disclosure.
Figure 7B:
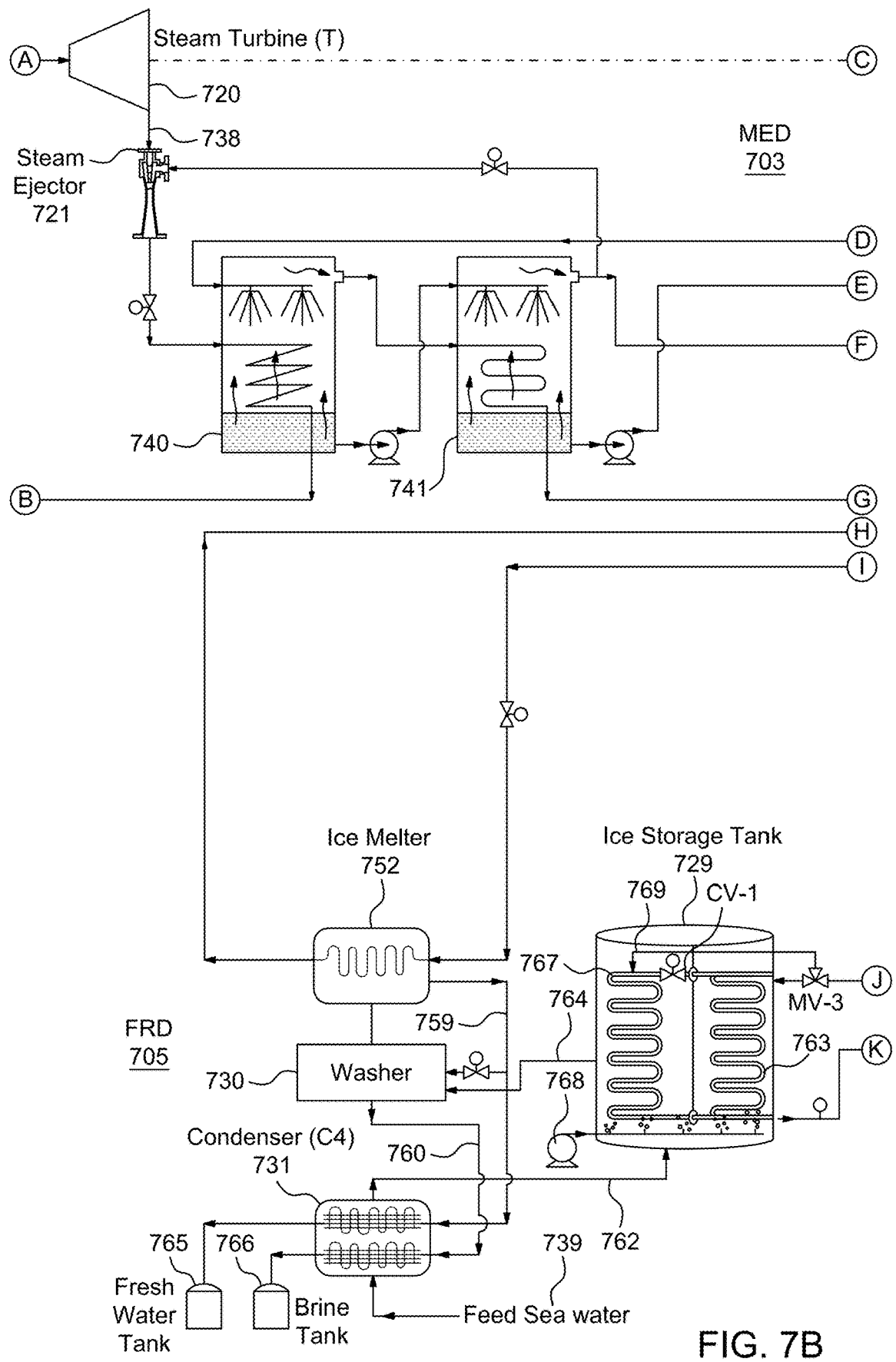
Figure 7C:
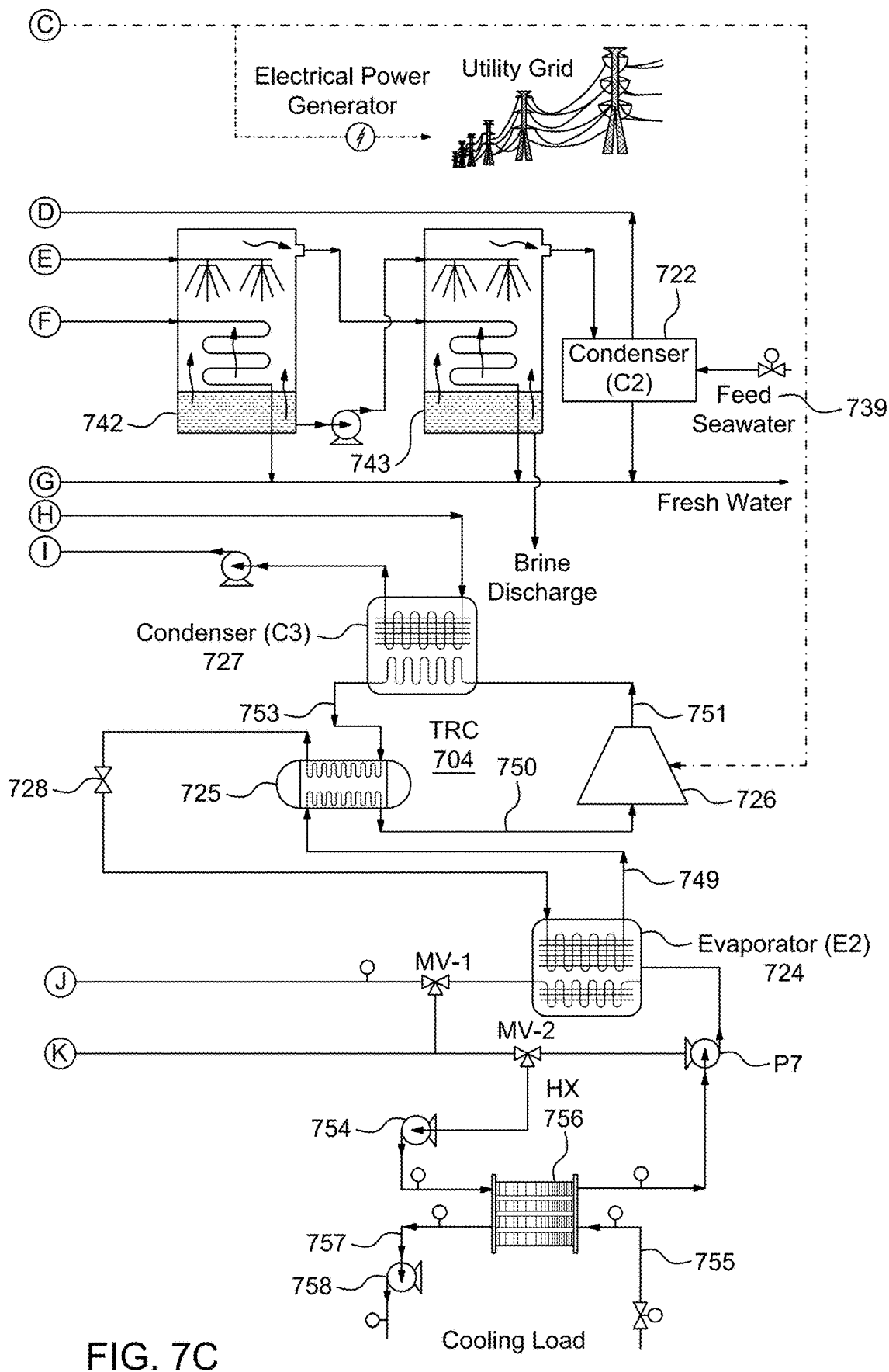

FIG. 7A-C illustrates an exemplary schematic diagram of a system 700, according to an aspect of the present disclosure. The system 700 includes a solar-powered steam Rankine cycle (SRC) subsystem 701 (hereinafter referred to as "the SRC subsystem 701"), an absorption refrigeration cycle (ARC) subsystem 702 (hereinafter referred to as "the ARC subsystem 702"), a multi-effect desalination (MED) subsystem 703 (hereinafter referred to as "the MED subsystem 703"), a transcritical refrigeration cycle (TRC) subsystem 704 (hereinafter referred to as "the TRC subsystem 704"), and a freezing desalination (FRD) subsystem 705 (hereinafter referred to as "the FRD subsystem 705"). The SRC subsystem 701 is configured to receive solar energy, convert the solar energy into thermal energy, and store the thermal energy. The ARC subsystem 702 is configured to provide a first refrigeration effect with a first range of temperature based on the thermal energy. The MED subsystem 703 is configured to desalinate seawater to produce first desalinated water based on the thermal energy and generate an electrical power based on the thermal energy. The TRC subsystem 704 is configured to generate and store when there is no cooling demand and provide a second refrigeration effect with a second range of temperature based on the electrical energy generated by the MED subsystem 703 and the ice being melted. The FRD subsystem 705 is configured to desalinate the seawater to produce second desalinated water based the ice in the TRC subsystem 704 being melted.

In an aspect of the present disclosure, the SRC subsystem 701 includes a central receiver (CR) 706, a heat recovery vapor generator (HRVG) 707, a hot molten salt storage tank 708, a cold molten salt storage tank 709, and a heat transfer fluid (HTF) pump (P1) 710. The CR 706 is configured to receive the solar energy to heat cold molten salt flowing therethrough. The HRVG 707 is configured to generate superheated steam for the MED subsystem 703 based on the heated molten salt and pass the heated molten salt to the ARC subsystem 702. The hot molten salt storage tank 708 is configured to store the heated molten salt and pass the heated molten salt from the CR 706 to the HRVG 707. The cold molten salt storage tank 709 is configured to store the cold molten salt and pass the cold molten salt from the ARC subsystem 702 to the CR 706. The heat transfer fluid (HTF) pump (P1) 710 is configured to pump the cold molten salt from the ARC subsystem 702 to the cold molten salt storage tank 709.

In an aspect of the present disclosure, the ARC subsystem 702 includes a generator (G) 712, a first condenser (C1) 713, a first evaporator (E1) 714, a first throttle valve (TV1) 715, an absorber (A) 716, a solution heat exchanger (SHX) 717, a third pump (P3) 718, and a third throttling valve (TV3) 719. The generator (G) 712 is configured to pass the heated molten salt from the HRVG 707 to the cold molten salt storage tank 709 of the SRC subsystem 701; generate superheated water vapor refrigerant based on the heated molten salt flowing through the generator (G) 712; and generate a strong solution based on a weak solution flowing into the generator (G) 712. The first condenser (C1) 713 is configured to generate saturated liquid refrigerant by cooling the superheated water vapor refrigerant from the generator (G) 712. The first evaporator (E1) 714 is configured to provide the first refrigeration effect with the first range of temperature by generating saturated water vapor based on the saturated liquid refrigerant from the first condenser (C1) 713. The first throttle valve (TV1) 715 is configured to pass the saturate liquid refrigerant from the first condenser (C1) 713 to the first evaporator (E1) 714 and reduce a pressure of the saturated liquid refrigerant to a pressure of the first evaporator (E1) 714. The absorber (A) 716 is configured to generate the weak solution by mixing the strong solution with the saturated water vapor from the first evaporator (E1) 714. The solution heat exchanger (SHX) 717 is configured to pre-heat the weak solution from the absorber (A) 716, pass the pre-heated weak solution to the generator (G) 712, and pre-cool the strong solution from the generator (G) 712. The third pump (P3) 718 is configured to pump the weak solution from the absorber (A) 716 to the solution heat exchanger (SHX) 717. The third throttling valve (TV3) 719 is configured to pass the pre-cooled strong solution from the solution heat exchanger (SHX) 717 to the absorber (A) 716 and reduce a pressure of the pre-cooled strong solution to a pressure of the absorber (A) 716.

In an aspect of the present disclosure, the MED subsystem 703 includes a steam turbine (T) 720, a steam ejector (EJE) 721, a second condenser (C2) 722, and a second pump (P2) 723. The steam turbine (T) 720 is configured to generate the electrical power based on the superheated steam from the HRVG 707 of the SRC subsystem 701. The steam ejector (EJE) 721 is configured to generate a mixture by mixing an exhaust from the steam turbine (T) 720 and vapor from the MED subsystem 703 and pass the mixture to the MED subsystem 703. The second condenser (C2) 722 is configured to heat and forward seawater to a first evaporation effect of a plurality of evaporation effects. The plurality of evaporation effects is configured to produce fresh water from the heated seawater, where the first evaporation effect is driven by the mixture from the steam ejector (EJE) 721. The second pump (P2) 723 is configured to pump condensate from the first evaporation effect to the HRVG 707 of the SRC subsystem 701.

In an aspect of the present disclosure, the TRC subsystem 704 includes a second evaporator (E2) 724, an internal heat exchanger (IHX) 725, a compressor (COMP) 726, a third condenser (C3) 727, a second throttling valve (TV2) 728, and an ice storage system 729. The second evaporator (E2) 724 is configured to provide the second refrigeration effect with the second range of temperature by generating refrigerant vapor. The internal heat exchanger (IHX) 725 is configured to generate superheated refrigerant vapor by evaporating liquid droplets of the refrigerant vapor from the second evaporator (E2) 724. The compressor (COMP) 726 is powered by the electrical power generated from the steam turbine (T) 720 of the MED subsystem 703 and is configured to generate high-pressure superheated refrigerant vapor by compressing the superheated refrigerant vapor from the internal heat exchanger (IHX) 725. The third condenser (C3) 727 is configured to cool the high-pressure superheated refrigerant vapor to saturated liquid refrigerant by melting ice in the FRD subsystem 705. The second throttling valve (TV2) 728 is configured to pass the saturated liquid refrigerant to the second evaporator (E2) 724 and reduce a pressure of the saturated liquid refrigerant to a pressure of the second evaporator (E2) 724. The ice storage system 729 is configured to build the ice when there is no cooling demand and melt the ice when there is cooling demand.

In an aspect of the present disclosure, the FRD subsystem 705 includes a washer 730 configured to separate ice and brine that are transported from the ice storage tank 729 of the TRC subsystem 704; and a fourth condenser (C4) 731 configured to pre-cool seawater through a product fresh water steam from an ice melter and discharged brine steam from the washer 730.

In operation of the system 700, solar radiation incident on a heliostat field 732 is reflected to the CR 706 that is fixed on a solar tower 733. Thermal energy from the reflected solar radiation is used to heat the cold molten salt contained in the CR 706. In an aspect of the present disclosure, the CR 706 may be coated with a selective coating to minimize reflectivity, thereby improving absorption performance. The heated molten salt flows from the CR 706 to the hot molten salt storage tank 708 via a flow path 734. The heated molten salt may be stored by the hot molten salt storage tank 708 and may be subsequently passed to the HRVG 707 via a flow path 735. Heat transfer between the heated molten salt and the water occurs at the HRVG 707, where superheated steam 737 is generated for the MED subsystem 703. The generated superheated steam is used to drive the steam turbine 720. The molten salt, after the heat transfer at the HRVG 707, flows to the generator (G) 712 via a flow path 736. The molten salt then flows to the cold molten salt storage tank 709. Solar energy is stored in two tanks to aid continuous operation of the system 700 during unavailability of the solar energy.

The superheated steam 737 is expanded in the steam turbine (T) 720 and exhaust steam 738 from the steam turbine (T) 720 flows to the steam ejector (EJE) 721, thereby creating high vacuum pressure in the steam ejector (EJE) 721. Such high vacuum pressure draws vapor from the MED subsystem 703. The steam ejector (EJE) 721 generates the mixture by mixing the exhaust steam 738 from the steam turbine (T) 720 and vapor from the MED subsystem 703. The mixture then flows to the MED subsystem 703. FIG. 7 also illustrates a forward feed configuration of the MED subsystem 703, among other configurations.

Feed seawater 739 enters the second condenser (C2) 722 and is preheated by vapor flowing through the second condenser (C2) 722. The preheated feed seawater 739 flows to the first evaporation effect (Effect-1) 740 of a plurality of evaporation effects, where the preheated feed seawater 739 is sprinkled therein. The mixture from the steam ejector (EJE) 721 is associated with sufficient heat to evaporate the sprinkled feed seawater 739 in the first evaporation effect (Effect-1) 740. Vapor from the first evaporation effect (Effect-1) 740 is supplied to the second evaporation effect (Effect-2) 741. Non-evaporated feed seawater 739 collects at a bottom of the first evaporation effect (Effect-1) 740 and is pumped into the second evaporation effect (Effect-2) 741, where the non-evaporated feed seawater 739 is sprinkled. The vapor is routed through tubes in the second evaporation effect (Effect-2) 741 and drives the evaporation of the sprinkled feed seawater 739 in the second evaporation effect (Effect-2) 741. The mixture in the first evaporation effect (Effect-1) 740 is condensed and pumped from the first evaporation effect (Effect-1) 740 to the HRVG 707, by the second pump (P2) 723. Condensed mixture (water) is heated by the hot molten salt in the HRVG 707 to form the superheated steam 737. Further, vapor formed in the second evaporation effect (Effect-2) 741 is passed into the third evaporation effect (Effect-3) 742 and vapor formed in the third evaporation effect (Effect-3) 742 is passed into the fourth evaporation effect (Effect-4) 743. In an aspect of the present disclosure, each of the first evaporation effect (Effect-1) 740, the second evaporation effect (Effect-2) 741, the third evaporation effect (Effect-3) 742, and the fourth evaporation effect (Effect-4) 743 may include an array of sprinkler nozzles to sprinkle the feed seawater 739.

The steam ejector (EJE) 721 operates based on the exhaust steam 738 and entrains a portion of vapor formed in the second evaporation effect (Effect-2) 741. The steam ejector (EJE) 721 is configured to compress the entrained vapor from the second evaporation effect (Effect-2) 741 by the exhaust steam 738 to form the mixture associated with a desired temperature.

Vapor formed in the fourth evaporation effect (Effect-4) 743 flows to the second condenser (C2) to preheat the incoming feed seawater 739. After losing heat to the feed seawater 739, the vapor is condensed in the second condenser (C2) to form freshwater 759. Additionally, the vapor condensed in each of the second evaporation effect (Effect-2) 741, the third evaporation effect (Effect-3) 742, and the fourth evaporation effect (Effect-4) 743 is collected as the freshwater 759. Non-evaporated feed seawater 739 (also referred to as the brine) from the fourth evaporation effect (Effect-4) 743 is routed to a brine discharge 760.

In the forward feed configuration, both brine and heating vapor streams flow in the same direction from the first evaporation effect (Effect-1) 740 to the fourth evaporation effect (Effect-4) 743, where pressure and temperature are reduced. The first evaporation effect (Effect-1) 740 operates at a lowest salinity and a highest temperature and pressure. The undiluted feed seawater 739 leaving an evaporation effect is sprayed in a subsequent effect. The pressure in the evaporation effects decreases in a flow direction. In an aspect of the present disclosure, each evaporation effect contains heat exchange tubes, vapor space, undiluted feed seawater spray nozzles, mist eliminator.

In the ARC subsystem 702, the molten salt flowing along the flow path 736 enters the generator (G) 712, where the molten salt provides the thermal energy required to separate the weak solution of LiBr—$H_2O$ into superheated water vapor refrigerant 744 and a strong solution 745. The superheated water 744 is cooled in the first condenser (C1) 713 to form saturated liquid refrigerant 746. In an aspect of the present disclosure, cooling water from a cooling tower (not shown) may be supplied to the first condenser (C1) 713 to cool the superheated water vapor refrigerant 744. The saturated liquid refrigerant 746 flows through the first throttle valve (TV1) 715, where a pressure of the saturated liquid refrigerant 746 is reduced to a value equal to a pressure of the first evaporator (E1) 714. In an aspect of the present disclosure, the first evaporator (E1) 714 is configured to provide the first refrigeration effect with the first range of temperature by generating saturated water vapor 747 based on the saturated liquid refrigerant 746 from the first condenser (C1) 713.

The saturated water vapor 747 flows into the absorber (A) 716. The strong solution 745 from the generator (G) 712 is pre-cooled in the solution heat exchanger (SHX) 717 and further flows through the third throttling valve (TV3) 719, where a pressure value of the pre-cooled strong solution 745 is reduced to a pressure of the absorber (A) 716. In an aspect of the present disclosure, the absorber (A) 716 may be maintained at a temperature of about 35° C. The saturated water vapor 747 flowing into the absorber (A) 716 is mixed with the pre-cooled strong solution 745 to form the weak solution 748 (such as LiBr—$H_2O$) that is pumped back to the solution heat exchanger (SHX) 717 by the third pump (P3) 718. The weak solution 748 is preheated in the solution heat exchanger (SHX) 717 prior to being supplied to the generator (G) 712.

The energy produced by the steam turbine (T) 720 of the MED subsystem 703 is supplied as power input to the TRC subsystem 704 having the ice storage system 729 coupled to the FRD subsystem 705. In the TRC subsystem 704, a water-based solution is cooled during the nighttime. The $N_2O$ refrigerant provides a very low-temperature range and refrigeration effect that can be used for deep freezing applications in the range of −50° C. to −80° C. In an aspect, $N_2O$ refrigerant vapor 749 flows to the internal heat exchanger (IHX) 725, where liquid portion is evaporated to form superheated refrigerant vapor 750 that is compressed to high refrigerant pressure and temperature in the compressor (COMP) 726. A high-pressure superheated refrigerant vapor 751 from the compressor (COMP) 726 flows to the third condenser (C3) 727 and is cooled to form liquid refrigerant 753. The hot vapor from the third condenser (C3) 727 is routed to the ice melter 752 of the FRD subsystem 705, where the hot vapor melts the ice therein. Utilization of the heat in the third condenser (C3) 727 is improves an overall efficiency of the system 700 due to reducing the required power needed to provide cooling to the third condenser (C3) 727 and provides heating to the ice melter 752 to melt the ice and produce fresh water.

The liquid refrigerant 753 from the third condenser (C3) 727 flows to the internal heat exchanger (IHX) 725 for additional cooling and then flows through the second throttling valve (TV2), where a pressure of the liquid refrigerant 753 is reduced to a value equal to a pressure of the second evaporator (E2) 724. The internal heat exchanger (IHX) 725 enhances coefficient of performance of the TRC subsystem 704 owing to the increase in temperature of the superheated refrigerant vapor 750 entering the compressor (COMP) 726, which improves superheating and decreases temperature of the liquid refrigerant 753 flowing to the second evaporator (E2) 724, thereby improving subcooling. The second evaporator (E2) 724 achieves the second refrigeration effect with the second range of temperature measured as a difference between the temperature of the liquid refrigerant 753 and the $N_2O$ refrigerant vapor 749.

The TRC subsystem 704 generates ice during no cooling demand. The stored thermal energy of the ice storage system 729 is used to meet changing cooling load demands. In peak-time and grid outages, the stored energy in the ice storage tank 729 works continuously to cool the building adding an increased level of redundancy.

Ice in the ice storage system 729 melts to meet the cooling demand, and a secondary glycol pump (SP) 754 is actuated. Melting cycle begins as hot water 755 enters the system 700 from the building. The hot water 755 passes through a heat exchanger (HX) 756 to lose heat and form cold chilled water 757 that circulates through a tertiary glycol pump (TP) 758 to meet the cooling demand from the building. It will be apparent from FIG. 7A-C that there is no direct contact between the melting ice and hot water 755, which is cooled indirectly in the heat exchanger (HX) 756 by melting the ice at the ice storage system 729.

The FRD subsystem 705 is an indirect type, and saline water does not contact the refrigerant or chilled water. The feed seawater 739 flows to the fourth condenser (C4) 731 and is pre-cooled to desired temperature with aid of product freshwater stream 759 from the ice melter 752 and a discharged brine stream 760 from the washer 730. The pre-cooled feed seawater 739 is routed to the ice storage system 729 via a flow path 762. Ice crystal is formed on an outer surface of the ice storage system 729, and MV-3 opens during the desalination process. In an aspect of the present disclosure, chilled water flows inside a tube of a cooling freezing chamber 763 to freeze the pre-cooled feed seawater 739 around the tube. The ice and brine are transported to the washer 730 via a flow path 764. The washer 730 is configured to separate the ice and the brine. The ice is transported to the ice melter 752, where the ice is melted by the heat of condensation released from hot water/vapor supplied from the third condenser (C3) 727. A small amount of the freshwater 759 from the ice melter 752 is bypassed to the washer 730 to wash the ice crystals, and a majority of the freshwater 759 is routed to the fourth condenser (C4) 731 to cool the feed seawater 739. The freshwater 759 is then collected in a freshwater storage tank 765. Similarly, the brine discharged from the washer 730 is collected in the brine tank 766 after passing through the fourth condenser (C4) 731.

In an aspect of the present disclosure, ethylene/propylene glycol may be used in the chilled water routed through the cooling freezing chamber 763 for freezing protection. Advanced-grade glycol is designed to prevent corrosion in refrigeration systems. Inhibitors may be added to the chilled water to prevent the ethylene glycol from becoming acidic and to provide additional protection for metal components in the thermal storage system.

TABLE 4

Sequence of Operation of Transcritical Refrigeration, Freezing Desalination, and Ice Storage System

| | Operation Mode | | | | | | |
|---|---|---|---|---|---|---|---|
| | TRC | P7 | P8 | MV-1 | MV-2 | MV-3 | CV-1 |
| FRD only | On | On | Off | X1-X2 | Y1-Y3 | Z1-Z3 | Closed |
| FRD and Cooling | On | On | On | X1-X2 | Variable | Z1-Z3 | Closed |
| FRD, Cooling with Ice Build | On | On | On | X1-X2 | Variable | Z1-Z2 | Open |
| Cooling-Ice with TRC | On | On | On | Variable | Y1-Y2 | Z1-Z2 | Closed |
| Cooling-TRC Only | On | On | On | X1-X3 | Y1-Y2 | Closed | Closed |
| Cooling-Ice Only | Off | On | On | Variable | Y1-Y2 | Z1-Z2 | Closed |
| Ice Build (Cooling Chamber) | On | On | Off | X1-X2 | Y1-Y3 | Z1-Z2 | Closed |
| Ice Build with Cooling | On | On | On | X1-X2 | Variable | Z1-Z2 | Closed |

Table-41 illustrates operation modes of the TRC subsystem 704 with the ice storage system 729, and the FRD subsystem 705. The sequence of operation and modulation of motorized valves (MV-1, MV-2 MV-3, and CV-1) depends on cooling and freshwater demand. As listed in the table, the TRC subsystem 704 with the ice storage system, and the FRD subsystem 705 may operate in eight different modes.

In a first mode, the integrated system [the TRC subsystem 704 and the ice storage system 729] with the FR D subsystem 705 provides a low-temperature chilled water-glycol needed for the FRD subsystem 705. In this mode, the TRC subsystem 704 and P7 pump is actuated, and the secondary glycol pump (SP) 754 is turned off due to no cooling demand. All chilled water-glycol is used for the FRD subsystem 705. The chilled water-glycol passes through the MV-1, and then the chilled water flows to a desalination freezing chamber 767 of the ice storage system 729 through the MV-3, where the CV-1 remains closed. The warm chilled water leaves the desalination freezing chamber 767 and passes through the MV-2. In an aspect of the present disclosure, an advanced low-pressure air distribution system 768 may be provided at the desalination freezing chamber 767 to create air bubble that is used to enhance heat transfer during the ice build cycle. When a thickness of the ice reaches a design value, the advanced control system 1100 (see FIG. 11) sends a signal to turn off the TRC subsystem 704. The warm water is pumped to the P7 pump, and then returns to the second evaporator (E2) 724. Low-temperature glycol-water 769 in the desalination freezing chamber 767 is used to form the ice crystal of the feed seawater 739 on the external surface of the tubes at the desalination freezing chamber 767 of the ice storage system 729. In an aspect of the present disclosure, the desalination freezing chamber 767 may include a steel perforated base plate configured to separate the desalination freezing chamber 767 into two parts, where a lower part is configured to collect the drained brine and ice wash, and an upper part associated with the glycol cycle to facilitate freezing process therein. In an aspect of the present disclosure, the desalination freezing chamber 767 and the cooling freezing chamber 763 may be designed to include smaller coil diameter to achieve thick ice formation (for example, about 2 inches) and thereby improve efficiency of the TRC subsystem 704.

In a second mode, the system 700 provides low-temperature chilled water required for freezing desalination and cooling. The TRC subsystem 704, the P7 pump, and the secondary glycol pump (SP) 754 is actuated, and the glycol-water flows through the MV-1, then the chilled water flows to desalination freezing chamber 767 through the MV-3, where the CV-1 remains closed. The chilled water modulates at the MV-2 to meet the required cooling demand. The low-temperature glycol-water 769 is passed to the desalination freezing chamber 767, where low-temperature chilled glycol-water 769 is used to form the ice crystal of the feed seawater 739 on the external surface of the tubes at the desalination freezing chamber 767. The advanced low-pressure air distribution system 768 is disposed at the desalination freezing chamber 767 to create air bubbles used to enhance heat transfer during the ice build cycle. When a thickness of the ice reaches a design value, the advanced control system 1100 (see FIG. 11) sends a signal to turn off the TRC subsystem 704.

In a third mode, the system 700 provides low-temperature chilled water for freezing desalination and cooling with building ice for cooling purposes. The TRC subsystem 704, the P7 pump, and the secondary glycol pump (SP) 754 is actuated, and the chilled water flows through the MV-1, then flows to the cooling freezing chamber 763 and the desalination freezing chambers 767 through the MV-3, and the CV-1 remains open to pass the chilled water to the desalination freezing chamber 767. The chilled water is also used in the cooling freezing chamber 763 and the desalination freezing chambers 767 to generate and store for cooling purposes. The advanced low-pressure distribution system 768 is disposed at the cooling freezing chamber 763 and the desalination freezing chambers 767 to create air bubble that is used to enhance heat transfer during the ice build cycle. When a thickness of the ice reaches a design value, the advanced control system 1100 (see FIG. 11) sends a signal to turn off the TRC subsystem 704. The chilled water modulates at the MV-2 according to the required cooling demand. The chilled water passes through the CV-1, where low-temperature glycol-water flows to the desalination freezing chamber 767 to form the ice-crystal of the feed seawater 739 on the external surface of the tubes at the desalination freezing chamber 767.

In a fourth mode, the system 700 provides low-temperature chilled water needed cooling and builds ice during low-ambient operation and nighttime at the cooling freezing chamber 763 to meet the cooling requirement when cooling load exists. The TRC subsystem 704, the P7 pump, and the secondary glycol pump (SP) 754 is actuated, and the chilled water modulates at the MV-1 to regulate the supplied cooling from the TRC subsystem 704 and the cooling freezing chamber 763, and then the chilled water flows to cooling freezing chambers 763 through the MV-3, and the CV-1 remains closed. The low temperature glycol-water is passed to the cooling freezing chamber 763 to generate and store and store the ice for cooling purposes. the advanced low-pressure distribution system 768 is disposed at the cooling freezing chamber 763 to create air bubbles used to enhance heat transfer during the ice build cycle. When a thickness of the ice reaches a design value, the advanced control system 1100 (see FIG. 11) sends a signal to turn off the TRC subsystem 704. The glycol-water passes 769 through the MV-2, and it is pumped to the HX 756. The low-temperature glycol-water 769 is pumped to the secondary glycol pump (SP) 754 and then flows through the HX 756 to meet the cooling requirements.

In a fifth mode, the system 700 provides cooling by the TRC subsystem 704 only. The TRC subsystem 704, the P7 pump, and the secondary glycol pump (SP) 754 remains actuated, the MV-3 and the CV-1 remains closed. The glycol-water 769 is bypassed through the MV-1 to the MV-2. Then the chilled water passes through the MV-2 and is pumped to the HX 756. The low-temperature glycol-water 769 is pumped to the secondary glycol pump (SP) 754 and then flows through the HX 756 to meet the cooling demand. The advanced control system 1100 controls the operations of the TRC subsystem 704 to meet the exact cooling demands.

In a sixth mode, the system 700 provides cooling by the stored ice at the cooling freezing chamber 763 at the ice storage system 729. The TRC subsystem 704 is turned off, and the P7 pump, and the secondary glycol pump (SP) 754 is kept running. The glycol-water is bypassed through the MV-1, and then the chilled water flows to the cooling freezing chamber 763 through the MV-3, where the CV-1 remains closed. The chilled water then passes through the MV-2 and is pumped to the HX 756. The advanced low-pressure distribution system 768 is disposed at the cooling freezing chamber 763 to create air bubble uses to enhance heat transfer during the ice build cycle. When the cooling demand exists, the low-temperature glycol-water 769 is pumped to the secondary glycol pump (SP) 754 and then flows through the HX 756 to meet the cooling demand while TRC subsystem 704 is turned off. The melt-out cycle begins. Warm water from the HX 756 passes to the cooling freezing chamber 763 and is cooled indirectly with the melting ice. During the ice melting cycle, the melted water is agitated by the advanced low-pressure distribution system 768 to produce a uniform ice melting process and improve heat transfer.

In the seventh mode, the system 700 builds ice only during low-ambient operation conditions and when no cooling load exists. The TRC subsystem 704 and the P7 pump remains running, and the secondary glycol pump (SP) 754 is turned off. The low-temperature glycol-water 769 passes through the MV-1. The chilled water flows to cooling freezing chamber 763 through the MV-3, where the CV-1 remains closed. The chilled water builds ice on the outer surface of the tube and stores it at the cooling freezing chamber 763 to be used when a cooling load exists. the advanced low-pressure distribution system 768 is disposed at the cooling freezing chamber 763 to create air bubble that is used to enhance heat transfer during the ice build cycle. When a thickness of the ice reaches a design value, the advanced control system 1100 (see FIG. 11) sends a signal to turn off the TRC subsystem 704. The warm, glycol-water returns to the second evaporator (E2) 724, where TRC subsystem 704 is feeding the refrigeration effect at the second evaporator (E2) 724. The warm glycol-water passes through the MV-2 and is pumped back to the second evaporator (E2) 724 to be chilled, and the ice build cycle is repeated.

In an eighth mode, the system 700 provides cooling and builds ice at the cooling freezing chamber 763 at the ice storage system 729 to be used for cooling purposes. The TRC subsystem 704, the P7 pump, and the secondary glycol pump (SP) 754 remains running, and the glycol-water flows through the MV-1, and then the chilled water flows to the cooling freezing chambers 763 through the MV-3, and the CV-1 remains closed. The chilled water is used in the cooling freezing chamber 763 to generate and store. The advanced low-pressure distribution system 768 is disposed at the cooling freezing chamber 763 to create air bubble that is used to enhance heat transfer during the ice build cycle. When a thickness of the ice reaches a design value, the advanced control system 1100 (see FIG. 11) sends a signal to turn off the TRC subsystem 704. The chilled water modulates at the MV-2 according to the required cooling demand.

Figure 8A:
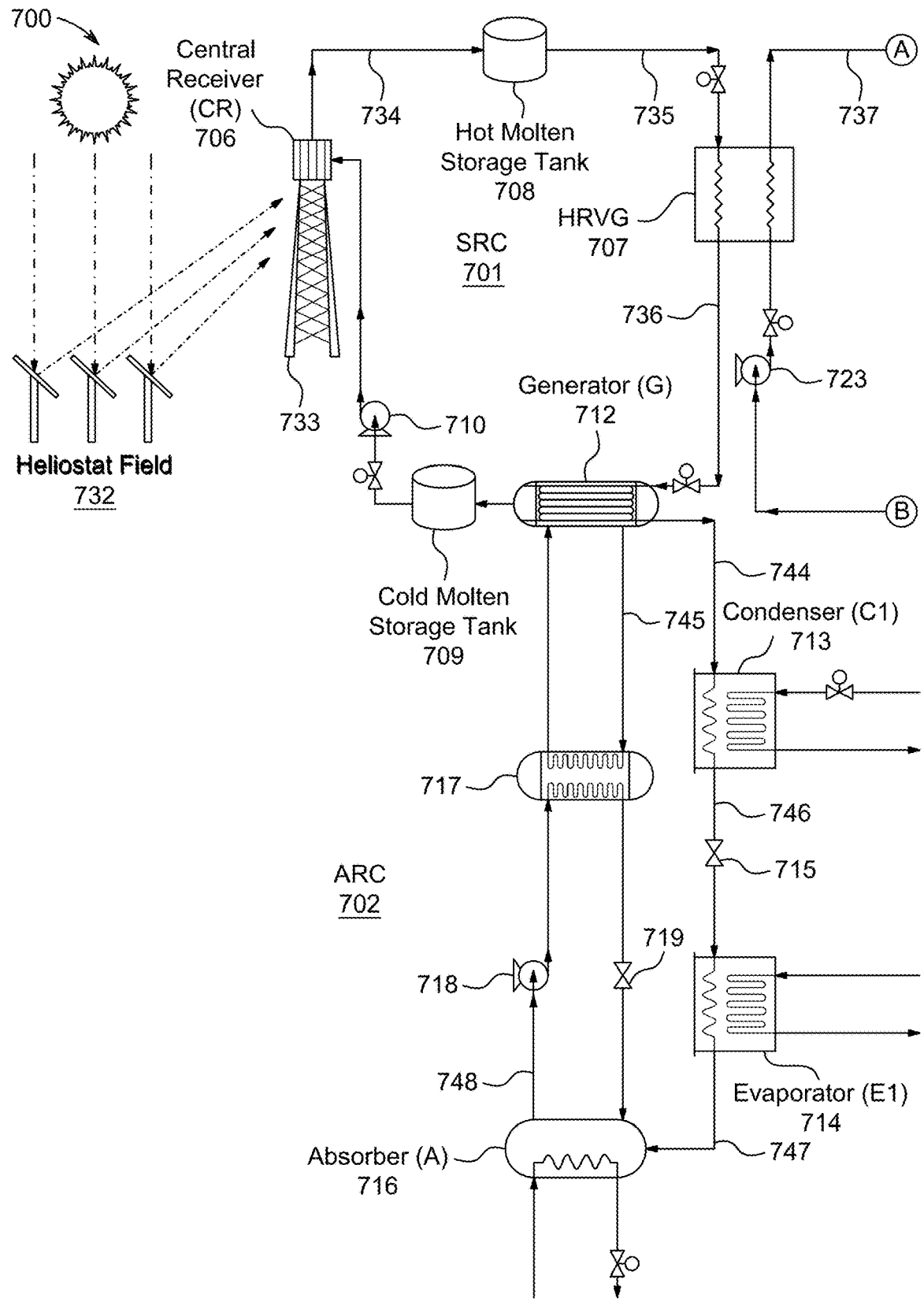
FIG. 8A-C illustrates a parallel feed configuration of the system of FIG. 7A-C, according to an aspect of the present disclosure.
Figure 8B:
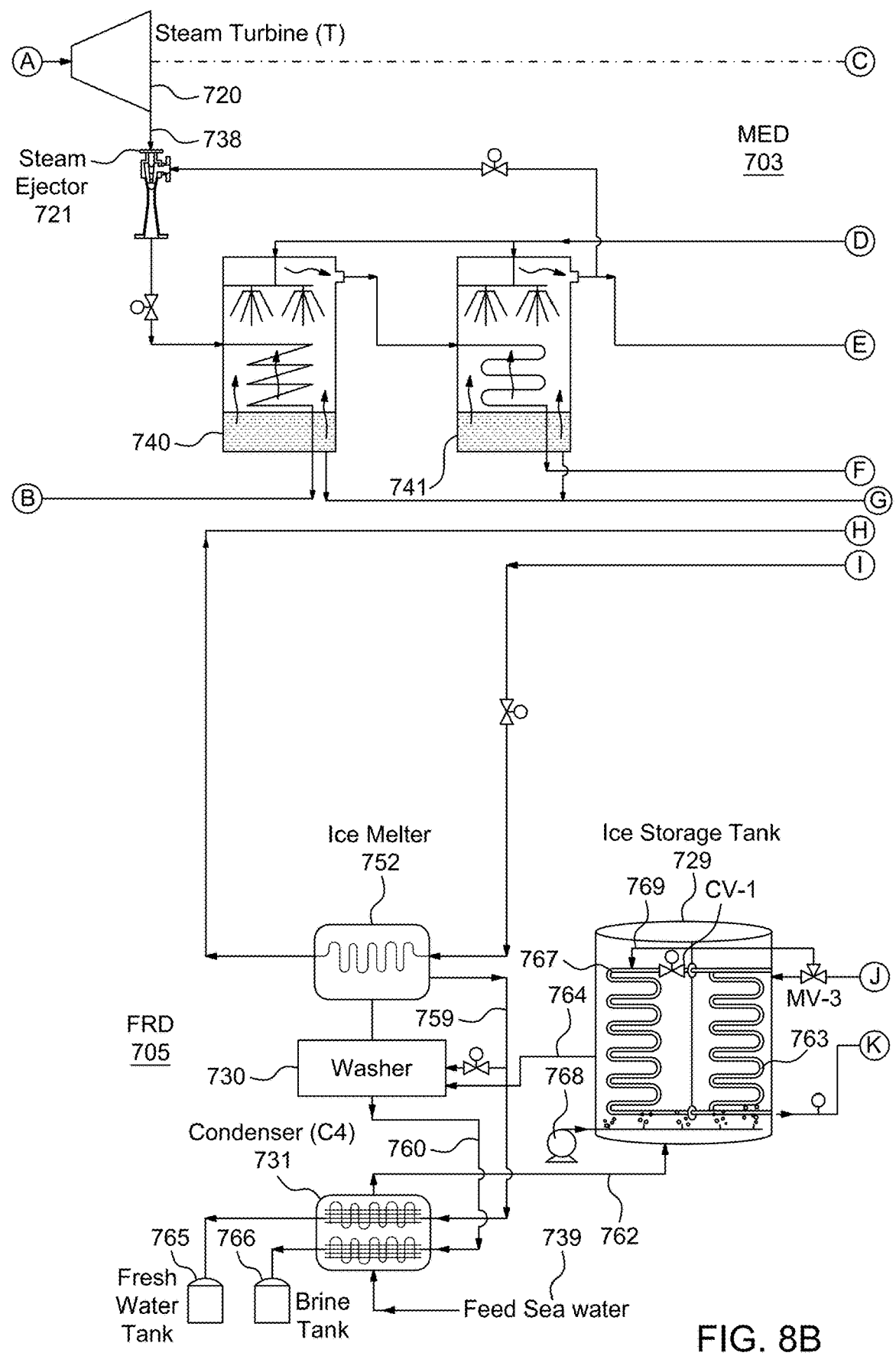
Figure 8C:
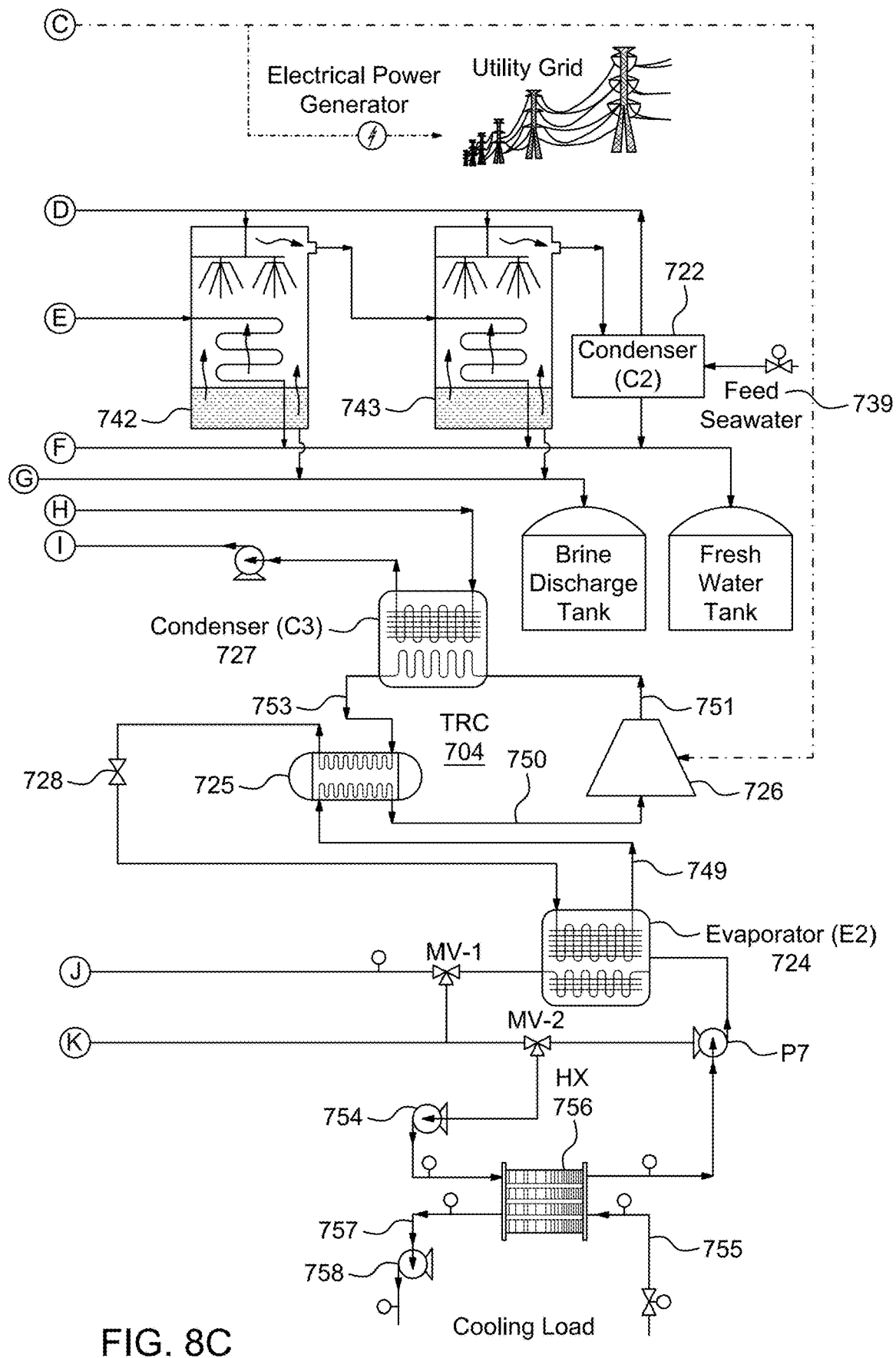
Figure 9A:
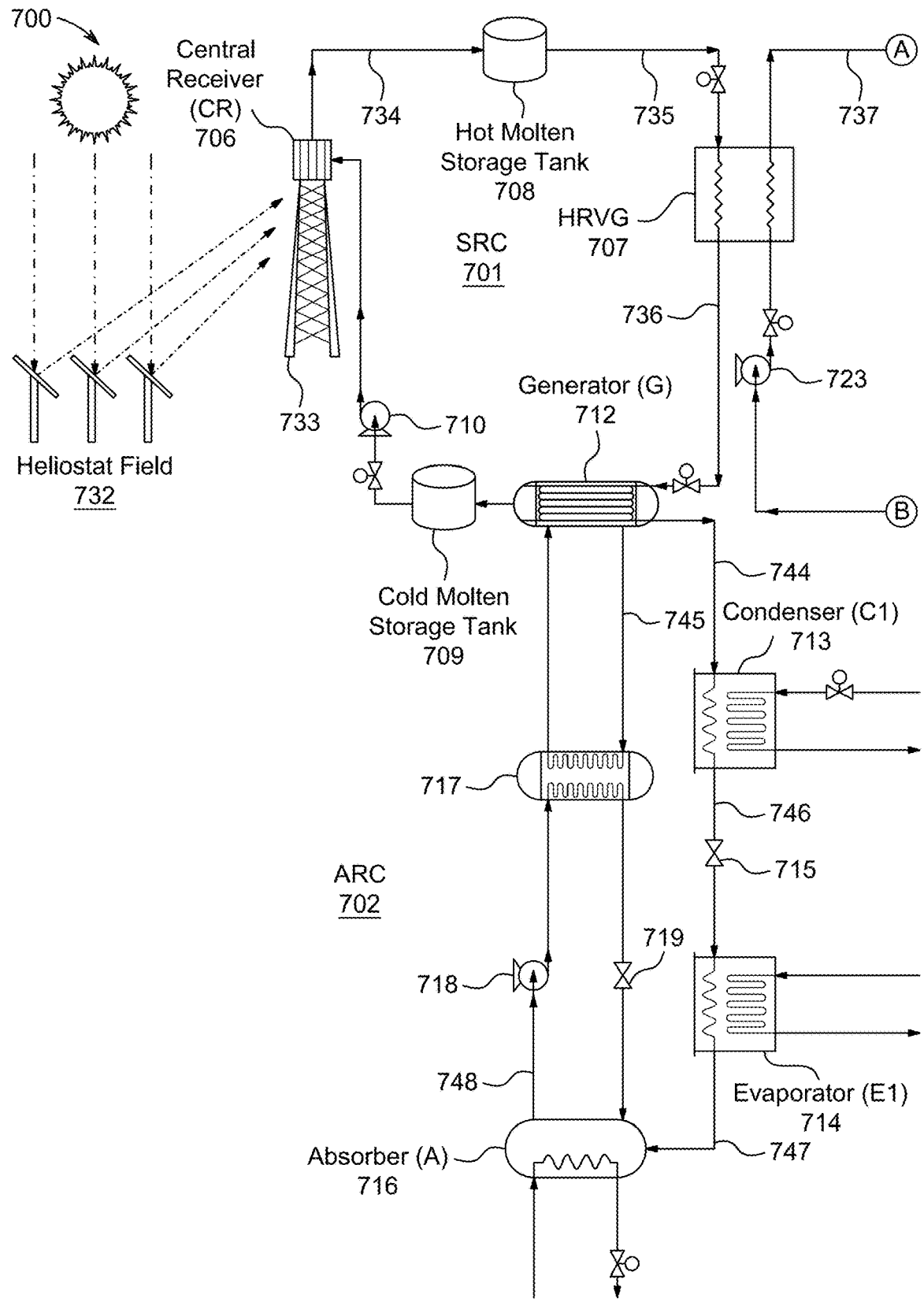
FIG. 9A-C illustrates a parallel/cross flow feed configuration of the system of FIG. 7A-C, according to an aspect of the present disclosure.
Figure 9B:
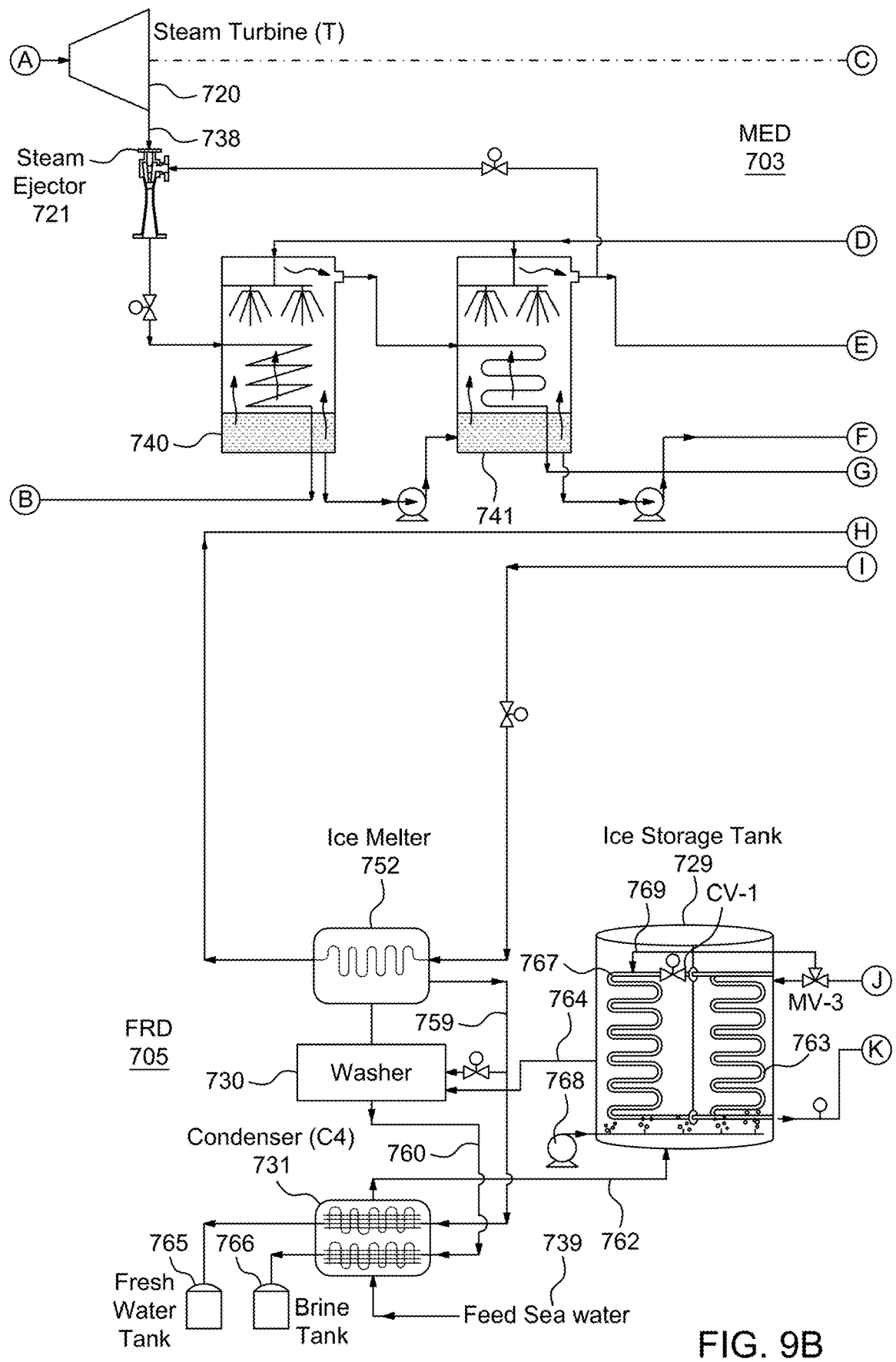
Figure 9C:
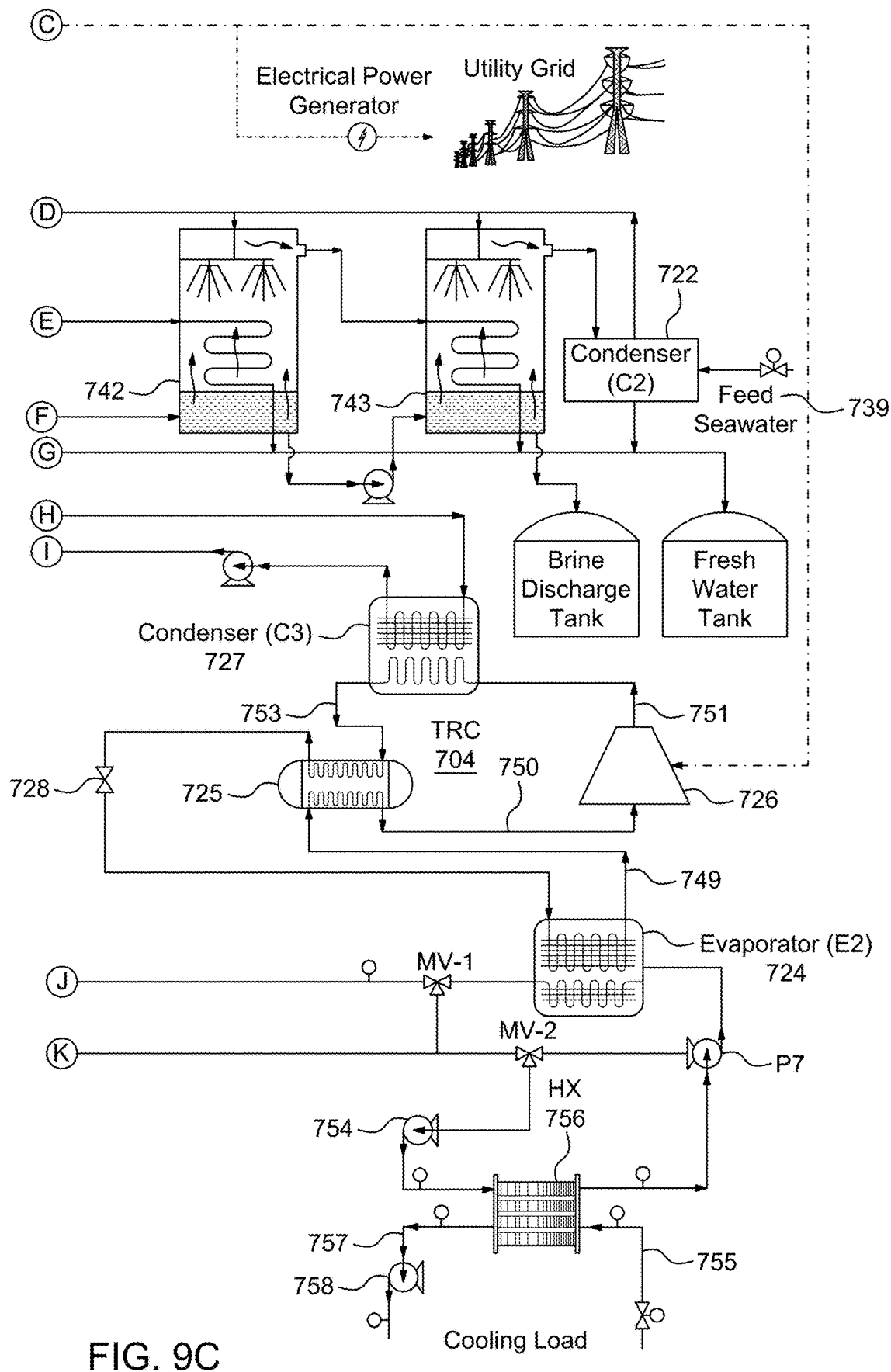
Figure 10A:
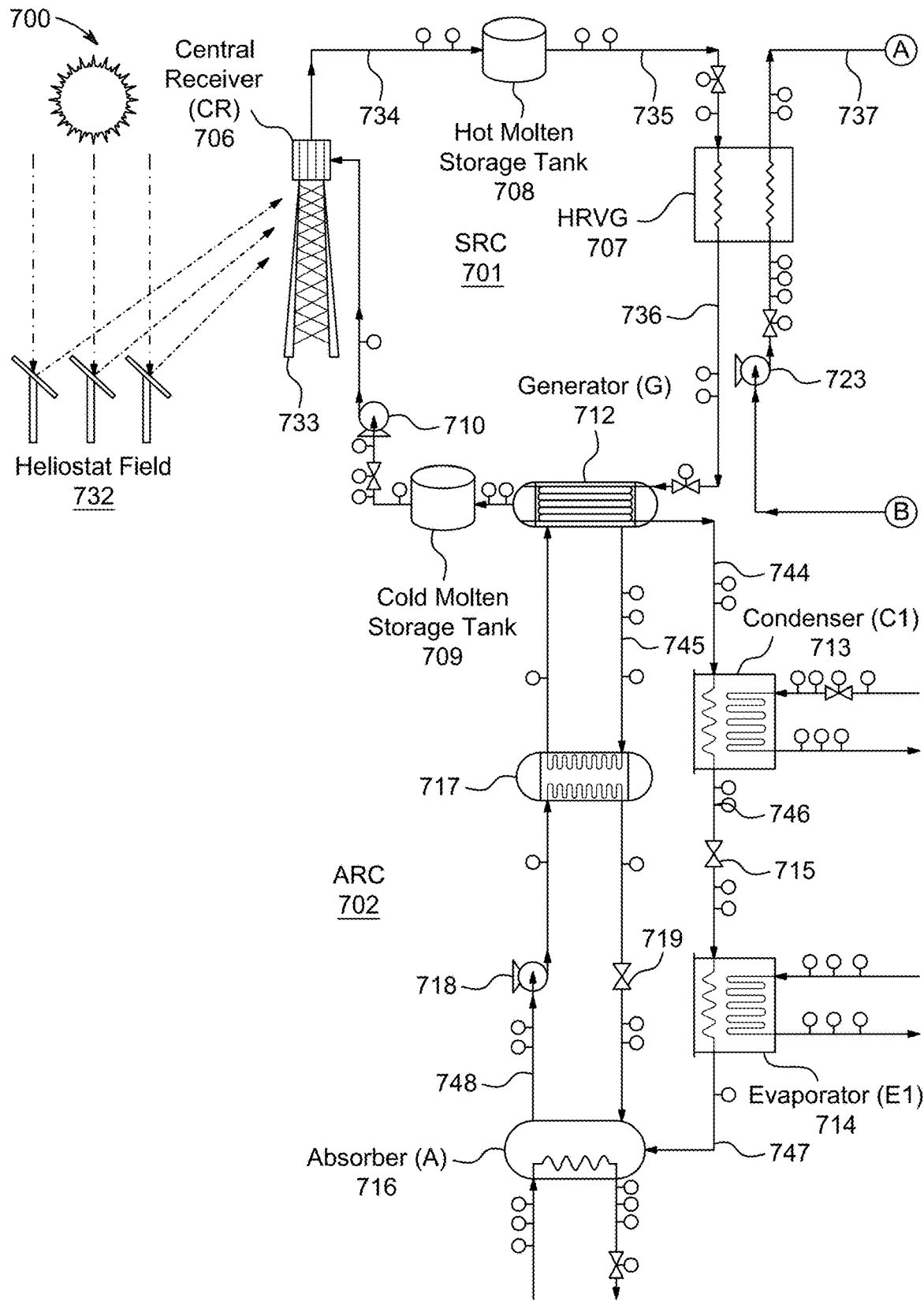
FIG. 10A-C illustrates an exemplary instrumentation diagram of the system of FIG. 7A-C, according to an aspect of the present disclosure.
Figure 10B:
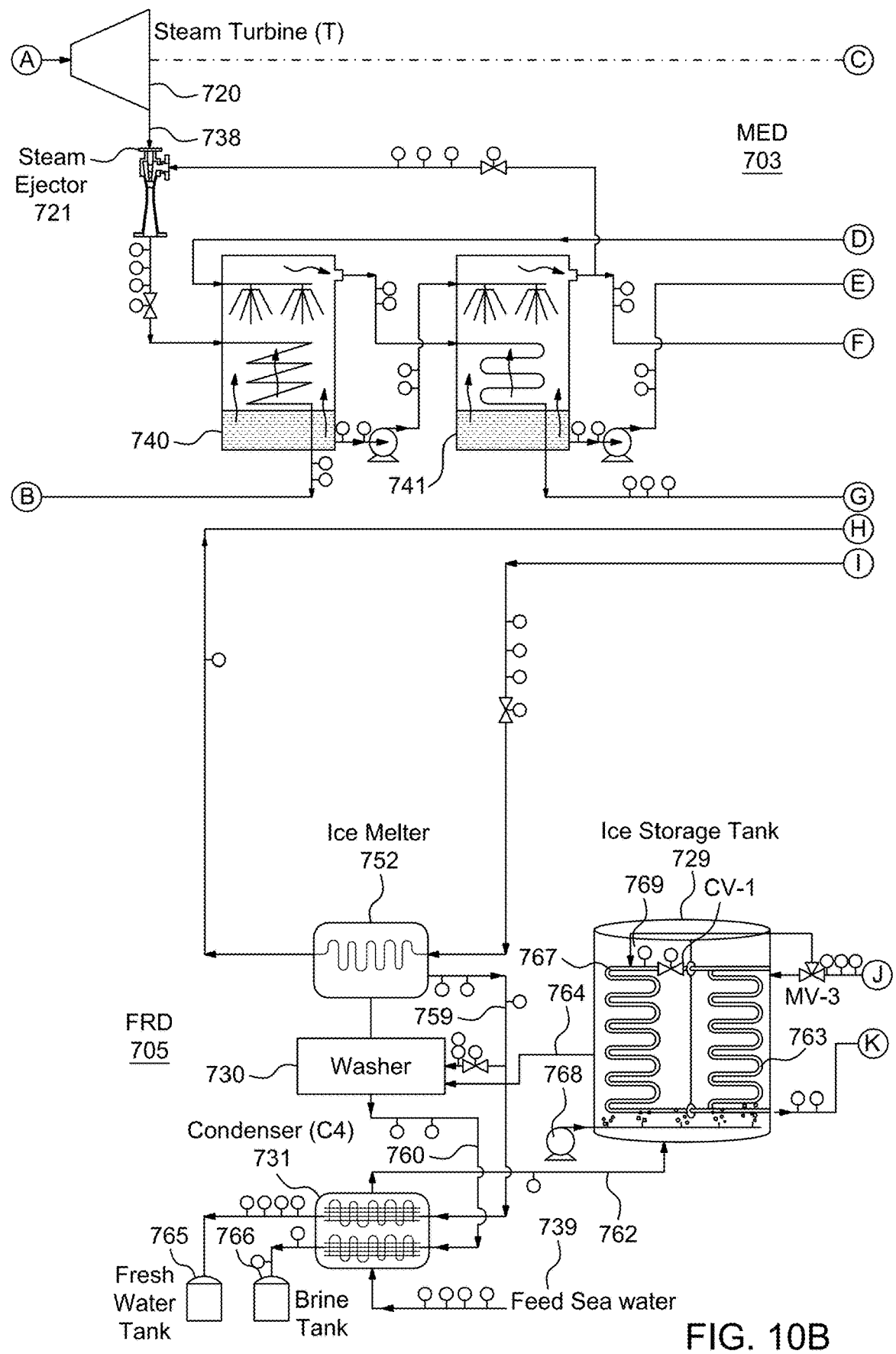
Figure 10C:
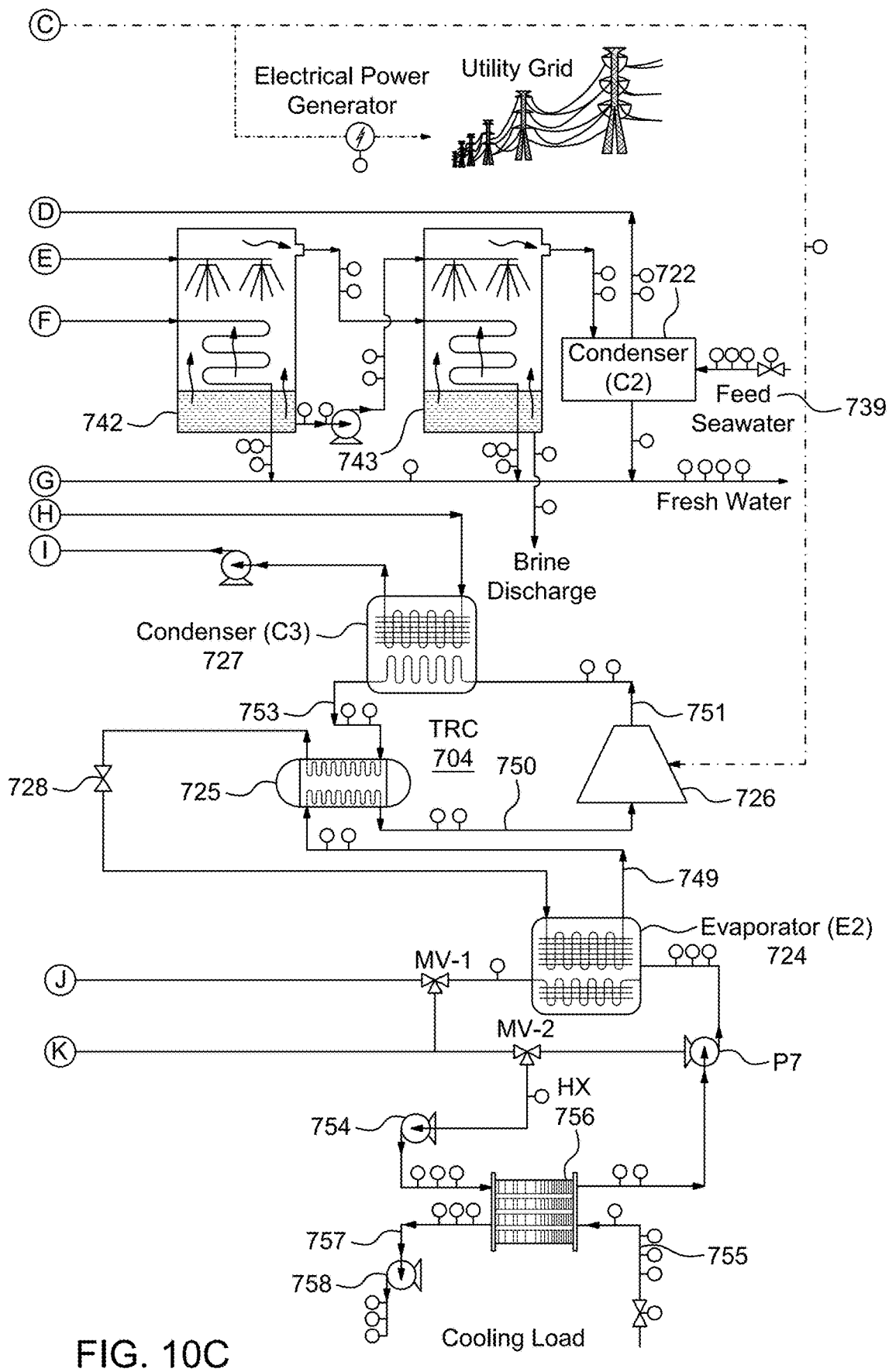

The MED subsystem 703 is configured to operate in one of a parallel feed configuration, the forward feed configuration as described with reference to FIG. 7A-C, a backward feed configuration, and a parallel/cross flow feed configuration. FIG. 8A-C illustrates the parallel feed configuration of the MED subsystem 703, while FIG. 9A-C illustrates the parallel/cross flow feed configuration of the MED subsystem 703, and FIG. 10A-C illustrates an exemplary instrumentation diagram of FIG. 7A-C, according to aspects of the present disclosure. These configurations are described with respect to FIG. 3A-C, FIG. 4A-C, and FIG. 5A-C respectively, and hence not repeated here for the purpose of brevity.

Figure 11:
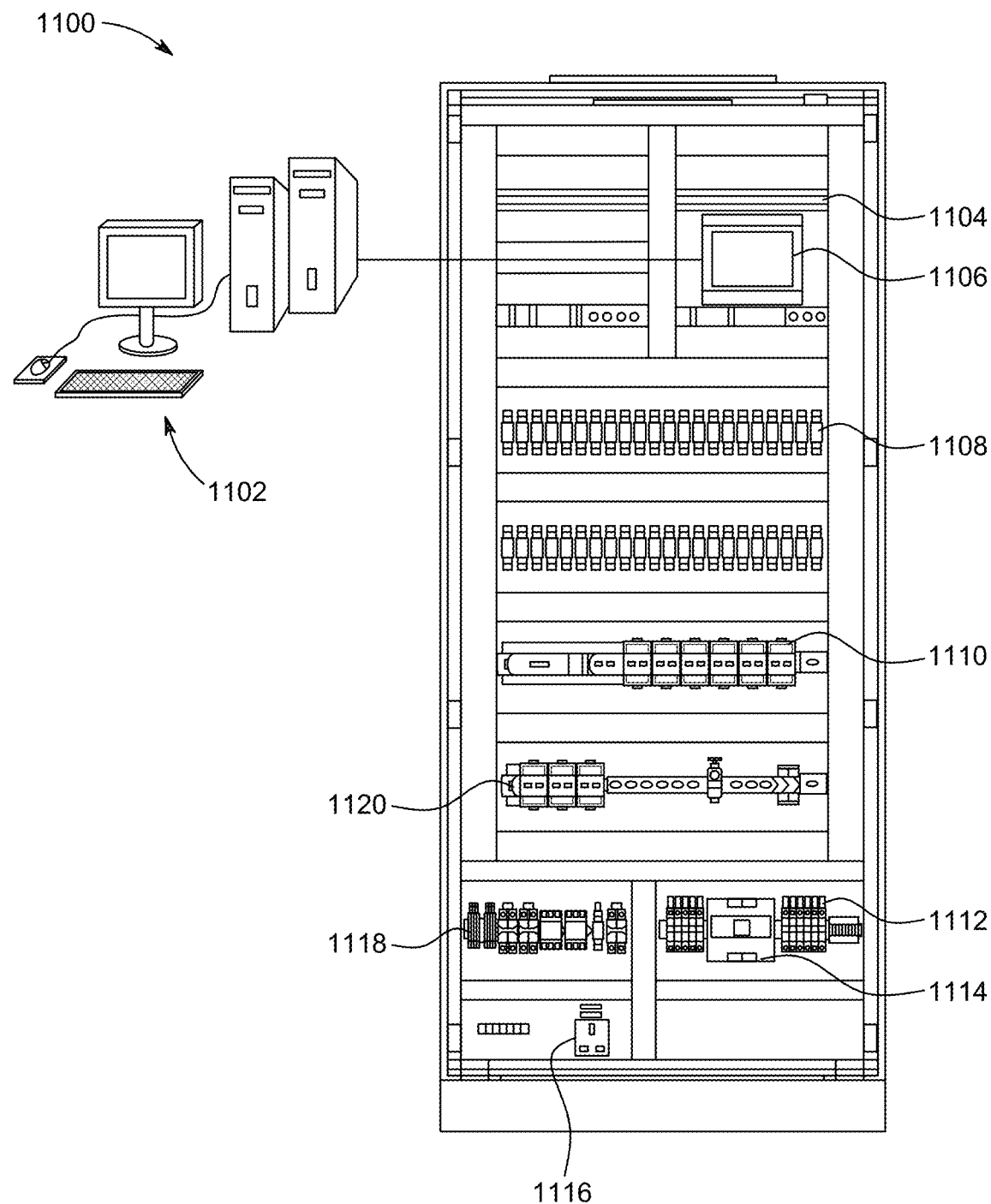
FIG. 11 illustrates an advanced control system for the system of FIG. 7A-C through FIG. 10A-C, according to an aspect of the present disclosure.

FIG. 11 illustrates an exemplary advanced control system 1100, according to an aspect of the present disclosure. In an aspect of the present disclosure, the advanced control system 1100 includes, but is not limited to, a control and monitoring system 1102, terminal blocks 1104, a touch panel human machine interface 1106, relays 1108, timers 1110, thermostats and circuit breakers 1112, a stepdown transformer 1114, a power outlet 1116, I/O modules 1118, and an automation controller 1120. In an aspect of the present disclosure, the advanced control system 1100 may further include an advanced controller to enable the sequence of operations and provide a fully functional integrated system. Further, a control system of the advanced control system 1100 may include advanced controllers, selector switches, pushbutton switches, indication lamps, relays, control transformers, mini circuit breaker, flow meters, pressure differential transmitters, temperature sensor, humidity sensor, wind speed sensor, irradiance sensor, water quality sensor, conductivity sensor, control valves, motorized valve, and interlocking relays. In an aspect of the present disclosure, control cables may be used to connect the sensors with the control system.

In an aspect of the present disclosure, the control system may monitor and control the ice building cycle operation in the desalination freezing chamber 767 and the cooling freezing chamber 763. When the ice build cycle begins either in the desalination freezing chamber 767 and the cooling freezing chamber 763, the TRC subsystem 704 may operate at a maximum refrigeration capacity without unloading until the cooling freezing chamber 763 is fully charged. When the cooling freezing chamber 763 is fully charged, the control system may send a signal to turn off the TRC subsystem 704, and the TRC subsystem 704 may not resume operation until cooling or freshwater demands exist. The control system may include advanced features, such as termination of the operation at a low water temperature. The low-temperature cutout prevents the ice build from starting if enough water is not present in both freezing chambers.

TABLE 5

Working fluids for the system 700

| Cycle | Working Fluid | Temperature Range (° C.) |
|---|---|---|
| Power Cycle: | | |
| 1. Steam Rankine cycle With Solar tower (SRC). | Molten Salt (a mixture of sodium nitrate & potassium nitrate). | 290~565 |
| 2. Steam Rankine cycle with HRVG. | Water (H$_2$O). | |
| Multi-Effect Refrigeration Cycle | | |
| 1. Transcritical Refrigeration cycle (TRC) | Nitrous Oxide (N$_2$O). | −50−−80 |
| 2. Absorption Refrigeration Cycle (ARC) | Lithium bromide is absorbent, and water is a refrigerant (LiBr—H$_2$O). | 10-20 |
| Desalination Cycles: | | |
| 1. Multi-Effect Desalination (MED). | Sea Water. | 25-30 |
| 2. Freezing Desalination (FRD). | Sea Water | 25-30 |
| Ice Storage System: | | |
| 1. Desalination Freezing Chamber. | Ethylene/Propylene Glycol | −5.56 |
| 2. Cooling Freezing Chamber. | Ethylene/Propylene Glycol | −6.67 |
| 3. HX-Cooling Load | Chilled Water | 4 to 12 |

To this end, it will be understood that the system 700 represents an integration of the ARC subsystem 702, the MED subsystem 703, the TRC subsystem 704, and the FRD subsystem 705 which exploits the solar energy effectively and produces a cooling effect in different magnitude and temperature ranges for refrigeration applications, vaccine storage, food preservation and deep freezing with the highest efficiency and least environmental impact. The system 700 produces useful electric power with zero $CO_2$ emissions and with no adverse impact on the environment due to usage of renewable energy sources.

In an aspect of the present disclosure, wind energy, biomass, and hydro energy may be coupled with the system 700 to produce the electricity needed to operate the pumps or the advanced control system 1100. In an aspect of the present disclosure, a gain output ratio (GOR) of the system 700 may be enhanced by adding more evaporation effects than producing more freshwater. In an aspect of the present disclosure, the MED subsystem 703 may be replaced by a small-scale Multi-Stage Flashing Desalination System (MSF), which operates at 110° C. temperature and may serve medium to large community water needs. In an aspect of the present disclosure, the ARC subsystem 702 may operate as a heat pump to provide a heating effect for a residential and commercial heating system.

As used herein, the terms "a" and "an" and the like carry the meaning of "one or more."

Obviously, numerous modifications and variations of the present invention are possible in light of the above teachings. It is, therefore, to be understood that, within the scope of the appended claims, the invention may be practiced otherwise than as specifically described herein.

The invention claimed is:

1. A system, comprising:
   a solar-powered steam Rankine cycle (SRC) subsystem configured to receive solar energy, convert the solar energy into thermal energy, and store the thermal energy;
   an ejector refrigeration cycle (ERC) subsystem configured to
     generate an electrical power based on the thermal energy, and
     provide a first refrigeration effect with a first range of temperature based on the thermal energy;
   an absorption refrigeration cycle (ARC) subsystem configured to provide a second refrigeration effect with a second range of temperature based on the thermal energy;
   a brine refrigeration cycle (BRC) subsystem configured to generate and store when there is no cooling demand, and
     provide a third refrigeration effect with a third range of temperature based on the electrical power generated by the ERC subsystem and the ice being melted; and
   an adsorption refrigeration cycle (ADRC) subsystem configured to provide a fourth refrigeration effect with a fourth range of temperature based on the thermal energy,
   wherein the SRC comprises a heat recovery vapor generator (HRVG) configured to generate superheated steam for the ERC subsystem;
   wherein the ERC subsystem includes a steam turbine (T) configured to generate the electrical power based on the superheated steam from the HRVG of the SRC subsystem; and
   wherein the BRC subsystem includes a compressor (COMP) powered by the electrical power generated from the steam turbine of the ERC subsystem and configured to generate high-pressure superheated refrigerant vapor.

2. The system of claim 1, wherein the SRC subsystem includes
   a central receiver (CR) configured to receive the solar energy to heat cold molten salt flowing through the central receiver;
   wherein the heat recovery vapor generator (HRVG) is configured to generate the superheated steam based on the heated molten salt, and pass the heated molten salt to the ARC subsystem;
   a hot molten salt storage tank configured to
     store the heated molten salt, and
     pass the heated molten salt from the CR to the HRVG;
   a cold molten salt storage tank configured to
     store the cold molten salt, and
     pass the cold molten salt from the ADRC subsystem to the CR; and
   a heat transfer fluid (HTF) pump configured to pump the cold molten salt from the cold molten salt storage tank to the CR.

3. The system of claim 2, wherein the ERC subsystem includes
   a first evaporator (E1) configured to provide the first refrigerant effect with the first range of temperature by evaporating water flowing through the first evaporator into water vapor;
   a steam ejector configured to generate a mixture by mixing an exhaust from the steam turbine and the water vapor from the first evaporator;
   a first condenser (C1) configured to cool the mixture from the steam ejector into the water;
   a first throttling valve (TV1) configured to
     pass a first volume of the water from the first condenser to the first evaporator, and
     reduce a pressure of the first volume of the water to a pressure of the first evaporator; and
   a first pump (P1) configured to pump a second volume of the water from the first condenser to the HRVG of the SRC subsystem.

4. The system of claim 3, wherein the BRC subsystem includes
   a third evaporator (E3) configured to provide the third refrigeration effect with the third range of temperature by evaporating liquid refrigerant flowing through the third evaporator into superheated refrigerant vapor;
   wherein the compressor is configured to generate high-pressure superheated refrigerant vapor by compressing the superheated refrigerant vapor from the third evaporator;
   a third condenser (C3) configured to cool the high-pressure superheated refrigerant vapor into the liquid refrigerant flowing to the third evaporator;
   a fourth throttling valve (TV4) configured to
     pass the liquid refrigerant from the third condenser to the third evaporator, and
     reduce a pressure of the liquid refrigerant to a pressure of the third evaporator; and
   an ice storage system configured to build the ice when there is no cooling demand and melt the ice when there is cooling demand.

5. The system of claim 2, wherein the ARC subsystem includes
   a generator (G) configured to
     pass the heated molten salt from the HRVG of the SRC subsystem to adsorption chambers of the ADRC subsystem, generate superheated water vapor refrigerant based on the heated molten salt flowing through the generator, and generate a strong solution based on a weak solution flowing into the generator;

a second condenser (C2) configured to generate saturated liquid refrigerant by cooling the superheated water vapor refrigerant from the generator;

a second evaporator (E2) configured to provide the second refrigeration effect with the second range of temperature by generating saturated water vapor based on the saturated liquid refrigerant from the second condenser;

a second throttle valve (TV2) configured to
pass the saturated liquid refrigerant from the second condenser to the second evaporator, and
reduce a pressure of the saturated liquid refrigerant to a pressure of the second evaporator;

an absorber (A) configured to generate the weak solution by mixing the strong solution with the saturated water vapor from the second evaporator;

a solution heat exchanger (SHX) configured to
pre-heat the weak solution from the absorber,
pass the pre-heated weak solution to the generator, and
pre-cool the strong solution from the generator;

a second pump (P2) configured to pump the weak solution from the absorber to the SHX; and a third throttling valve (TV3) configured to
pass the pre-cooled strong solution from the SHX to the absorber, and
reduce a pressure of the pre-cooled strong solution to a pressure of the absorber.

6. The system of claim 5, wherein the ADRC subsystem includes two adsorption chambers (AC-1 and AC-2) configured to alternatively and respectively perform as adsorber and desorber;

a fourth evaporator (E4) configured to provide the fourth refrigerant effect with the fourth range of temperature by evaporating water flowing through the four evaporator into water vapor flowing to a first adsorption chamber of the two adsorption chambers performing as the absorber; and a fourth condenser (C4) configured to cool the water vapor from a second adsorption chamber of the two adsorption chambers performing as the desorber, wherein the heated molten salt is cooled through the two adsorption chambers and returns to the cold molten salt storage tank of the SRC subsystem.

* * * * *